United States Patent [19]

Vossler et al.

[11] Patent Number: 5,537,519
[45] Date of Patent: Jul. 16, 1996

[54] SYSTEM AND METHOD FOR CONVERTING BOUNDARY REPRESENTATIONS TO CONSTRUCTIVE SOLID GEOMETRY REPRESENTATIONS FOR THREE-DIMENSIONAL SOLID OBJECT MODELING

[75] Inventors: Donald L. Vossler, Anaheim, Calif.; Vadim Shapiro, Ann Arbor, Mich.

[73] Assignee: Electronic Data Systems Corporation, Plano, Tex.

[21] Appl. No.: 84,692

[22] Filed: Jun. 29, 1993

[51] Int. Cl.⁶ .................................................. G06T 17/10
[52] U.S. Cl. ........................................... 398/120; 395/123
[58] Field of Search .................................. 395/120, 119, 395/123

[56] References Cited

U.S. PATENT DOCUMENTS 4,736,306  4/1988  Christensen et al. ................. 364/513

OTHER PUBLICATIONS

Miller, "Architectural Issues In Solid Modelers", IEEE-Computer Graphics & Applications, Sep. 1989, pp. 72–87.
Donald L. Vossler, "Sweep-to-CSG Conversion Using Pattern Recognition Techniques", IEEE CG & A, Aug. 1985, pp. 61–68.
V. Shapiro and D. L. Vossler, "Efficient CSG Representation of Two-Dimensional Solids", Journal of Mechanical Design, Transactions of the ASME, vol. 113, Sep. 1991, pp. 292–305.
Vadim Shapiro and Donald L. Vossler, "Construction and Optimization of CSG Representations", Computer-Aided Design, vol. 23, No. 1, Jan./Feb. 1991, pp. 3–20.

Primary Examiner—Mark K. Zimmerman
Attorney, Agent, or Firm—L. Joy Griebenow

[57] ABSTRACT

A system and method converts from the boundary representation ("b-rep") of a solid object to the constructive solid geometry ("CSG") representation thereof. The b-rep of a three-dimensional object is converted into a CSG expression by constructing a set of separators through triples of vertices on the face of the solid, until there is a separator passing through every vertex of the face. A separator is constructed through every planar edge of the face and containing the planar edge. For each nonplanar edge of the solid, one or more separators are constructed to separate the edge from the rest of the curve on the face. In this case, construction of nonplanar separating surfaces may be required. Each of these constructions are repeated for every face of the given boundary representation of the solid object. The natural half spaces previously induced from the b-rep together with the separators are then decomposed to determine the CSG expression of the object and the expression provided to a modeler which generates a CSG model of the object based on the CSG expression.

23 Claims, 4 Drawing Sheets

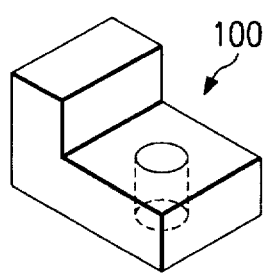
FIG. 1a
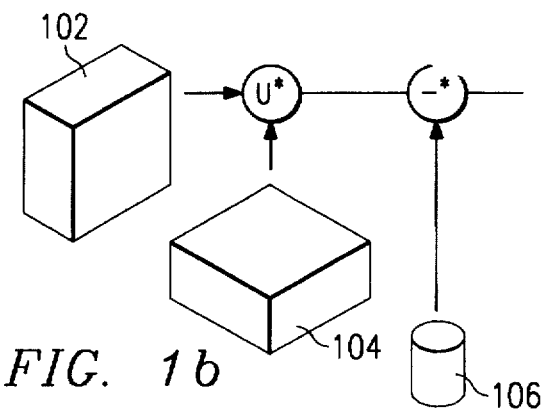
FIG. 1b
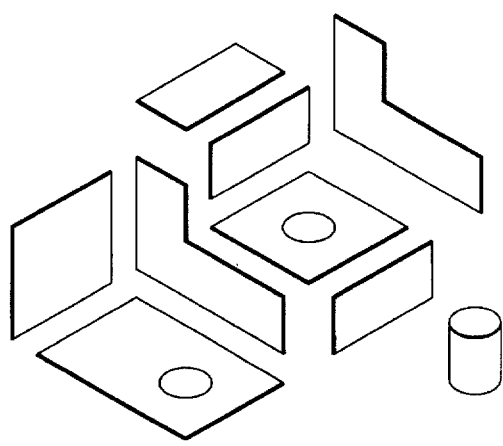
FIG. 1c
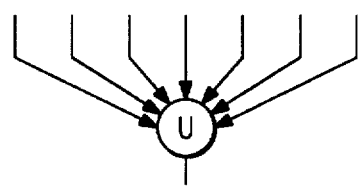
FIG. 2a
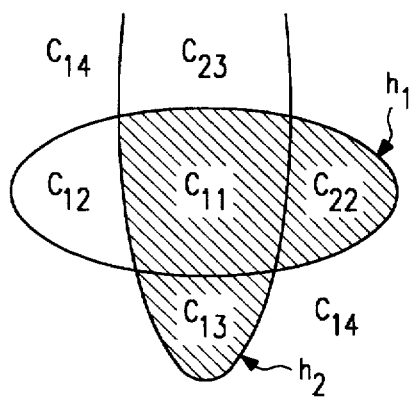
FIG. 2b
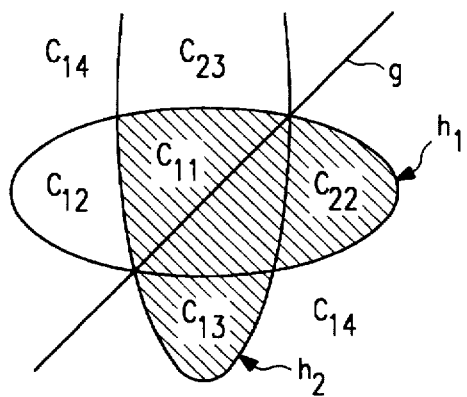

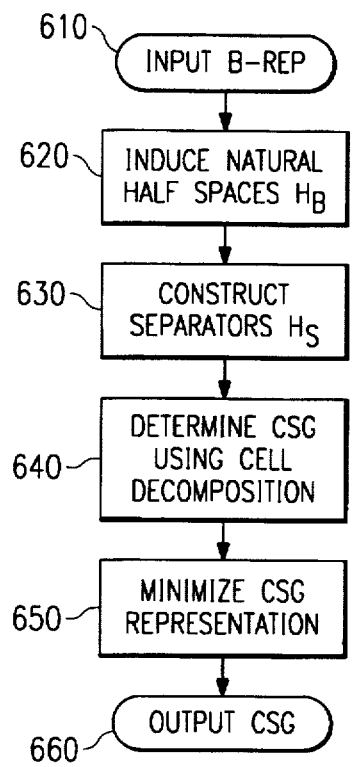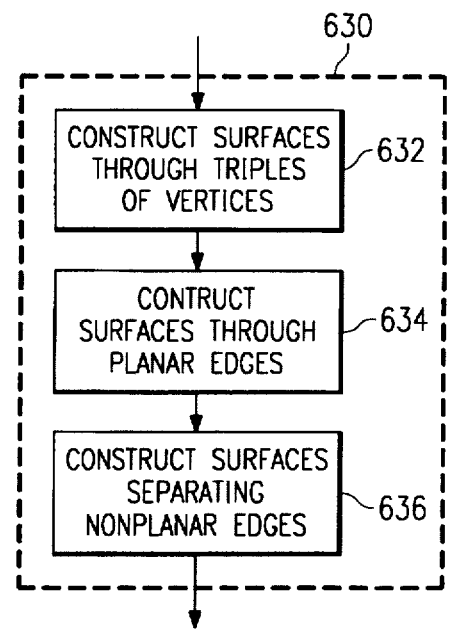
FIG. 6a　　　　　FIG. 6b
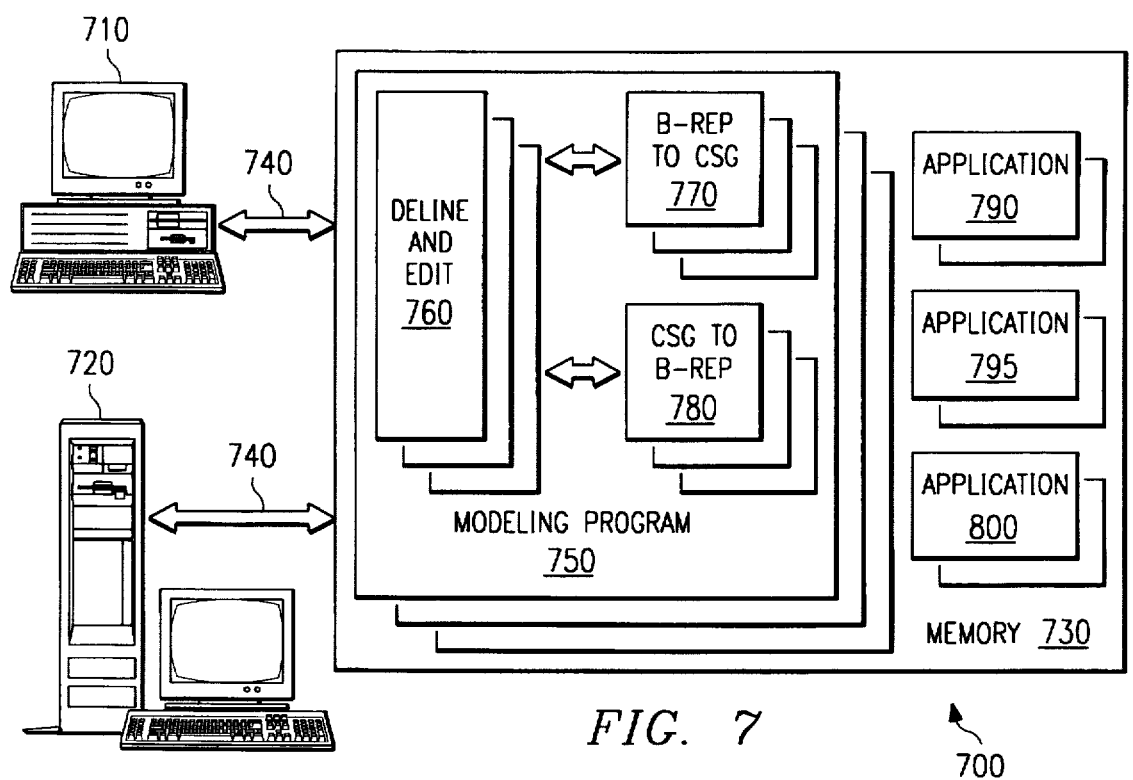
FIG. 7

C-CLAMP ASSEMBLY

C-CLAMP SCREW

C-CLAMP HANDLE

C-CLAMP BODY SEPARATORS

C-CLAMP BODY NATURAL HALFSPACES

SYSTEM AND METHOD FOR CONVERTING BOUNDARY REPRESENTATIONS TO CONSTRUCTIVE SOLID GEOMETRY REPRESENTATIONS FOR THREE-DIMENSIONAL SOLID OBJECT MODELING

BACKGROUND OF THE INVENTION

1. Field of the Invention

The present invention relates generally to computer-aided design, manufacture and engineering, and more particularly to a system and method for improved solid object modelling.

2. Description of the Related Art

Boundary representations (b-reps) and constructive solid geometry (CSG) are the two most widely used representation schemes for solids. Properties of CSG representations are summarized in Requicha, A. A. G., and Voelcker, H. B. *Constructive Solid Geometry*. Tech. Memo 25, Production Automation Project, Univ. of Rochester, Rochester, N.Y., 1977. Central to CSG are notions of closed-set regularity and regularization relative to the topology of the Euclidean space. Regularization of a set X is defined by kiX, where k and i denote, respectively, operations of closure and interior. Regularized set operations ∩* and ∪*, and −* are defined by regularizing the results of the corresponding standard set operations and have the effect of always producing homogeneously "solid" sets. Properties of closed regular sets have been studied in Kuratowski, K., and Mostowski, A. *Set Theory*. North-Holland, Amsterdam, 1976, as well as McKinsey, J. C. C., and Tarski, A. *On closed elements in closure algebras*. Ann. Math. 47, 1 (Jan. 1946), pp. 122–162, and Requicha et al. *Constructive Solid Geometry*, supra., and are well understood.

While the problem of computing a B-rep (FIG. 1c) from a CSG representation (FIG. 1b) for an example solid (FIG. 1a) is relatively well understood, the inverse problem of B-rep to CSG conversion has not been addressed in general. Important applications of b-rep to CSG conversion arise in a variety of fields, including solid modeling and image processing.

The importance of b-rep to CSG conversion can be seen from the following considerations:

Both of these types of systems are useful when writing production applications for manufacturing or engineering. Depending on the problem one is trying to solve, one may want to represent a solid either as a b-rep or as constructive solid geometry; therefore, having conversions between the two is extremely useful.

The inability to perform b-rep to CSG conversion puts significant constraints on the design of modern solid modelling systems such as a true dual representation architecture of a solid modelling system that allows representation-specific technology to be used on alternative representations through a bilateral b-rep-CSG conversion.

One of the difficult aspects of the b-rep to CSG conversion problem is that the boundary representation of an object is unique. On the other hand, the CSG representation or solution is not unique; there are an infinite number of solutions in CSG for the same b-rep. Moreover, until now there has been no viable solution to the problem for curved three-dimensional solid objects.

SUMMARY OF THE INVENTION

In view of the above problems associated with the related art, it is an object of the present invention to provide a system and method for converting a boundary representation of a solid object into a constructive solid geometry representation.

It is another object of the present invention to provide a true dual representation solid modelling system that allows representation-specific technology to be used via alternative representations through a bilateral b-rep-CSG conversion.

Given a boundary representation of a solid object by a union of curved faces, this invention computes and produces a set of geometric separators that allow computation of Boolean set theoretic descriptions of faces, boundaries, and solids. A separator can be a planar surface, an arcuate surface or a piecewise polynomial surface.

The system and method of the present invention involve three steps, repeated for every face of the given boundary representation of the solid. First, separators are constructed through triples of vertices on the face of the solid, until there is a separator passing through every vertex of the face. Second, through every planar edge of the face, a separator is constructed containing the planar edge. Third, for each nonplanar edge of the solid, one or more separators are constructed that separate the edge from the rest of the curve of the face. In this case, it is possible that construction of nonplanar separating surfaces is required. The process described above has been completely implemented in a computing system as a prototype. The prototype reads a b-rep description of the solid object and then computes the required separating planes automatically. Numerous solid objects representing a variety of mechanical parts have been subjected to this process with results verifying the effectiveness of the invention.

The ability to compute separating surfaces contributes to the solution of several important problems such as b-rep to CSG conversion, definition of faces, boundaries, and solids using standard set operations (union, intersection, complement), construction of new representations of surfaces, solids and other point sets, and development of new software and hardware architectures for geometric modeling systems supporting multiple representations.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 1a–1c are schematic illustrations of an example simple solid with its respective boundary (b-rep) and constructive solid geometry (CSG) representations;

FIG. 2a is a schematic drawing of an example two-dimensional solid, while FIGS. 2b is identical to FIG. 2a with the addition of separating surface g;

FIG. 6a is a flowchart of preferred embodiment of the present invention, while FIG. 6b is a more detailed flowchart of the construct separators portion of the flowchart of FIG. 6a;

FIG. 7 is a schematic drawing of an example system employing the present invention.

DETAILED DESCRIPTION OF A PREFERRED EMBODIMENT

Figure 3:
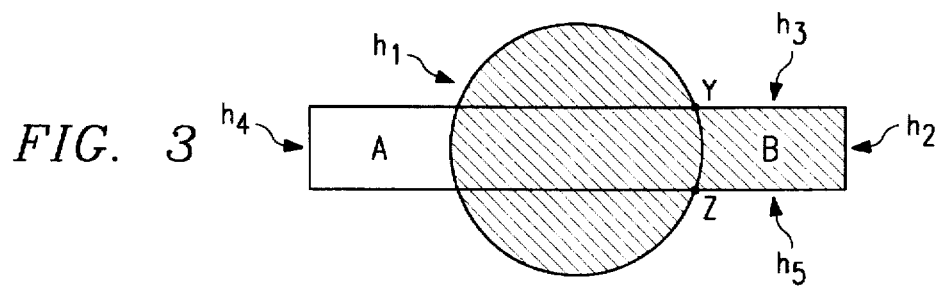
FIG. 3 is a schematic drawing of an example two-dimensional solid.

The b-rep to CSG conversion procedure employed by the system of the present invention generally consists of the following steps:

First, induce a set of natural half spaces, $H_b$, associated with the boundary $\partial S$ of a solid S. The natural half spaces in $H_b$ partition the Euclidean space into a number of open connected "cells". All cells fall into one of two categories: those that are inside solid S and those that are outside of S. If CSG representations of (closures of) all cells inside S are known, then their union is a valid CSG representation of S. Thus, the shaded two-dimensional solid in FIG. 2a is a union of the closures of the three two-dimensional cells: $C_{11}$, $C_{22}$, and $C_{13}$.

Unfortunately, some cells inside S may not admit any CSG representation using natural half spaces $H_b$ of S. In FIG. 2a any CSG representation using half spaces $h_1$ and $h_2$ that "covers" cell $C_{22}$ also covers cell $C_{12}$. Similarly, cell $C_{13}$ cannot be represented in isolation from cell $C_{13}$. Since $C_{23}$ and $C_{12}$ are outside the solid, it follows that S cannot be represented in CSG by $h_1$ and $h_2$ alone. Thus, a set of additional half spaces is constructed that "separate" some cells inside S from those outside of S. Such half spaces are called separating half spaces, separating surfaces, or simply separators. A set $H_s$ of separating half spaces is sufficient if solid S can be represented by some CSG representation of $H = H_s \cup H_b$. For example, separating half space g in FIG. 2b separates cells $C_{22}$, $C_{13}$ from cells $C_{23}$ and $C_{12}$, respectively, thus allowing a CSG representation of S.

Then, if a sufficient set of half spaces is known, the system according to the present invention computes the decomposition of the Euclidean space and identifies the cells inside S. The union of CSG representations of closures of these cells is a unique canonical CSG representation of S.

One of the most difficult steps in performing a b-rep→CSG conversion for a curved solid object is determining a sufficient set of separators for a CSG representation of the solid. This usually requires the construction of additional half spaces whose boundaries do not contribute to the boundary of the solid. Such half spaces are called separating half spaces because their purpose is to separate certain subsets inside the solid from those outside of the solid. The notions of cells, separation, and separators are set forth below, including separation techniques that enabled an implementation of an experimental b-rep→CSG conversion system for three-dimensional solids bounded by quadric surfaces (though results discussed below apply to more general solids as well).

While the present invention primarily addresses separation in three-dimensional Euclidean space $E^3$, two-dimensional examples will be used occasionally to convey the main ideas. Furthermore, it is often more convenient to discuss examples in a general d-dimensional Euclidean space $E^d$, bearing in mind that the statements apply equally well in two- and three-dimensional cases.

As a matter of background to the understanding of the present invention, definitions as well as the concepts of describability and separation issues will be addressed first.

Boundary and CSG Representations of Solids. Solids may be modeled by sets of points in $E^d$ that are compact, regular and semianalytic; such sets are called "r-sets". A two-dimensional solid is an r-set in $E^2$ while a three-dimensional solid is an r-set in $E^3$. The boundary $\partial S$ defines S completely and unambiguously in the following sense: (1) Complement of the boundary, $-\partial S$, is a disconnected subset of $E_d$; and (2) interior iS and exterior eS are unions of some connected components of $-\partial S$.

The b-rep of a solid S is a representation of $\partial S$. Comprehensive surveys of properties and different types of b-reps, including historical background, can be found in recent books on solid modeling such as Hoffmann, C. H. *Geometric and Solid Modeling*. Morgan Kaufmann, San Mateo, Calif., 1989 or Mantyla, M. *An Introduction to Solid Modeling*. Computer Science Press, Rockville, Md., 1988. Typically, a b-rep of a three-dimensional solid S is a collection of closed two-dimensional sets called faces $Q_i$; that is, $$\partial S = \cup Q_i.$$

Faces in $\partial S$ may not be disjoint but may intersect on edges, which are assumed to be connected one-dimensional sets. For purposes of the present invention, the particular type of b-rep is not important, as long as it specifies all surfaces containing the faces of S.

Each face $Q_i$ is a subset of a set $(f_i=0)$, where $f_i(x, y, z)$ is a real analytic (or algebraic) function. A half space $h_i$ is induced from (or associated with) a face $Q_i$ as $$h_i = \{p | f_i(p) \geq 0\} \equiv (f_i \geq 0).$$

The half spaces induced from a b-rep of S are called natural half spaces of S. Note that half spaces need not be regular or connected sets.

It is important to distinguish between a solid S and its CSG representations. A CSG representation $\Phi(H)$ of a solid S is a syntactic expression constructed using regularized set operations on a set of half spaces. A CSG expression $\Phi$ is a Boolean expression composed of halfspace literals $h_1, \ldots, h_n$, and symbols denoting regularized set operations, defining a Boolean function. Properties of CSG representations are further considered in Appendix A. $S=|\Phi|$ denotes the fact that $\Phi$ represents set S. For example, the shaded solid in FIG. 2b can be represented by CSG as $$S = |[g \cap^* (h_1 \cup^* h_2)] \cup^* (h_1 \cap^* h_2)|,$$

but many other CSG representations using half spaces ($h_1$, $h_2$, g) are also possible.

Describability. Given a finite set $H=(h_1, \ldots, h_n)$ of half spaces, with every half space $h_i$ defined as $(f_i \geq 0)$, an infinite number of CSG representations can be constructed, but they represent at most a finite number of distinct closed regular sets S. The set of all such sets is a finite Boolean algebra with operations $\cap^*$, $\cup^*$, and $-^*$. Accordingly, each such set S can be represented by a unique disjunctive canonical CSG representation as $$S = \left| \bigcup_k {}^* \Pi_k \right|,$$

where $\Pi_k$ is a canonical intersection term defined by $$\Pi_k = x_1 \cap^* \ldots \cup^* x_n, \; x_i \in \{(f_i \geq 0), (f_i \geq 0)\}. \tag{1}$$

The interior of every set $|\Pi_k|$ defines a set of all points in the space that have identical classification (in or out) with respect to all of the half spaces in H. In other words, $$i\Pi_k = y_1 \cap \ldots \cap y_n, \; y_i \in \{(f_i > 0), (f_i < 0)\}. \tag{2}$$

If H is a set of n algebraic half spaces of degree k, it follows that the partition $\{|\Pi_k|\}$ of the d-dimensional space $E^d$ has at most $(1+nk)^d$ distinct nonempty elements. Therefore, at most $2^{(1+nk)d}$ distinct sets can be represented by CSG expressions on H.

Note that the interior of a set $|\Pi_k|$ in eq. (2) need not be connected. Thus, $$i|\Pi_k| = \cup_j C_{jk}, \qquad (3)$$

where $C_{jk}$ are connected open three-dimensional components of the interior of $|\Pi_k|$ and a connected set $|\Pi_k|$ can contain more than one component $C_{jk}$. The number of all distinct components $C_{jk}$ can be much larger than the number of canonical intersection terms, but is bounded by $(2nk)^{2d+1}$, for n algebraic half spaces of degree k in $E^d$. These estimates on size of partitions $\{|\Pi_k|\}$ and $\{C_{jk}\}$ are rather conservative, and tighter bounds are known in many special cases.

Suppose that solid S is represented by a b-rep and that $H_b$ is a set of all natural half spaces induced from the b-rep. In two-dimensions a boundary representation is a description of the edges that bound a two-dimensional object and a description of the faces that bound a three-dimensional object. As FIGS. 2a and 3 demonstrate, components of some canonical intersection terms $\Pi_k$ (using half spaces in $H_b$) may be separated by the boundary ∂s: some of its components are in the interior iS, whereas others are in the exterior eS. FIG. 2a is a schematic drawing illustrating a shaded solid as a union of three cells: $C_{11}$, $C_{22}$, and $C_{13}$. As can be seen from the illustration, cells $C_{22}$ and $C_{13}$ do not admit any CSG representations with half spaces $h_1$ and $h_2$. Therefore, S is not describable by $H_b$ and the components in FIG. 2a are not describable in isolation from each other.

FIG. 3 is a schematic drawing of another example of a two-dimensional solid (planar solid). Five half spaces are depicted, namely a circle, $h_1$, and the four edges $h_2, \ldots, h_5$. The desired object is shown shaded. Cells A and B do not admit any CSG representations with illustrated half spaces because, as with the solid of FIG. 2a, using Boolean algebra, one cannot describe these two pieces separately.

In both of these examples, as well as innumerable other solids, there is no CSG representation of S using only half spaces from $H_b$. In other words, S is not describable by $H_b$ and the components in FIGS. 2a and 3 are not describable in isolation from each other. More generally, the following states the necessary and sufficient conditions for a solid S to be "describable" by a set of half spaces:

(Describability). Given a set $H=(h_1, \ldots, h_n)$ of half spaces such that $\partial S \subseteq \partial h_1 \cup \ldots \cup \partial h_n$, solid S is describable by H if and only if (iff) all components $C_{jk}$ of every canonical intersection term $\Pi_k$ have the same classification with respect to S.

The components $C_{jk}$ can classify as either in S (i.e., $C_{jk} \subseteq iS$) or out of S (i.e., $C_{jk} \subseteq eS$). If components of every $\Pi_k$ have the same classification with respect to S, the set H is sufficient for CSG representation of S. Otherwise, additional half spaces must be constructed that separate the components $C_{jk}$ into distinct intersection terms.

Separation Issues. Two distinct points $a,b \in E^d$ are defined as separated by a half space $g=(f \geq 0)$ iff $f(a) \neq 0$, $f(b) \neq 0$, and sign $[f(a)] \neq$ sign $[f(b)]$. Moreover, two disjoint point sets A and B are separated by a family of half spaces $G=(g_i)$ iff, for all $a \in A$, $b \in B$, there exists a half space $g_i \in G$ such that a and b are separated by $g_i$.

Using these definitions, two distinct components A and B are separated by a set of half spaces H iff A and B are not components of the same canonical intersection term $\Pi_k$.

Recall describability sets forth the concept that a sufficient set of separators must separate any component inside S from those outside of S.

The two-dimensional solid in FIG. 2b is describable by the two natural half spaces $h_1$ and $h_2$ and a single separating half space g added according to the theory embodied in the present invention. The separating surface is used to keep connected components apart so they can be described separately. It should be noted that separating half spaces may intersect the components they separate. Furthermore the two-dimensional shaded solid in FIG. 3 can be made to be describable by the addition of a single separation half space g (not shown) and the four natural half spaces $h_1$, $h_2$, $h_3$, $h_5$. Such separation half space g could intersect the solid, for example, at points Y and Z.

It should be understood at this point that there are often infinite locations and orientations for separating surface g to adequately separate connected components such as A and B of FIG. 3. However, for a computer to understand what a user would intuitively observe is another matter. For this reason, and for computational ease, it is preferred that a separating surface connect the endpoints of the curved edges of two-dimensional solids. This is because end points are already defined by the b-rep.

It should also be remembered that a separator may be planar or arcuate or a piecewise polynomial. According to the present invention, while one may not always have the choice of type of separating surface because of the particular object being modelled, planar separating surfaces are greatly preferred because one does not introduce a secondary problem into the b-rep when using planar separating surfaces. Recall that any separating surface introduced into a representation ends up in all of the geometric calculations for an object. Furthermore, arcuate surfaces in general give increased opportunity that the problem has not been solved because they have more than one place where they cross an object. Moreover the mathematics that describe planes are much simpler than even for the simplest arcuate surface—a sphere.

There are at least three separation strategies, namely:

(1) Global separation. Construct a set of separating half spaces $H_s$ such that every canonical intersection term $\Pi_k$ in the decomposition of $E^d$ by $H_b \cup H_s$ represents a single component. The cylindrical algebraic decomposition can achieve this. But this expensive construction is excessive and unnecessary, since only some of the components need to be separated.

(2) Test-based separation. Compute all pairs of components that must be separated for S to be describable, use this information to construct necessary separators, and add separating half spaces incrementally until the conditions of describability are satisfied. To use this strategy, one must first compute the boundaries of components to be separated and then use various planning algorithms. Such an approach often leads to difficult problems similar to those in motion planning, and this tends to be quite computationally intensive.

(3) Boundary-based separation. Recall that only the components inside S need to be separated from components outside of S. By using the boundary of a solid to guide the required separation, a sufficient $H_s$ that is much smaller than the one resulting from the global separation is thereby produced. With this strategy, a sufficient set of separators is constructed a priori, based on various topological and geometric properties of solids.

Figure 4A:
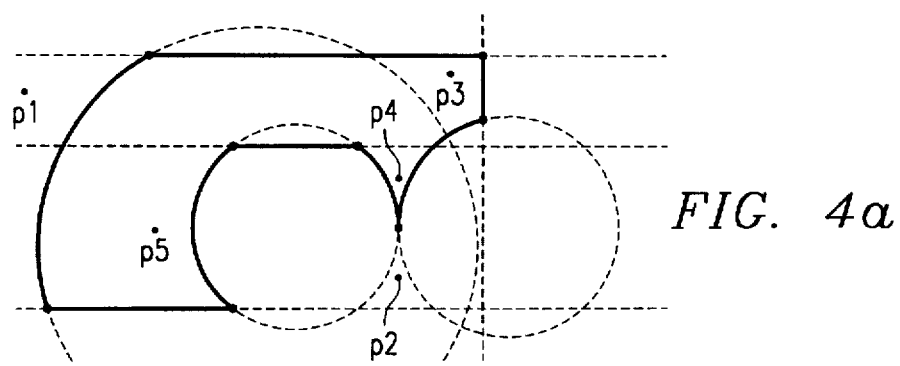
FIGS. 4a and 4b are schematic drawings of a further example two-dimensional solid illustrating boundary-based separation according to the present invention.
Figure 4B:
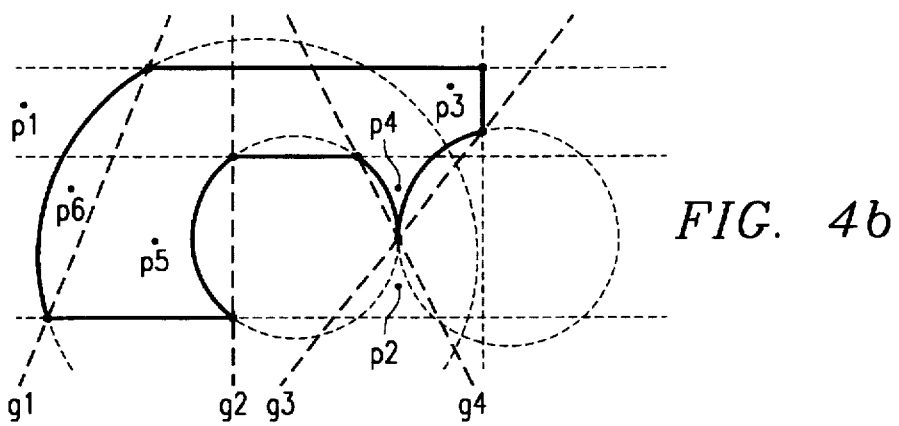

Of the three separation strategies, the boundary-based strategy is the most general. A system which can accomplish this type of separation can also accomplish the remaining two strategies listed. The system and method of the present invention preferrably employs the boundary-based strategy for constructing a sufficient set of separators. This approach has been used successfully to solve the conversion problem for a large class of two-dimensional solids and much more recently for three-dimensional solids. For example, let S be a two-dimensional solid with "faces" that are curved arcs, with each arc being a subset of a curve of a constant curvature sign. FIG. 4a shows a planar solid S represented by its boundary. But S is not describable by H because several pairs of two-dimensional components must be separated (e.g., those containing points $P_2$ and $P_4$, and $P_1$ and $P_3$). FIG. 4b shows that the set $G=\{g_1, g_2, g_3, g_4\}$ of linear separators associated with the chords of $\partial S$ is sufficient for CSG representation of S. Indeed, S is describable by H∪G, since no other pairs of components need to be separated. Moreover, after thoughtful consideration of FIG. 4b, it becomes apparent that not all $g_i$s are necessary, but such an approach is always sufficient. For such solids the set of linear half spaces associated with the arc chords is always sufficient. While this result can be generalized to higher dimensions, the general separation problem in $E^3$ is much more difficult.

One way to see if two points a and b are separated by a half space $h \equiv (f \geq 0)$ is to trace a path from a to b and to count how many times the real function f changes its sign. Only if this number is odd, are the points a and b separated by h.

Consider a (d−1)-dimensional set X such that its complement −X is a disconnected subset of $E^d$ and two points $a,b \notin X$. By definition, a one-dimensional path ab and X have complementary dimensions, since dim(ab)+dim X= d. Assuming that ab and X intersect transversely in the topological sense, ab∩X is a finite set of points. Intuitively, this means that at every point of ab ∩X the sum of tangent spaces of ab and X span $E^d$. Sard's theorem implies that almost all intersections are transversal. The number of such intersection points modulo 2 is called the mod 2 intersection number of path ab with respect to X and is denoted by $I_2(ab, X)$.

Several observations can be made concerning a given solid S with boundary $\partial S$ and n half spaces $h_i \equiv (f_i \geq 0)$, i=1, . . . ,n:

For every pair of points $a \in S$, $b \in S$, and any transversal path ab, $I_2(ab, \partial S)=1$.

Points $a,b \notin (f_i = 0)$ are separated by a half space $h_i$ iff $I_2(ab, (f_i = 0))=1$, whenever an arbitrary path ab and set $(f_i =0)$ intersect transversely.

For any two points a and b, all paths ab are equivalent in the sense of having the same intersection numbers $I_2(ab, \partial S)$ and $I_2(ab, (f_i=0))$.

On the other hand, some paths can be more accommodating than others. For example, straight lines are convenient because the degree of a polynomial $f_i$ determines the maximum number of times an arbitrary line can intersect the set ($f_i$=0). In particular, suppose that ($f_i$= 0) is a hyperplane and that ab is a line segment connecting points $a,b \notin (f_i=0)$. The points a and b are separated by $h_i$ iff the line segment ab intersects the hyperplane. As noted above, this property of linear half spaces makes them very attractive for separation properties.

As discussed above, as A and B get closer, it may become more difficult to separate them using linear separators alone. But, if the boundaries of A and B overlap, linear separators may not exist at all. Therefore, according to a preferred embodiment there are constraints on the degree of separating half spaces.

Consider two components A and B of the same canonical intersection term $\Pi_k$, with $A \subset S$ and $B \subset S$. When A and B are far apart, it is always possible, at least in principle, to construct a piecewise linear surface passing between A and B. The linear half spaces induced from this surface will separate all points of A from all points in B. As A and B get closer, the required number of planes in the surface may grow arbitrarily large, and construction of such a polyhedral surface becomes more and more difficult. But no matter how close A and B are, they are always on different sides of the boundary $\partial S$. Therefore, the type of surfaces and edges used in the b-rep of S has a direct relationship to the type of required separators.

Two sets A and B are said to touch each other if $\partial A \cap \partial B \neq \phi$. Components A and B of the same canonical intersection term $\Pi_k$ cannot touch along a two-dimensional surface because they would be separated by the half space associated with the surface. Thus, if A and B touch each other, they must do so at a finite set of points or along some curve.

If c is a point where A and B touch, every neighborhood of c contains points $a \in A$ and $b \in B$. Hence, the boundary of any half space separating points of A and B in the vicinity of c must contain the point c. Suppose now that A and B touch along a curve C that is formed by an intersection of some two surfaces. It follows that C must lie entirely in the boundary of any separator. The degree of the intersection curve C places the lower bound on the degree of any such separator. Here, degree of the curve C means the degree of the real irreducible algebraic variety W containing C. Intuitively, deg(W) is the number of times W can be intersected by a hyperplane.

THEOREM 1. Let H be a set of half spaces of degree k, and let components A and B of the same canonical intersection term $\Pi_k$ touch along a curve C, formed by intersection of two half spaces in H. Then the degree of C is $\leq k^2/2$. Proof for Theorem 1: By assumption, the neighborhood of any point $c \in C$ must contain points $a \in A$ and $b \in B$. Pick such points a and b, and consider the path acb. C is an intersection of two surfaces U and V of degree k, and by assumption, a and b are not separated by half spaces associated with U and V. Hence, perturbing the path ab yields a transversal intersection of ab and U (or V) such that $I_2$ (ab, U)=$I_2$ (ab, V)=0. In other words, U and V each intersect the patch acb at the point c with even multiplicity. But then U and V intersect along the curve C with even multiplicity. By Bezout's theorem, the product of the degree and the multiplicity of the intersection of U and V cannot be greater than the product deg(U) deg(V). Hence, the degree of C is less than or equal to deg(U) deg(V)/2= $k^2/2$.

Whenever two components A and B of the same canonical intersection term touch along an edge in the boundary of $\partial S$ of a solid S, Theorem 1 can be used to estimate the lowest possible degree of the required separator. Specifically, since U and V intersect along C with even multiplicity m>1, U and V intersect with $G^{m-1}$ continuity along C. Any half space locally separating points of A and B must contain C and must intersect both U and V along C either transversely or with an odd multiplicity greater than one. Since the degree of U and V is k and the degree of C could be as high as $k^2/2$, the degree of the required separating half space is $\geq k/2$.

For this reason, solids whose boundaries contain nonplanar edges may require nonlinear separators in the vicinity of such edges. Once the separation in the vicinity of the edges is achieved, a sufficient set of linear separators (whose boundaries are planes) can be found for any solid S.

However, solids whose boundaries contain only planar edges will first be considered. Every edge of such solids lies in some plane. It will be shown that a sufficient set of linear separators exists for any such solid S. It should be understood that in two dimensions, "faces" are one-dimensional curve segments, and "edges" correspond to end points, which are always planar. The following result is the key to the corresponding boundary-based construction:

THEOREM 2 (Face Separation). Let S be a solid, ($Q_i$) a set of faces in $\partial s$, and $H_b = \{h_i\}$ a set of natural half spaces induced from these faces. Suppose that the interior of every face $Q_i$ is separated from the rest of the half space surface, $R_i \equiv \partial h_i - Q_i$, by a family of linear half spaces $G_i$ (i.e., for all $g \in G_i$, $\partial g$ is a hyperplane). Then S is describable by $H_b \cup H_s$ with $H_s = \cup_i G_i$. Proof for Theorem 2: Consider any two components $A \supseteq iS$ and $B \subseteq eS$ in the decomposition of space by $H_b$ that are not separated by $H_b$. It is always possible to pick two points $a \in A$, $b \in B$, such that the line segment ab intersects $\partial S$ and $\partial h_i$, $i=1, \ldots n$, transversely and does not cross any edges. Then $I_2(ab, \partial^*[S]) = 1$, which implies that there exists a face $Q_i$ that is intersected by ab an odd number of times. By assumption, a and b are not separated by $h_i \in H_b$, the natural half space induced from $Q_i$; hence, $I_2(ab, \partial h_i) = O$, and ab intersects $\partial h_i$ and even number of times. Thus, the segment ab intersects both the interior of $Q_i$ and $R_i = \partial h_i - Q_i$. But the interior of $Q_i$ and $R_i$ are separated by a family of linear half spaces $G_i$, and so ab must intersect the planar boundary of some separator in $G_i$. It follows that a and b are also separated by $G_i$. Hence, any two components $A \subseteq iS$ and $B \subseteq eS$ are separated by either $H_b$ or $H_s = \cup_i G_i$. By the describability theorem, S is describable by $H_b \cup H_s$.

The assumption that $G_i$ is a set of linear separators is crucial to the proof, because a surface (g=0) associated with a nonlinear half space $g \in G_i$ could be intersected by the line segment ab more than once. Thus, the conditions of the face separation theorem require that all faces $Q_i$ intersect on planar edges. For every such face $Q_i$, there exists some polyhedral (piecewise linear) surface passing through its edges, and so the interior of $Q_i$ can be separated from the rest of the surface at least in principle. Therefore, for any solid S whose boundary $\partial S$ contains only planar edges, there exists a sufficient set of linear separators.

In two dimensions, a sufficient set of linear separators exists for any solid. Although planarity of edges is a significant limitation for three-dimensional solids, there are many geometric objects that naturally satisfy this requirement. Finally, the conditions in Theorem 2 are sufficient but not necessary for the describability of solid S.

A sufficient set of linear separators can also be constructed for solids whose faces lie in convex surfaces and intersect on planar edges. Specifically, when all faces of the b-rep lie in convex surfaces and are bounded by planar curves, with the system and method of the present invention it is easy to construct a sufficient set of O(n) linear separators.

Assume now that the boundary of a solid $\partial S$ contains only planar edges and give a sufficient construction required by Theorem 2 in a restricted but common situation. Specifically, suppose that every natural half space $h_i \in H_b$ is a convex set. Well known theorems in differential geometry state various sufficient conditions on $\partial h_i$ (e.g., the Hadamard theorem and its various generalizations). For example, $h_i$ is a convex three-dimensional set whenever $\partial h_i$ is a connected surface whose Gaussian (total) curvature $k \geq 0$ and $k > 0$ for at least one point $p \in \partial h_i$. Call $h_i$ a convex half space and $\partial h_i$ a convex surface (or curve). If a face Q is a subset of a convex surface and is bounded by m planar edges, the construction described below separates the interior points of Q from the rest of the surface using only O(m) linear separators.

First, consider a simply connected (without holes) face Q. Recall that faces and edges of a solid S are topological p-dimensional polyhedra, with p=2 and p=1, respectively. In other words, for any face or edge X there exists a triangulation (K,$\phi$) of X, where K is an abstract p-dimensional simplicial complex and where $\phi$ is a homeomorphism with X=$\phi$(K).

The boundary of Q is a loop of m edges that is topologically a one-dimensional simplicial complex L containing m 1-simplexes. L can be also viewed as a graph (a cycle) with m node that can be easily triangulated in many different ways. As a result, a two-dimensional complex $K_0$ containing m−2 triangles (2-simplices) is obtained. Now define a map $\phi_0$ that embeds every 2-simplex in $K_0$ as a planar triangle $v_i v_j v_k$ in $E^3$ through some three vertices of the face Q. The pair ($K_0, \phi_0$) is a loop triangulation of the face Q.

Informally, construction of a loop triangulation of Q amounts to subdividing the set of vertices of Q into adjacent triples and associating a planar triangle with every triple of vertices. Note that the planar triangle $v_i v_j v_k$ cannot intersect the surface $\partial h$ anywhere except at the three vertices, because $\partial h$ is a convex surface, but different triangles could penetrate each other. Thus, $\phi_0(K_0)$ is a piecewise linear triangulated surface with possible self-intersections, constructed by unionizing all the planar triangles in the loop triangulation. Loop triangulations are easy to construct by picking any vertex on the face Q and by traversing the vertices of Q along the loop, taking three vertices at a time.

By assumption, every edge of Q lies in some plane. In addition, each triangle in a loop triangulation defines a plane through some three vertices of the face Q. Every plane defined by an edge or a triple of vertices is a boundary of a linear half space g. Let G denote the collection of all such linear half spaces for a given face Q. Then, as required by the conditions of Theorem 2, G separates the interior of Q from the rest of the surface containing Q.

THEOREM 3. Suppose that h is a convex half space, a simply connected face $Q \subset \partial h$ is bounded by n planar edges, and ($K_0, \phi_0$) is a loop triangulation of Q. Let G be the set of linear half spaces associated with the set of planes: (1) containing every curved edge of Q, and (2) containing every triangle in $\phi_0(K_0)$. Then G separates the interior of Q from the rest of the surface $R \equiv \partial h - Q$. Proof for Theorem 3: If the number of edges $m \geq 2$, the proof is trivial. Therefore, assume that $m \geq 3$. Let ($K_1, \phi_1$) be a triangulation of a face Q. Each planar segment bounded by a curved edge $E_i$ and a chord $v_i v_j$ can also be triangulated. So let ($K_2, \phi_2$) be a triangulation of the union of all such planar segments; that is, $\phi_2(K_2)$ is a union of all such planar segment on the face Q. "Glue" the three abstract complexes $K_0$, $K_1$, $K_2$ into a single abstract complex K by requiring that simplexes x =y whenever $\phi_i$ (x)=$\phi_j$ (y) , i≈j, i, j=0, 1, 2. By construction, K is an abstract closed surface or a 2-manifold. A continuous map $\psi$ of manifold into Euclidean space is a topological immersion if each point of the manifold has a neighborhood mapped homeomorphically onto its image by $\psi$, i.e., the image is allowed to have "self-intersections". Now construct an immersion $\psi K \rightarrow E^3$, $\phi_0$ (x), if $x \in K_0$, $\phi_1(x)=\phi_1(x)$, if $x \in K_1$, $\phi_2(x)$, if $x \in K_2$ that partitions $E^3$ into a finite number of connected components $\{C_1, C_2, \ldots C_k\}$. Intuitively, $\psi(x)$ is a possibly self-intersecting surface "glued" from the three pieces: the original face $Q=\psi_1(K_1)$, the union of all planar triangles in the loop triangulation $\psi_0(K_0)$, and the union of all planar segments bounded by edges and their respective chords $\psi_2(K_2)$. It is important that all points of $\psi_0(K_0)$ and $\phi_0(K_0)$ and $\phi_2(K_2)$ lie in the planes through the edges of Q or triplets of vertices of Q, as assumed in the theorem hypothesis. It follows that the union $\phi_0(K_0) \cup \phi_2(K_2)$ is a polyhedral surface that separates the interior of Q from the rest of the surface R.

Consider two arbitrary points q in the interior of Q and r∈R. The straight-line segment qr must intersect the surface $\psi(K)$ at some point x lying in one of the constructed planes. Since h is a convex set, the line segment gr is completely contained in h and intersects ∂h only at the points q and r. Thus, there exists a point q'∈h lying on qr in the neighborhood of the point q. Consider the path q'qr, where gr is any path restricted to the surface ∂h and intersecting some edge $E_i$ of Q an odd number of times. the path q'qr also intersects the plane through $E_i$ and the surface $\psi(K)$ every time it intersects $E_i$. Furthermore, this path cannot interest $\psi(K)$ anywhere else, because $\psi(K) \cap R = \phi$. It follows that point q' and r belong to different connected components $C_i$ and $C_j$. Hence, the straight-line segment q'r must intersect the surface $\psi(K)$ at some point x lying between q and r, but x cannot be a point on the face Q. Therefore, $x \in \phi_0(K_0)$ or $x \in \phi_x(K_2)$, and so x must lie on one of the defined planes. Thus, q and r (and, therefore, the interior of Q and R) are separated by one of the linear half spaces in G.

Theorem 3 generalizes to faces with holes in a straightforward fashion. Suppose H is a hole (i.e., part of the surface ∂h) in the face Q satisfying the conditions of Theorem 3. Using the theorem the interior of H is separated from the rest of the surface ∂h−H and, hence, from the face Q itself. Thus, every loop of edges on the face Q can be treated independently from other loops. Repeating the separation for every loop of edges on the face Q, obtains a set of linear separators that is sufficient to separate the interior of Q from the rest of the surfaces ∂h−Q.

To summarize, given a solid S such that all n faces in its b-rep lie in convex surfaces and all edges lie in planar curves, Theorem 3 specifies how to construct a sufficient set of O(n) separators. Namely, this set includes all linear half spaces induced from all curved planar edges and all loop triangulations in the b-rep of S. Since the interiors of all faces are separated from the rest of the surfaces containing them, S is describable by the face separation Theorem 2.

As a final note, consider these results with respect to two-dimensional solids. Convex surfaces in $E^3$ become convex edges in $E^2$, and the requirement of planar edges in $E^3$ is always satisfied in $E^2$. An edge loop in $E^3$ reduces to a pair of vertices, and the simplest loop triangulation corresponds to putting the chord between them.

A sufficient set of linear separators can also be constructed for solids bounded by general quadric surfaces. Specific constructions will now be discussed for several common situations.

Let S be a three-dimensional solid, such that the set of natural half spaces $H_b$ induced from ∂S contains at most quadric half spaces; that is, boundary $∂h_i$ of every $h_i \in H_b$ is a polynomial surface ($f_i=0$) of at most the second degree.

If components A and B of the same canonical intersection term $\Pi_k$ do not touch at all or touch at a finite set of points, a polyhedral surface P can be constructed such that any line segment ab, a∈A, b∈B would intersect P. In either case, there exists a set of linear half spaces (whose boundaries are planes defining P) that separate A and B. The only other possible situation arises when components A and B touch along a curve C. Then the boundary of any half space separating A and B must contain the curve C. But Theorem 1 implies that the degree of such a curve C is at most $k^2/2 = 2$, since k=2. Therefore, C is a planar curve, and the plane containing C is the boundary of a linear half space separating points of A and B in the neighborhood of points on C. Thus, under all conditions, the following must be true:

If S is a solid, and $H_b$ is a set of quadric half spaces induced from ∂S, then there exists a finite set of linear separators $H_s$ such that S is describable by $H=H_b \cup H_s$.

On the other hand, the number of needed linear separators can grow arbitrarily large, and the construction of such a set $H_s$ of linear separators can be difficult. Below, some separator constructions are briefly described that were useful in the implementations of the present invention.

When the boundary ∂S of a solid S contains only planar edges lying in quadric surfaces, the face separation Theorem 2 states that a sufficient set of linear separators may be constructed by separating the interior of every face $Q_i$ in ∂S from the rest of the quadric surface $∂h_i−Q_i$. In particular, the techniques described in Theorem 3 could be used, but they require $h_i$ to be a convex set. Clearly, some of the quadric half spaces are not convex.

But a hyperboloid of one sheet and a hyperbolic paraboloid are the only two quadric surfaces with the negative Gaussian curvature. For the rest of the quadric surfaces, the Gaussian curvature is greater or equal to zero, and their connected sheets bound convex subsets of $E^3$. Thus, the construction of Theorem 3 can be applied, once such components are separated by an additional set of half spaces. The two sheets of a quadric $∂h_i$ are easily separated by a linear half space associated with one of the principal planes of the quadric surface $∂_i$. Principal planes of a quadric $∂h_i$ are also its planes of symmetry and can be determined by a simple procedure involving not much more than finding the roots of a characteristic cubic equation.

Suppose now that ∂S contains a nonplanar edge $E_j$. Theorem 1 implies that no components A and B of any canonical intersection term $\Pi_k$ can touch along $E_j$, and so it should be a simple matter to separate such A and B. But, because the boundaries ∂A and ∂B can be arbitrarily close to each other, this may not be a simple task. It may be difficult to construct a sufficient set of separators a priori, without computing ∂A and ∂B. Nor can the face separation Theorem 2 be used, because the interior of a face $Q_i$, bounded by nonplanar edges cannot be separated by a set of linear separators (since edges must lie in the boundaries of separators).

On the other hand, the conditions of Theorem 2 are stronger than necessary: The face $Q_i$ need only be separated from some subset of the remaining surface $R_i$. Observe that whenever the interior of $Q_i$ is separated from some subset of $R_i$ by linear half spaces, all edges of Q are also separated from the subset by the same linear separators. Thus separating every edge from the rest of the intersection curve is a reasonable heuristic approach to separation which is supported by a prototype system employing the present invention and involving general second-degree surfaces.

Figure 5:
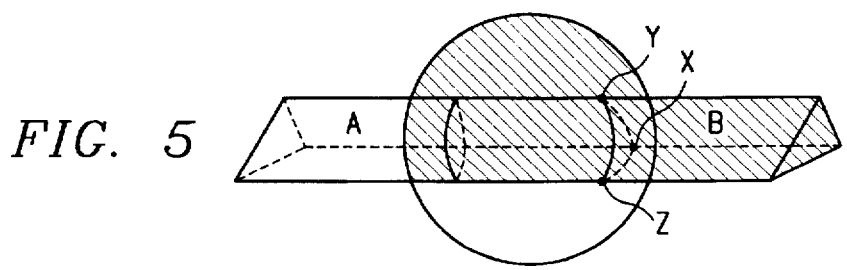
FIG. 5 is a schematic three-dimensional representation of a solid similar to that of FIG. 3.

As an illustrative example, FIG. 5 is a schematic drawing of a three-dimensional object similar to that of FIG. 3: namely, a sphere intersecting a beam with triangular cross-section; the beam and sphere intersect in three curved edges.

The desired object is shaded and consists of the sphere plus one end of the beam. As with FIGS. 2a and 3, the connected components cannot be described separately from each other by use of the natural half spaces induced from the b-rep.

Before considering the solution to this particular example, consider now FIGS. 6a and 6b, which are flowcharts of a preferred embodiment of the present invention. The boundary representation is input (Block 610) to the system according to the present invention where every face of the b-rep is subjected to a number of steps. At Block 620 the natural half spaces $H_B$ are defined by and induced from the boundary representation input. Separator(s) $H_S$ are constructed (Block 630) as will further be described below. The system at Block 640 determines the CSG representation using decomposition based on the union of $H_B$ and $H_S$ and then minimizes, if necessary, the representation at Block 650. This latter step reduces the number of Boolean operators. The CSG representation is then output from the system for use in an application such as image processing or further solid modelling.

Turning now to FIG. 6b, a more detailed flowchart of Block 630 of FIG. 6a is shown. At Block 632 the system according to the present invention constructs separating surfaces through triples of vertices. This step is very similar to what was described above in connection with two-dimensional solids, namely connecting the two end points with a half plane. However, in three-dimensional space, one requires three points to define a planar surface, not two. The system then constructs separating surfaces through any planar edges (Block 634) and lastly constructs separating surfaces to separate any nonplanar edges (Block 636).

Return now to FIG. 5. To obtain a CSG representation of this object from its b-rep, and to solve this problem so it can be computed automatically, the steps discussed with respect to FIGS. 6a and 6b are repeated for every face of the b-rep. Therefore, during the first step the system constructs separators, in this case preferrably separating planes, through the triple of end points (vertices; designated X, Y, and Z in FIG. 5) of the object's edges. Thus the first step is sufficient in this particular example. The system would look for planar edges and nonplanar edges to construct additional separating surfaces through, but these steps would yield no separators for the example depicted in FIG. 5.

But in general such might not be the situation. Assume now that the triangular beam of FIG. 5 is actually a cylindrical beam. In such a case, the system will construct no separators as a result of (Block 632) because there are no vertices; the connected components have round edges (circles)—no edges that meet in points. The system continues to Block 634 (separator through every planar edge) and this time constructs separators because when a cylinder intersects a sphere (assuming exact alignment), there are circles which are planar edges. No separators result from the last step of separating nonplanar edges (Block 636) and the system then proceeds to determine the CSG representation based on the induced natural half spaces and the constructed separating surfaces.

Assume for now that the triangular beam of FIG. 5 is instead a cylindrical beam which intersects with the sphere, and which is not exactly aligned through the center of the sphere. Instead of the circles achieved in the previous example, now the intersecting edges are fourth degree algebraic curves. No separators will be constructed during the first two steps of FIG. 6b because there are no vertices and there are no planar edges. Proceeding to Block 636, the system constructs one or more separating surfaces to separate the nonplanar edge from the rest of the curve on the surface. This yields something which looks like two distinct connected curves, but mathematically both connected components are part of the same curve, each of which will fall on opposite sides of the separating surface.

There are at least two preferred ways to separate these nonplanar components. The first is constructing a tangent separating surface (preferrably a plane) and the other is constructing a polar plane as a separating surface. Polar planes work quite well for second degree surfaces (conics) while tangent planes work for both second and higher degree objects.

In generating the former, one constructs the separator tangentially as close as possible to the nonplanar edge without crossing it. Specifically, achieving separation when nonplanar edges appear in the boundary of S involves isolating the nonplanar edge from the rest of the intersection curve. Suppose $C_{ij}$ is a nonplanar intersection curve of two convex quadric halfspaces, $h_i$ and $h_j$. Let $E_{ij}$ be the edge of solid S on curve $C_{ij}$ bounded by end points $P_1$ and $P_2$ (we will consider the case when $E_{ij}$ is closed, subsequently). Further, let $R_{ij}$ be the rest of the curve $C_{ij}$ not on $E_{ij}$, $R_{ij}=h_i*h_j-E_{ij}$. One or more planes are constructed tangent to edge $E_{ij}$ and these planes are good separating halfspaces.

Suppose $C_{ij}$ is a fourth degree, nonplanar intersection curve. A plane T containing $P_1$ and $P_2$ and one other point on $E_{ij}$, $P_t$ can be constructed, such that T is tangent to $E_{ij}$ at $P_t$. Thus the tangent plane T cannot intersect curve $C_{ij}$ again and tangent plane T separates edge $E_{ij}$ from the rest of curve $R_{ij}$. Even in the case where curve $C_{ij}$ has multiple components, this construction achieves the desired separation.

If $E_{ij}$ is a closed curve, the two end points $P_1$ and $P_2$ are arbitrarily selected and a plane tangent to each piece is constructed. Another approach using a polar plane instead of two tangent planes through $P_1$ and $P_2$ achieves the desired separation using a single plane.

Now suppose $E_{ij}$ is a cubic nonplanar edge with end points $P_1$ and $P_2$. $P_1$ and $P_2$ determine a line $L_{12}$. Construct a second line $Lt_1$ that is tangent to edge $E_{ij}$ at $P_1$. Lines $L_{12}$ and $Lt_1$ determine a plane $T_1$ that separates $E_{ij}$ from $R_{ij}$ locally at $P_2$. Therefore, the intersection of $T_1$ and $E_{ij}$ at $P_2$ must be transverse; otherwise, there would be two double points at $P_2$, which is impossible.

Construct another line $L_{t2}$ that is tangent to edge $E_{ij}$ at $P_2$. Lines $L_{12}$ and $L_{t2}$ determine a second plane $T_2$ that separates $E_{ij}$ from the rest of the curve $R_{ij}$ locally at $P_1$. Planes $T_1$ and $T_2$ together separate edge $E_{ij}$ from the rest of the curve $R_{ij}$.

The set of separating planes constructed using the tangent planes described above separates all components A and B, and works especially well for convex quadrics.

The other preferred way to separate nonplanar edges of connected components is to look at the object mathematically as if it were a great distance away. In the present example, if the sphere is viewed from this distance, its silhouette is perceived at the maximum extent of the sphere. If a separating plane is put through the sphere's silhouette (polar plane) it will also separating the nonplanar edges of an object.

Specifically, this second approach uses polar planes containing the silhouette edges of halfspaces as separating halfspaces. It turns out that the polar plane of a quadric with respect to a point contains the silhouette edges of the halfspace. If the point is inside the halfspace, silhouette edges are not useful, but in the theory of poles (the point) and polars (the plane), there is a "conjugate" point (and plane) which are useful.

Thus, a point is defined for every halfspace in the domain. The following points are preferred based on surface type (referred to as "special" points below):

1. Sphere—center point
2. Cylinder—point at infinity on axis
3. Cone—apex point
4. Plane—point at infinity (axis undefined, however)

The plane can be a problem since an infinite number of points are available "at infinity" however the present invention preferably employs b-rep edge information to select one or several appropriate points.

Look at the pair of halfspaces forming each edge in the b-rep. Let $PP(P_n, h_m)$ represent the polar plane of point $P_n$ with respect to halfspace $h_m$ (one may need to consider the conjugate point/plane). This results in the following two polar planes for each edge formed by $h_1$ and $h_2$—$PP(P_1, h_2)$ and $PP(P_2, h_1)$. The end points of the edge are used to determine direction when a plane is involved.

This technique may eliminate the need to put planes through each triplet of vertices. It also handles planar and nonplanar edges correctly and is extendable to other quadrics (poles and polars).

The above innovations have enabled a successful implementation of an experimental b-rep→CSG conversion system that converts natural quadric b-reps in Parasolid® (registered trademark and product of Electronic Data Systems Corporation) to efficient CSG representations in PADL-2. A schematic diagram of a system 700 employing the present invention is shown in FIG. 7.

For the sake of discussion herein, system 700 is capable of modelling a desired object, and incorporates at least one workstation or client/server 710 and/or at least one mainframe computer 720. The exact composition of such workstation 710 or mainframe 720 is well-known and will not be described herein. There is a CAD/CAM system of the user's choice, such as Unigraphics® (registered trademark and product of Electronic Data Systems Corporation), residing on said workstation 710 and/or mainframe 720, depending upon the particular configuration of system 700. Such CAD/CAM systems are well-known in the art and will not be further described herein. Moreover, while the current prototype resides on a VAX (trademark and product of Digital Equipment Corporation) computing system, it should be understood that the system and method of the present invention could instead employ other computing systems from microprocessors to mainframes.

System 700 provides input to modelling program 750 by accessing memory 730 via bus 740. It should be understood that a number of commercially available products could be used to generate an object representation used herein as input. The representation is provided as input to the definition editor 760 of geometric modelling program 750 which in turn provides such representation to either conversion program 770 (b-rep to CSG) or to conversion program 780 (CSG to b-rep) depending upon the application. Since there are a variety of systems and methods to convert from CSG to b-rep, many of which are commercially available in various geometric modelling systems, converter 780 will not be further described. The output of converters 770,780 is provided to applications 790,795,800. These applications could entail further modelling, object analysis, image processing, etc.

Considering specifically converter 770, for a two-dimensional object, perhaps a piece of sheet metal, the b-rep input is a list of lines and arcs which bound and describe the object. The list normally includes the X,Y coordinates of all the corners, and the radius of any arcs and is kept in a computer file. Such a file could be generated by any number of commercially available geometric modeling systems such as Unigraphics® and in fact, it can be entered manually on the keyboards of workstation 710 or mainframe 720.

In three-dimensions the b-rep input is not as simple because a description of a three dimensional object is needed. Therefore, instead of a list of lines and arcs, one could employ a solid or geometric modelling system such as Parasolid® to generate a list of the faces of the solid which describes the natural half spaces. It should be understood that a number of other commerically available products that could be used to generate the boundary representation input.

Regardless of object dimension of the input, converter 770 preferrably generates a human readable text listing as output on a terminal or in a file of a valid CSG for a specific application 790,795,800. It can also generate a text listing to be provided to a PADL-2 CSG solid modelling system. Numerous CAD/CAM vendors have built products on PADL-2. Moreover the converted description found in the text listing for a two-dimensional object could be swept into a three-dimensional object.

Figure 8A:
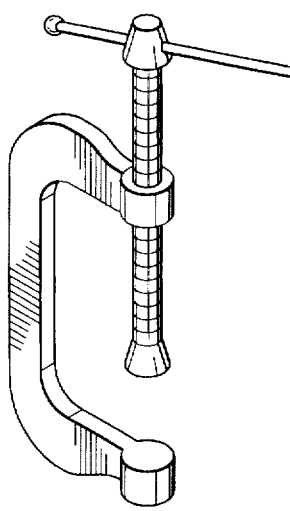
FIGS. 8a–8e are schematic illustrations of a C-clamp assembly generated by a system according to the present invention.
Figure 8B:
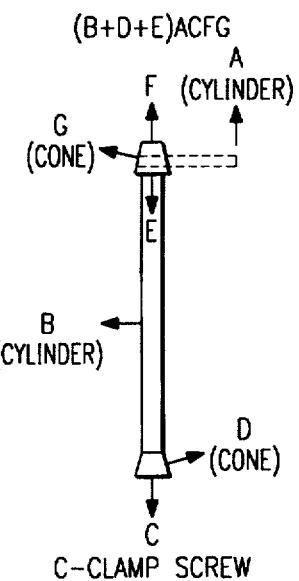
Figure 8C:
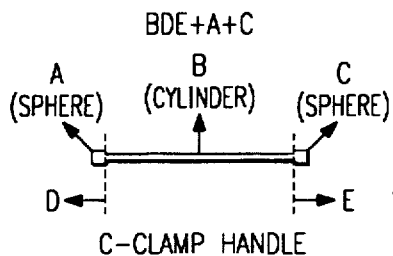

A C-clamp assembly, shown in FIGS. 8a–8e, is a simple example three-dimensional solid object computed by the system of the present invention. This example shows a three piece C-clamp assembly (FIG. 8a) which consists of three independent parts: a C-shaped body (FIGS. 8d, 8e), a threaded screw for tightening the C-clamp (FIG. 8b), and a handle (FIG. 8c). The system of the present invention took as its input a boundary representation of each of these objects, as constructed using Unigraphics® and Parasolid®, and computed the CSG representation for each of those objects, shown above each part in bold print. This representation amounts to the Boolean expression that represents the particular object. Thus the CSG expression for the C-clamp screw is (B+D+E)ACFG, while the CSG expression for the C-clamp handle is BDE+A+C, based on the boundary representations shown in the respective drawings.

Figure 8D:
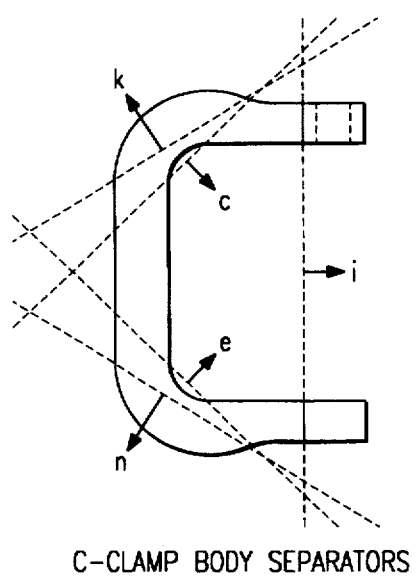
Figure 8E:
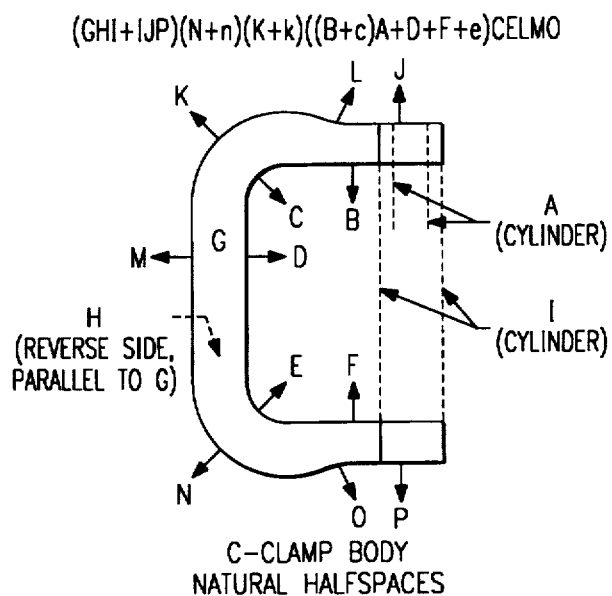

Looking now at FIGS. 8d and 8e which show the separators and the natural half spaces induced from the boundary representation of the C-clamp body, respectively. The dotted lines are the separators required for the representation of the body of the C-clamp in CSG. The natural half spaces, $H_B$s, are the uppercase letters in the Boolean CSG expression, and the lowercase letters are the separators, $H_S$s. Thus the C-clamp body cannot be described unless the five separators indicated are unioned with the natural half spaces. It can also be seen that by using the present invention, one can define real objects using standard (as opposed to regularlization) operators thereby making a whole range of mathematics developed over the centuries available to solid modeling problems.

The program listing (found in the Appendix) demonstrates an embodiment of the invention contained therein. It should be understood by those skilled in the art that such is provided only by way of illustrative example and should in no manner be construed to limit the invention as described herein. Numerous modifications and alternate embodiments of the invention will occur to those skilled in the art. Accordingly, it is intended that the invention be limited only in terms of the following claims:

```
/*
** hsparm.h - parameter insert file
** NOTE: c version of F77 insert file HSPARM.INS
**
** revisions
**    rv  date       who  reason
**    00  10-jan-90  dlv  initial implementation
**
*/
#define MAXNV    26
#define MAXHS    (4*MAXNV)
#define MAXEXP   (2*MAXHS)
#define MAXCPT   31000
#define MAXTRM   1000
#define MAXCLU   MAXTRM
#define MAXPRS   20000
#define IN       1
#define ON       0
#define OUT      -1
#define ACTIVE   1
#define INACT    0
#define INTSCT   32767
#define UNION    32766

/* end of 'hsparm.h' */
/*
** hs3com.h - insert file for brep -> CSG conversion
**
** revisions:
**    rv  date       who  reason
**    00  10-jan-90  dlv  initial implementation
**    01  22-may-90  dlv  revised curve storage
*/ define NULL 0

/* halfspace data structure */
typedef struct hs
    {
    struct hs    *next_hs;     /* pointer to next 'hs'                 */
    int          surf_tag;     /* Parasolid surface tag                */
    int          surf_tag1;    /* Parasolid surface tag, offset 1      */
    int          surf_tag2;    /* Parasolid surface tag, offset 2      */
    int          equiv_geom;   /* Equivalent to prior surface          */
                               /*    0=no, 1=yes                       */
    } HS;

HS *head_hs=NULL;              /* pointer to first 'HS'                */
int hs_count = 0;              /* number of items in 'hs' list         */
int hs_nat;                    /* number of natural halfspaces         */

/* list of offset surfaces */
int nsurf;                     /* number of surfaces, nsurf = 2*hs_count */
int *slist;                    /* array of Parasolid surface tags      */
                               /* 'slist' is a dynamically allocated   */
                               /*    one dimensional array             */

/* surface-surface intersection data structures */

/* ssint_avail, ssint_n, and ssint_clist are dynmically allocated, two */
```

(C) Copyright 1993 Electronic Data Systems Corporation. The copyright owner has no objection to the facsimile reproduction by anyone of the patent disclosure, as it appears in the Patent and Trademark Office patent file or records, but otherwise reserves all copyright rights whatsoever.

```
/* dimensional arrays, size = nsurf x nsurf. Each pair of  ofset    */
/* surfaces from 'slist' is stored in location [i*nsurf+j], where  */
/* i and j are the indices of the surfaces in the 'slist' array.   */ int *ssint_avail;      /* intersection data available, 0=no, 1=yes */
   int *ssint_n;          /* number of intersection curves            */
   int *ssint_clist;      /* Parasolid list tag to a list of curves   */

/* characteristic point data structure */
typedef struct cpt
   {
      struct cpt   *next_cpt;   /* pointer to next 'cpt'                       */
      double       xyz[3];      /* point coordinates                           */
      int          class;       /* B-rep classification (-1:out,0:on,1:in)     */
      int          *hsclass;    /* Class wrt each halfspace (an array)         */
   } CPT;

CPT *head_cpt=NULL;           /* Pointer to first cpt */

/* intersection box */
double int_box[6];

/* b-rep solid body tag */
int brep_body_tag;

/* Parasolid version number */
int parasolid_version;

/* end of hs3com.h */
/*
** eps.h - insert file for floating point constants
**
** revisions
**    rv  date       who   reason
**    00  10-jan-90  dlv   initial implementation
**
*/
#define zero_eps    1.0e-10
#define t_eps       1.0e-8
#define dist_eps    1.0e-6
#define line_const  100.0
#define box_size    300.0
#define off_dist    0.001

/* end of 'eps.h' */
C *********************************************************
C *** INSERT FILE FOR HALF SPACE DATA
C *********************************************************
C
C REVISIONS
C   RV  DATE       WHO  REASON
C   01  25-MAY-90  DLV  ADD 'Z' COORDINATE TO CPT
C
C *** PARAMETERS
#INCLUDE 'HSPARM.INS'
C
C *** ========== HALF SPACE DATA ==========
C
C *** TOTAL NUMBER OF HALF SPACES
      INTEGER HSNUM
```

```
C
C *** HALF SPACE STATUS
C ***    HSSTAT(N)=0, INACTIVE
C ***           =1, ACTIVE
C ***           >0, ACTIVE LEVEL NUMBER
      INTEGER HSSTAT(MAXHS)
C
C *** HALF SPACE COEFFICIENTS
C ***    FOR LINES, Ax+By+C=0      FOR CIRCLES x^2+y^2+Dx+Ey+F=0
C ***        HSCOEF(N,1)=A             HSCOEF(N,1)=D
C ***        HSCOEF(N,2)=B             HSCOEF(N,2)=E
C ***        HSCOEF(N,3)=C             HSCOEF(N,3)=F
      REAL HSCOEF(MAXHS,3)
C
C *** HALF SPACE TYPE
C ***    HSTYPE(N)=-1, CONCAVE ARC
C ***            = 0, PLANE (f(x,y)<0)
C ***            = 1, CONVEX ARC
      INTEGER HSTYPE(MAXHS)
C
C *** HALF SPACE NAME
      CHARACTER*2 HSNAME(MAXHS)
C
C *** ========== CHARACTERISTIC POINT DATA ==========
C
C *** TOTAL NUMBER OF CHARACTERISTIC POINTS
      INTEGER CPNUM
C
C *** CHARACTERISTIC POINT STATUS
C ***    CPSTAT(N)=0, INACTIVE
C ***            =1, ACTIVE
C ***            >0, ACTIVE LEVEL NUMBER
      INTEGER CPSTAT(MAXCPT)
C
C *** (X,Y,Z) COORDINATES OF CHARACTERISTIC POINTS
      REAL CPTX(MAXCPT)
      REAL CPTY(MAXCPT)
      REAL CPTZ(MAXCPT)
C
C *** CHARACTERISTIC POINT CLASSIFICATION
C *** WITH RESPECT TO EACH HALF SPACE
C ***    CPTCHS(N,HS)=-1, OUTSIDE HALF SPACE
C ***              = 0, ON HALF SPACE
C ***              = 1, INSIDE HALF SPACE
      INTEGER CPTCHS(MAXCPT,MAXHS)
C
C *** CHARACTERISTIC POINT CLASSIFICATION
C *** WITH RESPECT TO SWEEP OUTLINE
C ***    CPTCLS(N)=-1, OUTSIDE SWEEP OUTLINE
C ***            = 0, ON SWEEP OUTLINE
C ***            = 1, INSIDE SWEEP OUTLINE
      INTEGER CPTCLS(MAXCPT)
C
C *** ============== COMMONS ==============
C
C *** COMMONS FOR HALF SPACE DATA STRUCTURES
      COMMON /HSCOM/ HSNUM,HSSTAT,HSCOEF,HSTYPE,
     1               CPNUM,CPSTAT,CPTX,CPTY,CPTZ,CPTCHS,CPTCLS
      COMMON /HSCHAR/ HSNAME
      SAVE /HSCOM/,/HSCHAR/
```

```
C
C *** >>>>>>>>>>  END OF HSDATA INSERT FILE   <<<<<<<<<<
C ***********************************************************
C *** INSERT FILE FOR HALF SPACE PARAMETERS
C ***********************************************************
C
C *** PARAMETER FOR MAXIMUM NUMBER OF VERTICES
      INTEGER MAXNV
      PARAMETER (MAXNV = 26)           ! A-Z
C
C *** PARAMETER FOR MAXIMUM NUMBER OF HALF SPACES
      INTEGER MAXHS
      PARAMETER (MAXHS = 4*MAXNV)      ! A-Z,a-z,+OTHERS
C
C *** PARAMETER FOR MAXIMUM EXPRESSION LENGTH
      INTEGER MAXEXP
      PARAMETER (MAXEXP = 2*MAXHS)
C
C *** PARAMETER FOR MAXIMUM NUMBER OF CHARACTERISTIC POINTS
      INTEGER MAXCPT
C     PARAMETER (MAXCPT = 20000)
      PARAMETER (MAXCPT = 31000)
C
C *** PARAMETER FOR MAXIMUM NUMBER OF TERMS
      INTEGER MAXTRM
      PARAMETER (MAXTRM = 1000)
C
C *** PARAMETER FOR MAXIMUM NUMBER OF CLUSTERS
      INTEGER MAXCLU
      PARAMETER (MAXCLU = MAXTRM)
C
C *** PARAMETER FOR MAXIMUM NUMBER OF HALF SPACE DEFICIENT PAIRS
      INTEGER MAXPRS
      PARAMETER (MAXPRS = 20000)
C
C *** SYMBOLIC CONSTANT PARAMETERS
      INTEGER IN,ON,OUT
      PARAMETER (IN=1,ON=0,OUT=-1)
      INTEGER ACTIVE,INACT
      PARAMETER (ACTIVE=1,INACT=0)
      INTEGER INTSCT,UNION
      PARAMETER (INTSCT=32767,UNION=32766)
C
C *** >>>>>>>>>>  END OF HSPARM INSERT FILE   <<<<<<<<<<
C ***********************************************************
C *** INSERT FILE FOR PROGRAM DEBUG AND TRACE
C ***********************************************************
C
C *** PARAMETER FOR TRACE LEVELS
      INTEGER SHORT,MEDIUM,LONG
      PARAMETER (SHORT=1,MEDIUM=2,LONG=3)
C
C *** TRACE CONTROL LOGICAL
      LOGICAL TRACE(3)
C
C *** TRACE COMMON
      COMMON /TRCCOM/ TRACE
      SAVE /TRCCOM/
C
C *** >>>>>>>>>>  END OF TRACE INSERT FILE   <<<<<<<<<<
```

```
#include "insert:eps.h"
#include "insert:hs3com.h"
#include "insert:parasolid_ifails.h"
#include "insert:parasolid_tokens.h"
void allcpts()
/*
** Compute all characteristic points
**
** revisions
**    rv  date        who  reason
**    00  22-may-90   dlv  initial implementation
**    01  29-jun-90   dlv  modified for version 3.0 of Parasolid (INCUCU)
*/
{
int i, j, k, n, n1, n2, n3, n4, one=1, three=3, size;
int curve_tag1, curve_tag2, ifail, intpts, nintpt, equiv_geom;
double bound1[6], bound2[6], xyz[3];
int iparms1, iparms2, incods;
HS *cur_hs;
CPT *cur_cpt;

/* initialize the intersection box */
for (i=0; i<3; i++)
   {
   int_box[i] = -1.0 * box_size;
   int_box[i+3] = box_size;
   }

/* count number of geometrically uniques halfspaces */
nsurf = 0;
for (cur_hs = head_hs; cur_hs != NULL; cur_hs = cur_hs->next_hs)
   {
   if (cur_hs->equiv_geom == 0)
      nsurf++;
   }

/* each halfspace has two offsets */
nsurf = 2 * nsurf;

/* allocate storage for offset surface list */
slist = (int *) malloc(nsurf*sizeof(int));
if (slist == NULL)
   ckifail("allcpts","malloc",1,0);

/* copy offset surface tags into 'slist' */
i=0;
for (cur_hs = head_hs; cur_hs != NULL; cur_hs = cur_hs->next_hs)
   {
   if (cur_hs->equiv_geom == 0)
      {
      slist[i++] = cur_hs->surf_tag1;
      slist[i++] = cur_hs->surf_tag2;
      }
   }

/* allocate storage for surface-surface intersection curve data */
size = nsurf * nsurf;
ssint_avail = (int *) calloc(size, sizeof(int));   /* NULL filled */
ssint_n = (int *) malloc(size * sizeof(int));
ssint_clist = (int *) malloc(size * sizeof(int));
```

```
if ((ssint_avail == NULL) ||
    (ssint_n == NULL)      ||
    (ssint_clist == NULL))
    ckifail("allcpts","malloc",1,0);

/* cylce all triplets of offset surfaces and compute intersections */
/* beginning of 'i' loop, first surface in the triplet */
for (i=0; i<(nsurf-2); i++)
{

/* beginning of 'j' loop, second surface in the triplet */
    for (j=i+1; j<(nsurf-1); j++)
    {

/* intersect surface 'i' and surface 'j' */
        intsurf(i,j);

/* drop to end of 'j' loop if surfaces 'i' and 'j' do not intersect */
        if (ssint_n[i*nsurf+j] == 0)
            continue;

/* beginning of 'k' loop, third surface in the triplet */
        for (k=j+1; k<nsurf; k++)
        {

/* intersect surface 'i' with surface 'k' */
            intsurf(i,k);

/* drop to end of 'k' loop if surfaces 'i' and 'k' do not intersect */
            if (ssint_n[i*nsurf+k] == 0)
                continue;

/* intersect pairs of curves on surface 'i', outer loop */
            for (n1=1; n1<=ssint_n[i*nsurf+j]; n1++)
            {

/* get curve 1 from list of curves */
                GTTGLI(&ssint_clist[i*nsurf+j],&n1,&one,&curve_tag1,&ifail);
                ckifail("allcpts","GTTGLI",ifail,0);

/* intersect pairs of curves on surface 'i', innter loop */
                for (n2=1; n2<=ssint_n[i*nsurf+k]; n2++)
                {

/* get curve 2 from list of curves */
                    GTTGLI(&ssint_clist[i*nsurf+k],&n2,&one,&curve_tag2,&ifail);
                    ckifail("allcpts","GTTGLI",ifail,0);

/* intersect curve 1 and curve 2 */
                    crvendpt(curve_tag1,&bound1[0],&bound1[3]);
                    crvendpt(curve_tag2,&bound2[0],&bound2[3]);
                    if (parasolid_version < 300000)
                        INCUCU(&curve_tag1,bound1,&curve_tag2,bound2,&slist[i],
                            int_box,&intpts,&nintpt,&ifail);
                    else
                        INCUCU(&curve_tag1,bound1,&curve_tag2,bound2,&slist[i],
                            int_box,&intpts,&iparms1,&iparms2,&incods,
                            &nintpt,&ifail);

/* store intersection points into 'CPT' list */
```

```
                  switch(ifail)
                  {
/* curves intersect in zero or more points */
          case 0:
               if (nintpt > 0)
               {
                    for (n3=1; n3<=nintpt; n3++)
                    {
                         n4 = 3*(n3-1)+1;
                         GTRLLI(&intpts,&n4,&three,xyz,&ifail);
                         ckifail("allcpts","GTRLLI",ifail,0);
                         crecpt(xyz);
                    }
                    DELENT(&intpts,&ifail);
                    ckifail("allcpts","DELENT",ifail,0);
                    if (parasolid_version >= 300000)
                    {
                         DELENT(&iparms1,&ifail);
                         ckifail("allcpts","DELENT (iparms1)",ifail,0);
                         DELENT(&iparms2,&ifail);
                         ckifail("allcpts","DELENT (iparms2)",ifail,0);
                         DELENT(&incods,&ifail);
                         ckifail("allcpts","DELENT (incods)",ifail,0);
                    }
               }
               break;

/* coincident curves, ignor */
          case KI_cu_are_coincident:
               break;

/* any other INCUCU failure */
          default:
               ckifail("allcpt","INCUCU",ifail,0);
               break;
                  } /* end of 'switch(ifail)' */
               } /* end of 'n2' inner loop */
          } /* end of 'n1' outer loop */
     } /* end of 'k' loop */
     } /* end of 'j' loop */
} /* end of 'i' loop */

/* number of CPTs */
n = 0;
for (cur_cpt=head_cpt; cur_cpt!=NULL; cur_cpt=cur_cpt->next_cpt)
{
   n++;
}
printf("<%7d> Intersection Points\n",n);

return;
}
#include "insert:hs3com.h"
void BOX(xmin,ymin,zmin, xmax,ymax,zmax)
/*
** Compute min/max box for solid
**
** Output:
**     xmin,ymin,zmin : coordinates of minimum point
```

```
**     xmax,ymax,zmax : coordinates of maximum point
**
** Revisions:
**     rv   date        who   reason
**     00   20-jul-90   dlv   initial implementation
*/
FREAL *xmin,*ymin,*zmin, *xmax,*ymax,*zmax;

{
int ifail;
double enbox[6];

/* get the enclosing box */
ENBXEN(&brep_body_tag,enbox,&ifail);
ckifail("clssol","ENBXEN",ifail,0);

/* move the data into output variables */
*xmin = enbox[0];
*ymin = enbox[1];
*zmin = enbox[2];

*xmax = enbox[3];
*ymax = enbox[4];
*zmax = enbox[5];

return;
}
#include "insert:parasolid_tokens.h"
void ckifail(routine,called_routine,ifail,expected)
/*
** Check if a routine has returned the expected 'ifail'
**
** Input:
**     routine        : name of routine calling 'ckifail'
**     called_routine : name of routine reporting error
**     ifail          : 'ifail' value reported by called routine
**     expected       : expected value
**
** Revisions:
**     rv   date        who   reason for change
**     00   05-jan-90   dlv   initial implementation
**
*/
char *routine, *called_routine;
int  ifail,expected;

{
int selcod,ival,nchars;
char string[256];

if (ifail != expected)
    {
    printf("\n\nerror #%d returned by '%s' when called by '%s'\n\n",ifail,
           called_routine,routine);

selcod = SLERRO;  /* select error routine */
    OULERR(&selcod,&ival,string,&nchars,&ifail);
    printf("KI routine name: %s\n",string);

selcod = SLEREC;  /* select error code mnemonic */
```

```
       OULERR(&selcod,&ival,string,&nchars,&ifail);
       printf("ifail mnemonic: %s\n",string);

selcod = SLEREX;  /* select error explanation */
       OULERR(&selcod,&ival,string,&nchars,&ifail);
       printf("error explanation: %s\n",string);

selcod = SLERAR;  /* select error argument */
       OULERR(&selcod,&ival,string,&nchars,&ifail);
       printf("error argument number: %d, argument name: %s\n",ival,string);

selcod = SLERAI;  /* select error array index */
       OULERR(&selcod,&ival,string,&nchars,&ifail);
       printf("error array index: %d\n",ival);

selcod = SLERLE;  /* select error list entry */
       OULERR(&selcod,&ival,string,&nchars,&ifail);
       printf("error list entry: %d\n",ival);

selcod = SLERTG;  /* select error tag value */
       OULERR(&selcod,&ival,string,&nchars,&ifail);
       printf("error tag value: %d\n",ival);

exit(0);
       } return;
}
#include "insert:hsparm.h"
#include "insert:eps.h"
#include "insert:parasolid_tokens.h"
int classhs(xyz,surf_tag)
/*
** Classify a point wrt a Parasolid surface
**
** Input:
**    xyz[3]   : coordinates of point
**    surf_tag : Parasolid surface tag
**
** Returns:
**    classhs : classification (-1:out,0:on,1:in)
**
** Revisions:
**    rv  date       who  reason
**    00  16-jan-90  dlv  initial implementation
*/
double xyz[3];
int surf_tag;

{
int class, ifail, sense, sftype;
double d1, d2, vec1[3], vec2[3];
double d, delta, s1, s2;
double apex[3], v1[3], v2[3], v3[3], v4[3], v5[3];

double cos();
double fabs();
double ptdist();
double sin();
double tan();
```

```
double vdot();
double vmag();

/* get the surface defining data */
OUTSUR(&surf_tag,&sftype,vec1,vec2,&d1,&d2,&sense,&ifail);
ckifail("classhs","OUTSUR",ifail,0);

/* classify by type */
/* remember - Parasolid vectors point away from the material */
switch (sftype)
    {

/* plane */
    case TYSUPL:                        /* vec1 = point on plane           */
                                        /* vec2 = normal to plane          */
        vsub(xyz,vec1,v1);              /* v1 = xyz - vec1                 */
        vunit(vec2,v2);                 /* v2 = vec2 / |vec2|              */
        d = vdot(v1,v2);                /* d = signed distance to plane    */
        if (fabs(d) < dist_eps)         /* dist = 0.0                      */
            class = ON;                 /*    ON                           */
        else if (d > 0.0)               /* dist > 0                        */
            class = OUT;                /*    OUT                          */
        else                            /* dist < 0                        */
            class = IN;                 /*    In                           */
        break;

/* cylinder */
    case TYSUCY:                        /* vec1 = point on axis            */
                                        /* vec2 = axis                     */
                                        /* d1 = radius                     */
        vunit(vec2,v2);                 /* v2 = vec2 / |vec2|              */
        vsub(xyz,vec1,v1);              /* v1 = xyz - vec1                 */
        vcross(v1,v2,v3);               /* v3 = v1 x v2   (dist pt to line)*/
        d = vmag(v3);                   /* d = dist xyz to axis            */
        delta = d - d1;                 /* delta = diff between r and dist */
        if (fabs(delta) < dist_eps)     /* dist - radius = 0               */
            class = ON;                 /*    ON                           */
        else if (delta > 0.0)           /* dist - radius > 0               */
            class = OUT;                /*    OUT                          */
        else                            /* dist - radius < 0               */
            class = IN;                 /*    IN                           */
        break;

/* cone */
    case TYSUCO:                        /* vec1 = point on axis            */
                                        /* vec2 = axis direction (to apex) */
                                        /* d1 = cone radius at vec1        */
                                        /* d2 = cone half angle            */
        /* NOTE: N is in the oppositve direction of vec2                   */
        /* d = [(X-P).W-r] cos(a) - [(X-P).N] sin(a)                       */
        /* W = V / |V|                                                     */
        /* V = (X-P) - [(X-P).N]N                                          */
        vsub(xyz,vec1,v1);              /* v1 = (X-P)                      */
        vneg(vec2,v2);                  /* v2 = N                          */
        vunit(v2,v2);                   /* v2 is a unit vector             */
        s1 = vdot(v1,v2);               /* s1 = (X-P).N                    */
        vsmult(v2,s1,v4);               /* v4 = [(X-P).N]N                 */
        vsub(v1,v4,v5);                 /* v5 = V                          */
        vunit(v5,v5);                   /* v5 = W                          */
        s2 = vdot(v1,v5);               /* s2 = (X-P).W                    */
```

```
        d = (s2-d1)*cos(d2)-d1*sin(d2);  /* d = dist between cone and point */
        if (fabs(d) < dist_eps)           /* dist = 0.0                      */
            class = ON;                    /*    ON   (double cone)           */
        else if (d > 0.0)                  /* dist > 0.0                      */
            class = OUT;                   /*    OUT  (double cone)           */
        else                               /* dist < 0.0                      */
            class = IN;                    /*    IN   (double cone)           */

/* make sure point is on proper half of cone */
    /* (must be inside plane at apex)            */
        if (class == ON || class == IN)

/* compute apex plane */
            {
            coneapex(vec1,vec2,d1,d2,apex);

/* classify wrt plane at apex; only check for OUT condition */
            vunit(vec2,v2);                /* v2 = normal to plane (away from) */
            vsub(xyz,apex,v1);             /* v1 = xyz - vec1                  */
            d = vdot(v1,v2);               /* d = signed distance to plane     */
            if (d > 0.0)
                class = OUT;
            }
        break;

/* sphere */
        case TYSUSP:                       /* vec1 = center point              */
                                           /* d1 = radius                      */
            d = ptdist(xyz,vec1);          /* d = dist from center to point    */
            delta = d - d1;                /* delta = diff between r and dist  */
            if (fabs(delta) < dist_eps)    /* dist - radius = 0                */
                class = ON;                /*    ON                            */
            else if (delta > 0.0)          /* dist - radius > 0                */
                class = OUT;               /*    OUT                           */
            else                           /* dist - radius < 0                */
                class = IN;                /*    IN                            */
            break;

/* not a supported surface */
        default:
            printf("classhs: surface type = %d, not supported\n",sftype);
            ckifail("classhs","OUTSUR (wrong surf)",1,0);
            break;
        }

/* reverse classification, if required */
    if (sense == 1)
        return (class);
    else
        return (-class);

}
#include "insert:eps.h"
#include "insert:hsparm.h"
#include "insert:hs3com.h"
#include "insert:parasolid_ifails.h"
#include "insert:parasolid_tokens.h"
void CLSSOL(x,y,z,class,size)
/*
** Classify an array of points with respect to solid
```

```
**
**  Input:
**     x       : array of x-coordinates
**     y       : array of y-coordinates
**     z       : array of z-coordinates
**     *size   : number of points
**
**  Output:
**     class   : array of point classifications with respect to solid
**               -1 = out, 0 = on, 1 = in;
**
**  Revisions:
**     rv   date       who   reason
**     00   25-may-90   dlv   initial implementation
*/
FREAL x[], y[], z[];
FINTEGER class[], *size;

{
int enclos, i, ifail, pt_tag;
double box[6];

/* get the enclosing box for 'fast' classifications */
ENBXEN(&brep_body_tag,box,&ifail);
ckifail("clssol","ENBXEN",ifail,0);

/* classify all the points */
for (i=0; i<*size; i++)
    {

/* compare to bounding box first for OUT classification */
    if ((x[i] < box[0]) || (y[i] < box[1]) || (z[i] < box[2]) ||
        (x[i] > box[3]) || (y[i] > box[4]) || (z[i] > box[5]))
        class[i] = OUT;

/* let Parasolid classify the point */
    else
        {

/* create a point */
        CRCAPO(&x[i],&y[i],&z[i],&pt_tag,&ifail);
        ckifail("crecpt","CRCAPO",ifail,0);

/* classify the point */
        ENCONT(&pt_tag,&brep_body_tag,&enclos,&ifail);
        ckifail("crecpt","ENCONT)",ifail,0);
        if (enclos == ENCLIN)
           class[i] = IN;
        else if (enclos == ENCLOU)
           class[i] = OUT;
        else /* enclos == ENCLON */
           class[i] = ON;

/* delete the point entity */
        DELENT(&pt_tag,&ifail);
        ckifail("crecpt","DELENT",ifail,0);
        }
    )

return;
```

```
}
void coneapex(base_pt, axis, radius, half_angle, apex_pt)
/*
** Compute cone apex
**
** Input:
**    base_pt    : coordinates of base point (at r=radius)
**    axis       : cone axis vector (base point -> apex point)
**    radius     : cone radius (at base_pt)
**    half_angle : cone half angle (radians)
**
** Output:
**    apex_pt    : coordinates of apex point
**
** Revisions:
**    rv  date       who   reason
**    00  27-may-90  dlv   initial implementation
*/
double base_pt[3], axis[3], radius, half_angle, apex_pt[3];

{
double d, v1[3], v2[3];
double tan();

/* compute distance from base_pt to apex_pt */
d = radius / tan(half_angle);

/* compute apex point */
vunit(axis,v1);
vsmult(v1,d,v2);
vadd(v2,base_pt,apex_pt);

return;
} void CONAPX(base_pt, axis, radius, half_angle, apex_pt)
/*
** Compute cone apex (FORTRAN callable version)
**
** Input:
**    base_pt     : coordinates of base point (at r=radius)
**    axis        : cone axis vector (base point -> apex point)
**    *radius     : cone radius (at base_pt)
**    *half_angle : cone half angle (radians)
**
** Output:
**    apex_pt     : coordinates of apex point
**
** Revisions:
**    rv  date       who   reason
**    00  25-jul-90  dlv   initial implementation
*/
FREAL base_pt[3], axis[3], *radius, *half_angle, apex_pt[3];

{
coneapex(base_pt,axis,*radius,*half_angle,apex_pt);

return;
}
#include "insert:hsparm.h"
```

```
#include "insert:hs3com.h"
void copydata()
/*
** Copy 'hs3com' records into 'HSDATA' FORTRAN data
**
** Revisions:
**    rv  date       who  reason
**    00  16-jan-90  dlv  initial implementation
**    01  25-may-90  dlv  added 'z' coordinate to cpt
*/

{
FINTEGER hs_num, stat, type, chr1, chr2, cpt_num;
FREAL coef[3];

int i, on_hs;
HS *cur_hs;
CPT *cur_cpt;

/* initialize */
stat = ACTIVE;
type = 3;
coef[0] = 0.0;
coef[1] = 0.0;
coef[2] = 0.0;
chr2 = ' ';

/* copy the 'hs' records */
cur_hs = head_hs;
hs_num = 0;
while (cur_hs != NULL)
   {
   hs_num++;
   if (hs_num > MAXHS)
      ckifail("copydata","MAXHS exceeded",1,0);
   if (hs_num <= 26)
      chr1 = 'A' + hs_num - 1;
   else
      chr1 = 'a' + (hs_num-26) - 1;
   CPYHS(&hs_num,&stat,coef,&type,&chr1,&chr2);
   cur_hs = cur_hs->next_hs;
   }

/* copy the 'cpt' records */
cur_cpt = head_cpt;
cpt_num = 0;
while (cur_cpt != NULL)
   {

/* check for 'cpt' on a halfspace (ignor) */
   on_hs = 0;
   for (i=0;i<hs_num;i++)
      {
      if (cur_cpt->hsclass[i] == ON)
         {
         on_hs = 1;
         break;
         }
      }
```

```
    /* copy the 'cpt' */
        if (on_hs == 0)
            {
            cpt_num++;
            if (cpt_num > MAXCPT)
                ckifail("copydata","MAXCPT exceeded",1,0);
            coef[0] = cur_cpt->xyz[0];
            coef[1] = cur_cpt->xyz[1];
            coef[2] = cur_cpt->xyz[2];
            CPYCPT(&cpt_num,&stat,&coef[0],&coef[1],&coef[2],cur_cpt->hsclass,
                &hs_num,&cur_cpt->class);
            }
        cur_cpt = cur_cpt->next_cpt;
        } return;
}
#include "insert:eps.h"
#include "insert:hsparm.h"
#include "insert:hs3com.h"
#include "insert:parasolid_ifails.h"
#include "insert:parasolid_tokens.h"
void crecpt(xyz)
/*
** Create 'cpt' data structure
**
** Input:
**   xyz[3]    : Point coordinates
**
** Revisions:
**   rv date       who  reason
**   00 12-jan-90  dlv  initial implementation
**   01 17-may-90  dlv  add surface tags
*/
double xyz[3];

{
CPT *cur_cpt, *new_cpt;
int i, ifail;
HS *cur_hs;

int classhs();

/* allocate space for 'cpt' */
new_cpt = (CPT *) malloc(sizeof(CPT));
if (new_cpt == NULL)
    ckifail("crecpt","malloc",1,0);

/* fill in the point coordinates and classification */
new_cpt->xyz[0] = xyz[0];
new_cpt->xyz[1] = xyz[1];
new_cpt->xyz[2] = xyz[2];
new_cpt->class = IN;        /* default to IN; computed later */

/* allocate space for the hsclass list */
new_cpt->hsclass = (int *) malloc(hs_count * sizeof(int));
if (new_cpt->hsclass == NULL)
    ckifail("crecpt","malloc",1,0);

/* classify the point wrt each 'hs' */
```

```
cur_hs = head_hs;
i = 0;
while (cur_hs != NULL)
    {
    new_cpt->hsclass[i] = classhs(xyz,cur_hs->surf_tag);
    cur_hs = cur_hs->next_hs;
    i++;
    }

/* insert at beginning of list */
new_cpt->next_cpt = head_cpt;
head_cpt = new_cpt;

return;
}
#include "insert:eps.h"
#include "insert:hs3com.h"
#include "insert:parasolid_tokens.h"
void crehs(surf_tag,rev)
/*
** Create 'hs' data structure and append to 'hs' list
**
** Input:
**    surf_tag  : Parasolid surface tag
**    rev       : Reverse sense flag
**                0 = same, do not reverse
**                1 = reverse
**
** Revisions:
**    rv  date        who  reason
**    00  10-jan-90   dlv  initial implementation
**    01  23-may-90   dlv  handle sense properly
*/
int surf_tag, rev;

{
HS *new_hs;
HS *cur_hs;
int copy_surf_tag, surf_tag1, surf_tag2;
int ifail, sense, copy_sense, same, sftype, equiv_geom;
double d1, d2, vec1[3], vec2[3];
double copy_d1, copy_d2, copy_vec1[3], copy_vec2[3];
double d, v1[3], v2[3];

double ptdist(), sin();

/* copy the surface, reverse if required */
COPYEN(&surf_tag,&copy_surf_tag,&ifail);
ckifail("crehs","COPYEN",ifail,0);
if (rev)
    {
    NEGENT(&copy_surf_tag,&ifail);
    ckifail("crehs","NEGENT",ifail,0);
    }

/* check if a geometrically equal halfspace exists */
equiv_geom = 0;
cur_hs=head_hs;
while (cur_hs != NULL)
    {
```

```c
        ENEQGE(&copy_surf_tag,&cur_hs->surf_tag,&same,&ifail);
        ckifail("crehs","ENEQGE",ifail,0);
        if (same == 1)
            {

/* check if the surface sense is the same */
            OUTSUR(&cur_hs->surf_tag,&sftype,vec1,vec2,&d1,&d2,&sense,&ifail);
            ckifail("crehs","OUTSUR",ifail,0);
            OUTSUR(&copy_surf_tag,&sftype,copy_vec1,copy_vec2,&copy_d1,
                &copy_d2,&copy_sense,&ifail);
            ckifail("crehs","OUTSUR",ifail,0);

/* the sense and normal direction for planes must be considered */
            if (sftype == TYSUPL)
                {
                if (sense == 0)                 /* make the sense     */
                    vneg(vec2,vec2);            /* of both surfaces   */
                if (copy_sense == 0)            /* be the same, then  */
                    vneg(copy_vec2,copy_vec2);  /* compare normals    */
                vunit(vec2,vec2);
                vunit(copy_vec2,copy_vec2);
                if (ptdist(vec2,copy_vec2) > dist_eps)
                    same = 0;                   /* normals are opposite,    */
                    equiv_geom = 1;             /* but geometry is equivalent */
                }

/* all other surfaces, just compare sense */
            else
                {
                if (sense != copy_sense)
                    same = 0;                   /* normals are opposite,    */
                    equiv_geom = 1;             /* but geometry is equivalent */
                }

/* identical geometric AND sense surface already exists */
            if (same == 1)
                {
                DELENT(&copy_surf_tag,&ifail);
                ckifail("crehs","DELENT",ifail,0);
                return;
                }
            }
        cur_hs = cur_hs->next_hs;
        }

/* get base surface data */
    OUTSUR(&copy_surf_tag,&sftype,vec1,vec2,&d1,&d2,&sense,&ifail);
    ckifail("crehs","OUTSUR",ifail,0);

/* create offset surfaces based on surface type */
    switch(sftype)
        {

/* plane */
        case TYSUPL:
            vunit(vec2,v2);
            vsmult(v2,off_dist,v2);
            vadd(vec1,v2,v1);
            CRPLSU(v1,vec2,&surf_tag1,&ifail);
            ckifail("crehs","CRPLSU",ifail,0);
```

```
            vsub(vec1,v2,v1);
            CRPLSU(v1,vec2,&surf_tag2,&ifail);
            ckifail("crehs","CRPLSU",ifail,0);
            break;

/* cylinder */
        case TYSUCY:
            d = d1 + off_dist;
            CRCYSU(vec1,vec2,&d,&surf_tag1,&ifail);
            ckifail("crehs","CRCYSU",ifail,0);
            d = d1 - off_dist;
            if (d < dist_eps)
                d = d1 + off_dist;
            CRCYSU(vec1,vec2,&d,&surf_tag2,&ifail);
            ckifail("crehs","CRCYSU",ifail,0);
            break;

/* cone */
        case TYSUCO:
            d = off_dist / sin(d2);
            vunit(vec2,v2);
            vsmult(v2,d,v2);
            vadd(vec1,v2,v1);
            CRCOSU(v1,vec2,&d1,&d2,&surf_tag1,&ifail);
            ckifail("crehs","CRCOSU",ifail,0);
            vsub(vec1,v2,v1);
            CRCOSU(v1,vec2,&d1,&d2,&surf_tag2,&ifail);
            ckifail("crehs","CRCOSU",ifail,0);
            break;

/* sphere */
        case TYSUSP:
            d = d1 + off_dist;
            CRSPSU(vec1,&d,&surf_tag1,&ifail);
            ckifail("crehs","CRSPSU",ifail,0);
            d = d1 - off_dist;
            if (d < dist_eps)
                d = d1 + off_dist;
            CRSPSU(vec1,&d,&surf_tag2,&ifail);
            ckifail("crehs","CRSPSU",ifail,0);
            break;

/* anything else */
        default:
            printf("crehs: surface type_code = %d, not supported\n",sftype);
            ckifail("crehs","OUTSUR",1,0);
            break;
    }

/* allocate space for 'hs' */
    new_hs = (HS *) malloc(sizeof(HS));
    if (new_hs == NULL)
        ckifail("crehs","malloc",1,0);

/* fill in the data structure */
    new_hs->next_hs=NULL;
    new_hs->surf_tag=copy_surf_tag;
    new_hs->surf_tag1 = surf_tag1;
    new_hs->surf_tag2 = surf_tag2;
    new_hs->equiv_geom = equiv_geom;
```

```c
/* append to end of list */
if (head_hs == NULL)
   head_hs = new_hs;
else
   {
   cur_hs=head_hs;
   while (cur_hs->next_hs != NULL)
      cur_hs = cur_hs->next_hs;
   cur_hs->next_hs=new_hs;
   }

/* increment the count */
hs_count++;

return;
}
#include "insert:eps.h"
void creplane(method,v1,v2,v3)
/*
** Create two planes (with opposite sense) given plane parameters
**
** Input:
**    method : method of interpreting parameters
**        method = 1,  v1, v2, v3 represent three points.
**        method = 2,  v1, a point; v2, a normal; v3, unused.
**        method = 3,  v1, a point; v2, v3 vectors in plane.
**
** Revisions:
**    rv  date       who  reason
**    00  18-may-90  dlv  initial implementation
**
*/
int method;
double v1[3], v2[3], v3[3];

{
double d1, d2, d3, v12[3],v23[3], vnorm[3];
int plane_tag, ifail;

double fabs(), ptdist();

/* check for valid points (method=1 only) */
if (method == 1)
   {
   d1 = ptdist(v1,v2);
   d2 = ptdist(v2,v3);
   d3 = ptdist(v1,v3);

/* use triangle inequality to ensure points define a valid plane */
   if ((fabs(d1+d2-d3) < dist_eps) ||
       (fabs(d2+d3-d1) < dist_eps) ||
       (fabs(d1+d3-d2) < dist_eps))
      return;
   }

/* compute normal vector to plane */
if (method == 1)
   {
   vsub(v1,v2,v12);
```

```
    vsub(v2,v3,v23);
    vcross(v12,v23,vnorm);
    vunit(vnorm,vnorm);
    }

/* v2 is already the normal */
else if (method == 2)
   vunit(v2,vnorm);

/* cross vectors in the plane to find normal */
else /* (method == 3) */
    {
    vcross(v2,v3,vnorm);
    vunit(vnorm,vnorm);
    }

/* create Parasolid plane */
CRPLSU(v1,vnorm,&plane_tag,&ifail);
ckifail("creplane","CRPLSU",ifail,0);

/* creat hs data structure *for both planes */
crehs(plane_tag,0);
crehs(plane_tag,1);

/* delete original plane */
DELENT(&plane_tag,&ifail);
ckifail("creplane","DELENT",ifail,0);

return;
}
#include "insert:eps.h"
#include "insert:hs3com.h"
#include "insert:parasolid_tokens.h"
void crvendpt(curve_tag,p0,p1)
/*
**  Compute the 'untrimmed' end points of a curve
**
**  Input:
**     curve_tag  : Parasolid curve tag
**     p0         : start point
**     p1         : end point (may be coincident with p0)
**
**  Revisions:
**     rv  date       who  reason
**     00  21-may-90  dlv  initial implementation
*/
int curve_tag;
double p0[3], p1[3];

{
int curve_type, ifail;
double vec1[3], vec2[3], vec3[3], d1, d2;
double v1[3], v2[3];

double vmag();

/* determine general curve type */
OUTCUR(&curve_tag,&curve_type,vec1,vec2,vec3,&d1,&d2,&ifail);
ckifail("crvendpt","OUTCUR",ifail,0);
```

```
/* compute curve end psi   point  based on curve type */
                        ^
switch(curve_type)
    {

/* straight line */
   case TYCUST:
      vunit(vec2,v1);
      vsmult(v1, -1.0*line_const, v2);
      vadd(vec1, v2, p0);
      vsmult(v1, line_const, v2);
      vadd(vec1, v2, p1);
      break;

/* circle */
   case TYCUCI:
      vassign(0.0,1.0,0.0,v1);
      vcross(v1,vec2,v2);
      if (vmag(v2) < zero_eps)
         {
         vassign(0.0,0.0,1.0,v1);
         vcross(vec2,v1,v2);
         }
      vunit(v2,v2);
      vsmult(v2,d1,v2);
      vadd(vec1,v2,p0);
      vcopy(p0,p1);
      break;

/* ellipse */
   case TYCUEL:
      vunit(vec2,v1);
      vsmult(v1,d1,v2);
      vadd(vec1,v2,p0);
      vcopy(p0,p1);
      break;

/* intersection curve */
   case TYCUIN:
      vcopy(vec1,p0);
      vcopy(vec2,p1);
      break;

/* anything else */
   default:
      printf("crvendpt: unsupported curve type = %d\n",curve_type);
      ckifail("crvendpt","OUTCUR",1,0);
      break;
    } return;
}
#include "insert:hsparm.h"
#include "insert:hs3com.h"
void csg(expr)
/*
** Compute CSG expression
**
** Output:
**    expr : CSG expresssion
**
```

```
**  Revisions:
**     rv  date         who  reason for change
**     00  10-jan-90    dlv  initial implementation
**     01  19-jul-90    dlv  added 'expr' argument
*/
FINTEGER expr[MAXEXP];

{
FINTEGER fhsnat;
FLOGICAL minsol;

/* compute the csg expression */
expr[0] = 0;
PART1(expr,&minsol);
printf("\n");
LSTALG(expr);
if (minsol == 0)
    printf("\nMinimal solution unknown\n\n");
else
    printf("\nSolution is minimal\n\n");

return;
}
#include "insert:parasolid_tokens.h"
#include "insert:hs3com.h"
#include "insert:eps.h"
void eplanes(edge_list,nedge)
/*
**  Create separating planes through a list of edges
**
**  Input:
**     edge_list : Parasolid list of edges
**     nedge     : Number of edges in the list
**
**  Revisions:
**     rv  date         who  reason for change
**     00  18-may-90    dlv  initial implementation
*/
int edge_list, nedge;

{
int i, j, one=1, edge_tag, ifail, curve_tag, cutype, surf_tag1, surf_tag2;
int contyp, face_list, nface, face_tag, surf_tag, rev, sftype, sense;
int sftype1, sftype2, edge_type;
double vec1[3], vec2[3], vec3[3], d1, d2, unused[3];

int tanplane();

/* create planes for each edge */
for (i=1; i<=nedge; i++)
    {

/* get the edge tag from the list */
    GTTGLI(&edge_list,&i,&one,&edge_tag,&ifail);
    ckifail("eplanes","GTTGLI",ifail,0);

/* if either face forming the edge is a plane, ignor edge */
    contyp = TYTOFA;
    IDCOEN(&edge_tag,&contyp,&face_list,&nface,&ifail);
    ckifail("eplanes","IDCOEN",ifail,0);
```

```c
    for (j=1; j<=nface; j++)
    {
        GTTGLI(&face_list,&j,&one,&face_tag,&ifail);
        ckifail("eplanes","GTTGLI",ifail,0);
        IDSOFF(&face_tag,&surf_tag,&rev,&ifail);
        ckifail("eplanes","IDSOFF",ifail,0);
        OUTSUR(&surf_tag,&sftype,vec1,vec2,&d1,&d2,&sense,&ifail);
        ckifail("eplanes","OUTSUR",ifail,0);
        if (sftype == TYSUPL)
            break;
        if (j == 1)
            surf_tag1 = surf_tag;
        else if (j == 2)
            surf_tag2 = surf_tag;
    }
    DELENT(&face_list,&ifail);
    ckifail("eplanes","DELENT",ifail,0);
    if (sftype == TYSUPL)
        continue;

/* get curve of edge */
    IDCOFE(&edge_tag,&curve_tag,&ifail);
    ckifail("eplanes","IDCOFE",ifail,0);

/* get curve data */
    OUTCUR(&curve_tag,&cutype,vec1,vec2,vec3,&d1,&d2,&ifail);
    ckifail("eplanes","OUTCUR",ifail,0);

/* create plane based on curve type */
    switch(cutype)
    {

/* straight line (ignor) */
        case TYCUST:
            break;

/* circle */
        case TYCUCI:
            creplane(2,vec1,vec2,unused);
            break;

/* ellipse */
        case TYCUEL:
            creplane(3,vec1,vec2,vec3);
            break;

/* intersection */
        case TYCUIN:

/* determine edge type */
            ENEDTY(&edge_tag,&edge_type,&ifail);
            ckifail("eplanes","ENEDTY",ifail,0);

/* if curve is open, compute tangent plane */
            if (edge_type == ENEDON ||    /* open, normal edge */
                edge_type == ENEDOW ||    /* open, wire edge   */
                edge_type == ENEDOB)      /* open, biwire edge */
            {
                if (tanplane(edge_tag,vec1,vec2) == 0)
                    creplane(2,vec1,vec2,unused);
```

```c
        }

/* if curve is closed, compute polar planes */
        else
            pplanes(surf_tag1,surf_tag2);
        break;

/* anything else */
    default:
        printf("eplanes: curve type = %d  not supported\n",cutype);
        ckifail("eplanes","OUTCUR",1,0);
        break;
    }
  } return;
}
#include "insert:parasolid_tokens.h"
#include "insert:hs3com.h"
void getbody(world_tag)
/*
** Get body tag for b-rep to CSG conversion
** Stores tag value in external storage (brep_body_tag)
**
** Input:
**    world_tag : Parasolid world tag
**
** Revisions:
**    rv   date        who     reason for change
**    00   08-jan-90   dlv     initial implementation
*/
int world_tag;

{
int ifail, one = 1;
int body_list, contyp, nbody, ntags;

/* get list of bodies */
contyp=TYTOBY;
IDCOEN(&world_tag,&contyp,&body_list,&nbody,&ifail);
ckifail("getbody","IDCOEN",ifail,0);

/* if more than 1, give warning */
if (nbody != 1)
    printf("%d bodies found in part, first one will be used",nbody);

/* get tag of first body */
GTTGLI(&body_list,&one,&one,&brep_body_tag,&ifail);
ckifail("getbody","GTTGLI",ifail,0);

/* delete the body list */
DELENT(&body_list,&ifail);
ckifail("getbody","DELENT",ifail,0);

return;
}
#include "insert:hs3com.h"
#include "insert:parasolid_tokens.h"
void GETHS(iname, surf_type, vec1, vec2, d1, d2, sense_flag)
/*
```

```
**  Get half space data (a FORTRAN - C interface routine)
**
**  Input:
**     iname     : single character halfspace name (A-Z, a-z)
**     surf_type : surface type
**                 = 1, plane
**                 = 2, cylinder
**                 = 3, sphere
**                 = 4, cone
**     vec1[3]   : surface type dependant data
**     vec2[3]   : surface type dependant data
**     d1, d2    : surface type dependant data
**     sense_flag: surface sense (1=standard, 0=complement)
**
**  Revisions:
**     rv date       who   reason
**     00 20-jul-90  dlv   initial version
**
*/
FINTEGER *iname, *surf_type, *sense_flag;
FREAL vec1[], vec2[], *d1, *d2;

{
char name;
HS *cur_hs;
int indx, sftype, count, ifail, sense;

/* determine index into halfspace list */
name = *iname;
if (name >= 'A' && name <= 'Z')
   indx = name - 'A' + 1;
else /* lower case */
   indx = name - 'a' + 1 + 26;

/* follow linked list to appropriate halfspace */
cur_hs = head_hs;
count = 0;
while (count < indx)
   {
   count++;
   if (count < indx)
      cur_hs = cur_hs->next_hs;
   }

/* get the surface data */
OUTSUR(&cur_hs->surf_tag,&sftype,vec1,vec2,d1,d2,&sense,&ifail);
ckifail("geths","OUTSUR",ifail,0);

/* set the surface type */
if (sftype == TYSUPL)
   *surf_type = 1;
else if (sftype == TYSUCY)
   *surf_type = 2;
else if (sftype == TYSUSP)
   *surf_type = 3;
else if (sftype == TYSUCO)
   *surf_type = 4;
else
   {
   printf("geths: surface type not supported, sftype = %d\n",sftype);
```

```
    ckifail("geths","OUTSUR",1,0);
}

/* set the sense */
*sense_flag = sense;

return;
}
#include "insert:hs3com.h"
#include "insert:eps.h"
#include "insert:parasolid_ifails.h"
void intsurf(surf1,surf2)
/*
** Intersect two surfaces
**
** Input:
**    surf1 : index of surface 1 in slist[]
**    surf2 : index of surface 2 in slist[]
**
** Revisions:
**    rv  date       who  reason
**    00  09-jan-90  dlv  initial implementation
**    01  22-may-90  dlv  changed curve storage method
**    02  30-may-90  dlv  added KLUDGE to fix Parasolid point problem
**
*/
int surf1, surf2;

{
int i, j, indx, ifail, one=1, curve_tag;
double p0[3], p1[3], temp_int_box[6];

double ptdist();

/* compute 'indx', index into two dimensional arrays */
indx = surf1*nsurf + surf2;

/* check if 'surf1' and 'surf2' need to be intersected */
if (ssint_avail[indx] == 0)
    {

/* check if 'surf1' and 'surf2' are adjacent (non-intersecting offsets) */
    if (surf1%2 == 0 && surf1+1 == surf2)
        {
        ssint_avail[indx] = 1;
        ssint_n[indx] = 0;
        ssint_clist[indx] = NULL;
        }

/* surfaces must be intersected */
    else
        {

/* copy intersection box */
        for (i = 0; i <=5; i++)
            temp_int_box[i] = int_box[i];

/* intersect surfaces */
KLUDGE:
        CRINCU(&slist[surf1],&slist[surf2],temp_int_box,&ssint_clist[indx],
```

```
                            &ssint_n[indx],,&ifail);

/* process the resulting intersecting curves */
        switch(ifail)
           {
           case 0:
              ssint_avail[indx] = 1;

/* check to make sure all the curve end points are good (the KLUDGE) */
              for (i=1; i<=ssint_n[indx]; i++)
                 {
                 GTTGLI(&ssint_clist[indx],&i,&one,&curve_tag,&ifail);
                 ckifail("intsurf","GTTGLI",ifail,0);
                 crvendpt(curve_tag,p0,p1);
                 if (p0[0]<int_box[0] || p0[1]<int_box[1] || p0[2]<int_box[2] ||
                     p0[0]>int_box[3] || p0[1]>int_box[4] || p0[2]>int_box[5] ||
                     p1[0]<int_box[0] || p1[1]<int_box[1] || p1[2]<int_box[2] ||
                     p1[0]>int_box[3] || p1[1]>int_box[4] || p1[2]>int_box[5])
                    {

/* delete each curve */
/*                  for (j = 1; j <= ssint_n[indx]; j++)
                       {
                       GTTGLI(&ssint_clist[indx],&j,&one,&curve_tag,&ifail);
                       ckifail("intsurf","GTTGLI",ifail,0);
                       DELENT(&curve_tag,&ifail);
                       ckifail("intsurf","DELENT",ifail,0);
                       }                                                        */

/* delete the curve list */
                    DELENT(&ssint_clist[indx],&ifail);
                    ckifail("intsurf","DELENT",ifail,0);

/* adjust intersection box */
                    for (j = 0; j <= 5; j++)
                       temp_int_box[j] = temp_int_box[j] / 1.1;
                    goto KLUDGE;
                    }
                 }

/* points are now good, add to cpt list */
              for (i=1; i<=ssint_n[indx]; i++)
                 {
                 GTTGLI(&ssint_clist[indx],&i,&one,&curve_tag,&ifail);
                 ckifail("intsurf","GTTGLI",ifail,0);
                 crvendpt(curve_tag,p0,p1);
                 crecpt(p0);
                 if (ptdist(p0,p1) > dist_eps)
                    crecpt(p1);
                 }
              break;

case KI_su_are_coincident:
              ssint_avail[indx] = 1;
              ssint_n[indx] = 0;
              ssint_clist[indx] = NULL;
              break;

case KI_dont_intersect:
              ssint_avail[indx] = 1;
```

```
            ssint_n[indx] = 0;
            ssint_clist[indx] = NULL;
            break;

default:
            ckifail("intsurf","CRINCU",ifail,0);
            break;
        }
      }
   } return;
}
#include "insert:hs3com.h"
void listcpt()
/*
** Lists 'cpt' data structure
**
** Revisions:
**    rv   date        who   reason
**    00   17-may-90   dlv   initial implementation
*/

{
int i, n;
CPT *cur_cpt;

/* cycle each 'cpt' */
cur_cpt = head_cpt;
n=0;
while (cur_cpt != NULL)
    {
    n++;

/* print the cpt data */
    printf("\n#%d   xyz[3] = (%8.3f, %8.3f, %8.3f )   class = %d\n",n,
           cur_cpt->xyz[0],cur_cpt->xyz[1],cur_cpt->xyz[2],
           cur_cpt->class);
    printf("   hsclass(*) = ");
    for (i=0;i<hs_count;i++)
        printf("%d ",cur_cpt->hsclass[i]);
    printf("\n");

/* next cpt */
    cur_cpt = cur_cpt->next_cpt;
    }

/* report number of cpt records */
printf("\nTotal number of CPT = %d\n",n);

return;
}
#include "insert:hs3com.h"
#include "insert:parasolid_tokens.h"
void lisths()
/*
** Lists 'hs' data structure
**
** Revisions:
**    rv   date        who   reason
```

```
**      00   05-jan-90  dlv   initial implementation
*/

{
HS *cur_hs;
int n;
int sftype, sense, ifail;
double d1, d2, vec1[3], vec2[3], deg;
char name;
static char sense_flag[] = {'-', '+'}, equiv_flag[] = {'n', 'y'};

/* cycle each HS and print data */
cur_hs = head_hs;
n=0;
while (cur_hs != NULL)
    {
    n++;
    if (n <= 26)
        name = n + 'A' - 1;
    else
        name = (n-26) + 'a' - 1;

/* get the surface data */
    OUTSUR(&cur_hs->surf_tag,&sftype,vec1,vec2,&d1,&d2,&sense,&ifail);
    ckifail("lisths","OUTSUR",ifail,0);

/* print the data based on surface type */
    switch(sftype)
        {

/* plane */
        case TYSUPL:
            printf("\n#%d   name = %c   type_code = PLANE\n",n,name);
            printf("   surf_tag = %d   surf_tag1 = %d   surf_tag2 = %d\n",
                cur_hs->surf_tag, cur_hs->surf_tag1, cur_hs->surf_tag2);
            printf("   position = (%8.3f,%8.3f,%8.3f)\n",vec1[0],vec1[1],vec1[2]);
            printf("   normal   = (%8.3f,%8.3f,%8.3f)\n",vec2[0],vec2[1],vec2[2]);
            printf("   sense = %c   equiv_geom = %c\n",sense_flag[sense],
                equiv_flag[cur_hs->equiv_geom]);
            break;

/* cylinder */
        case TYSUCY:
            printf("\n#%d   name = %c   type_code = CYLINDER\n",n,name);
            printf("   surf_tag = %d   surf_tag1 = %d   surf_tag2 = %d\n",
                cur_hs->surf_tag, cur_hs->surf_tag1, cur_hs->surf_tag2);
            printf("   radius   = %8.3f\n",d1);
            printf("   position = (%8.3f,%8.3f,%8.3f)\n",vec1[0],vec1[1],vec1[2]);
            printf("   axis     = (%8.3f,%8.3f,%8.3f)\n",vec2[0],vec2[1],vec2[2]);
            printf("   sense = %c   equiv_geom = %c\n",sense_flag[sense],
                equiv_flag[cur_hs->equiv_geom]);
            break;

/* cone */
        case TYSUCO:
            printf("\n#%d   name = %c   type_code = CONE\n",n,name);
            printf("   surf_tag = %d   surf_tag1 = %d   surf_tag2 = %d\n",
                cur_hs->surf_tag, cur_hs->surf_tag1, cur_hs->surf_tag2);
            deg = (180.0 / PI) * d2;
            printf("   radius (at point) = %8.3f   half angle = %8.3f\n",d1,deg);
```

```
              printf("   position = (%8.3f,%8.3f,%8.3f)\n",vec1[0],vec1[1],vec1[2]);
              printf("   axis     = (%8.3f,%8.3f,%8.3f)\n",vec2[0],vec2[1],vec2[2]);
              printf("   sense = %c    equiv_geom = %c\n",sense_flag[sense],
                     equiv_flag[cur_hs->equiv_geom]);
              break;

/* sphere */
           case TYSUSP:
              printf("\n#%d  name = %c  type_code = SPHERE\n",n,name);
              printf("   surf_tag = %d  surf_tag1 = %d  surf_tag2 = %d\n",
                     cur_hs->surf_tag, cur_hs->surf_tag1, cur_hs->surf_tag2);
              printf("   radius = %8.3f\n",d1);
              printf("   position = (%8.3f,%8.3f,%8.3f)\n",vec1[0],vec1[1],vec1[2]);
              printf("   sense = %c    equiv_geom = %c\n",sense_flag[sense],
                     equiv_flag[cur_hs->equiv_geom]);
              break;

/* anything else */
           default:
              printf("\n#%d  name = %c  type_code = %d\n",n,name,sftype);
              printf("   surf_tag = %d  surf_tag1 = %d  surf_tag2 = %d\n",
                     cur_hs->surf_tag, cur_hs->surf_tag1, cur_hs->surf_tag2);
              printf("   d1 = %8.3f   d2 = %8.3f\n",d1,d2);
              printf("   vec1[3] = (%8.3f,%8.3f,%8.3f)\n",vec1[0],vec1[1],vec1[2]);
              printf("   vec2[3] = (%8.3f,%8.3f,%8.3f)\n",vec2[0],vec2[1],vec2[2]);
              printf("   sense = %c    equiv_geom = %c\n",sense_flag[sense],
                     equiv_flag[cur_hs->equiv_geom]);
              break;
           }
/* next hs */
        cur_hs = cur_hs->next_hs;
        }
   printf("\nTotal number of HS = %d\n",n);

return;
   }
#include "insert:parasolid_tokens.h"
#include "insert:hs3com.h"
#include "insert:hsparm.h"
main(argc,argv)
/*
** Compute Halfspace Representation of B-rep
**
** Command line arguments ('*' implies padl2 output to screen)
**    brcsg ['parasolid_xmt_file' ['padl2_file' | *]]
**
** Input:
**    argc     int     Number of arguments
**    **argv   char    Arguments
**
** Revisions:
**    rv  date       who   reason for change
**    00  05-jan-90  dlv   initial implementation
**    01  19-jul-90  dlv   add PADL-2 output
*/
int argc;
char *argv[];

{
#define FALSE 0
```

```c
#define TRUE  1
define NITEMS 14 int display_menu, choice=0, i;
char in_str[81], input_file[133], output_file[133];
float time,ttime[NITEMS+1],zero=0.0;
char *item_text[NITEMS+1], *dashes;
static int auto_cmds1[] = {0, 1, 2, 3, 4, 5, 6, 7, 8, NITEMS};
static int auto_cmds2[] = {0, 1, 2, 3, 4, 5, 6, 7, 8, 13, NITEMS};
int *auto_cmds;
int auto_cmd_number=0;
int kijon=0,usrfld=0,ifail,world_tag, pnum,ival;
double rval;
FINTEGER fhsnat;
FINTEGER expr[MAXEXP];

float cpusec();
int strlen();

/* initialize item strings */
dashes="----------------------------------------";
item_text[ 1]=" 1 - Read Parasolid File";
item_text[ 2]=" 2 - Compute Natural Halfspaces";
item_text[ 3]=" 3 - Compute Separating Planes";
item_text[ 4]=" 4 - Compute Intersection Points";
item_text[ 5]=" 5 - Compute Necessary Points";
item_text[ 6]=" 6 - Classify Points";
item_text[ 7]=" 7 - Compute Necessary Halfspaces/Points";
item_text[ 8]=" 8 - Compute CSG Expression";
item_text[ 9]=" 9 - List Halfspaces (HS records)";
item_text[10]="10 - List Points (CPT records)";
item_text[11]="11 - List Halfspaces (HSDATA)";
item_text[12]="12 - List Points (HSDATA)";
item_text[13]="13 - Output PADL-2 Definition";
item_text[14]="14 - Exit Program";

/* initialize timer */
for (i=1;i<=NITEMS;ttime[i++]=0.0)
    ;
time=cpusec(&zero);

/* initialize hs2 package */
HS2INI();

/* start the Parasolid modeller */
STAMOD(&kijon,&zero,"",&usrfld,&world_tag,&parasolid_version,&ifail);
ckifail("main","STAMOD",ifail,0);

/* set Parasolid interface parameters */
pnum=SLIPCH;    /* KI routines check parameters -> */
ival=0;         /* non-zero implies checking       */
rval=0.0;
SEINTP(&pnum,&ival,&rval,&ifail);
ckifail("main","SEINTP",ifail,0);

/* get command line arguments, if available */
if (argc == 2 || argc == 3)
{
   display_menu = FALSE;
   strcpy(input_file, argv[1]);
```

```c
        if (argc == 3)
            {
            strcpy(output_file, argv[2]);
            auto_cmds = auto_cmds2;
            }
        else
            auto_cmds = auto_cmds1;
        }
    else
        {
        if (argc > 3)
            printf("main: too many command line arguments\n");
        display_menu = TRUE;
        input_file[0] = 0;
        output_file[0] = 0;
        }

/* execute until "Exit Program" is selected */
    do
        {
        if (display_menu)
            {
            printf("%s\n",dashes);
            printf("*** B-rep -> CSG Conversion v%d ***\n\n",parasolid_version);
            for (i=1;i<=NITEMS;printf("%s\n",item_text[i++]))
                ;
            printf("\n%s\n",dashes);
            display_menu=FALSE;
            }

/* get the user's choice */
        time=cpusec(&time);
        ttime[choice]=ttime[choice]+time;
        if (argc == 2 || argc == 3)
            {
            auto_cmd_number++;
            choice = auto_cmds[auto_cmd_number];
            }
        else
            {
            printf("\n[%7.2f] Enter item number, or 'm' for menu: ",time);
            scanf("%s",in_str);
            choice=atoi(in_str);
            }
        time=cpusec(&zero);

/* process the choice */
        switch(choice)
            {
            case 1: readps(input_file); getbody(world_tag); break;
            case 2: naths(); break;
            case 3: sephs(); break;
            case 4: allcpts(); copydata(); break;
            case 5: PURGE(); break;
            case 6: CLASS(); break;
            case 7: fhsnat = hs_nat; NECHS(&fhsnat); break;
            case 8: csg(expr); break;
            case 9: lisths(); break;
            case 10: listcpt(); break;
            case 11: LSTHS(); break;
```

```
         case 12: LSTCPT(); break;
         case 13: p2out(expr,output_file); output_file[0]=0; break;
         case 14: break;
         default:
            display_menu=TRUE;
            choice=0;
            break;
         }
   }
   while (choice != NITEMS);

/* display cpu time in each function */
   printf("%s\n",dashes);
   printf("Cummulative CPU Times\n\n");
   time=0.0;
   for (i=1;i<=NITEMS;)
      {
      printf("[%7.2f] %s\n",ttime[i],item_text[i]);
      time=time+ttime[i];
      i=i+1;
      }
   printf("\n[%7.2f] Total Time\n",time);
   printf("%s\n",dashes);

/* stop the Parasolid modeler */
   STOMOD(&ifail);

return;
}
#include "insert:parasolid_tokens.h"
#include "insert:hs3com.h"
void naths()
/*
**   Compute natural halfspaces
**
**   Revisions:
**     rv  date      who   reason for change
**     00  08-jan-90 dlv   initial implementation
*/
{
int i, ifail, one = 1;
int contyp, face_list, face_tag, nfaces, rev, surf_tag;

/* idenity the faces connected to the body */
contyp=TYTOFA;
IDCOEN(&brep_body_tag,&contyp,&face_list,&nfaces,&ifail);
ckifail("naths","IDCOEN",ifail,0);

/* for each face, create a halfspace for underlying surface */
for (i=1;i<=nfaces;i++)
   {
   GTTGLI(&face_list,&i,&one,&face_tag,&ifail);
   ckifail("naths","GTTCLI",ifail,0);
   IDSOFF(&face_tag,&surf_tag,&rev,&ifail);
   ckifail("naths","IDSOFF",ifail,0);

/* create 'hs' data */
   crehs(surf_tag,rev);
   }
```

```c
/* delete the face list */
DELENT(&face_list,&ifail);
ckifail("naths","DELENT",ifail,0);

/* set the number of natural halfspaces */
hs_nat = hs_count;
printf("<%7d> Natural Halfspaces\n",hs_nat);

return;
}
#include "insert:hsparm.h"
void p2out(expr,output_file)
/*
** Output a PADL-2 part definition file
**
** Input:
**    expr         : CSG expresssion
**    output_file  : output file name
**                   (prompt for file name, if output_file[0]=0)
**
** Revisions:
**    rv  date       who  reason
**    00  19-jul-90  dlv  initial implementation
**
*/
FINTEGER expr[MAXEXP];
char output_file[];

{
char destination[81];
FINTEGER file_type, file_name_length, fortran_file[133];
FINTEGER iounit, ierr;

int strlen();

/* get the filename from user, if required */
if (strlen(output_file) == 0)
   {
   printf("PADL-2 output destination [screen/file/quit]->");
   scanf("%s",destination);
   if (destination[0] == 's' || destination[0] == 'S')
      file_type = 0;
   else if (destination[0] == 'f' || destination[0] == 'F')
      {
      file_type = 1;
      printf("PADL-2 file name->");
      scanf("%s",output_file);
      }
   else
      return;
   }
else if (strlen(output_file) == 1 && output_file[0] == '*')
   file_type = 0;
else
   file_type = 1;

/* convert file name to integer array to pass to FORTRAN */
if (file_type == 1)
   {
   printf("\nWriting PADL-2 file = <%s>\n",output_file);
```

```
    file_name_length = 0;
    while (output_file[file_name_length] != 0)
       {
       fortran_file[file_name_length] = output_file[file_name_length];
       file_name_length++;
       }
    }

/* open the PADL-2 file */
P2OPEN(&file_type,fortran_file,&file_name_length,&iounit,&ierr);
if (ierr != 0)
   {
   printf("p2out: open failed, error number = <%d>",ierr);
   return;
   }

/* write the PADL-2 definition */
P2DEFN(expr,&iounit);

/* close the file */
P2CLOS(&file_type,&iounit);

return;
}
#include "insert:hsparm.h"
#include "insert:eps.h"
#include "insert:parasolid_tokens.h"
int polar(surface_tag, pole_type, pole, base_pt, normal)
/*
**   Compute polar plane for a surface
**
**   Input:
**      surface_tag : Parasolid surface tage
**      pole_type   : type of data in 'pole'
**                  = 0, finite point at coordinates 'pole'
**                  = 1, point at infinity, in direction of vector 'pole'
**      pole[3]     : coordinates (or vector) of pole (see 'pole_type')
**
**   Output:
**      base_pt[3]  : point on polar plane
**      normal[3]   : normal vector to polar plane
**
**   Returns:
**      polar       : status indicator
**                  = 0, valid plane computed
**                  = 1, invalid polar plane
**
**   Revisions:
**      rv  date      who  reason
**      00  01-jun-90 dlv  initial implementation
*/
int surface_tag, pole_type;
double pole[3], base_pt[3], normal[3];
{
int sftype, sense, ifail, status;
double vec1[3], vec2[3], d1, d2;

int polarcon(), polarcyl(), polarsph();

/* get the surface data */
```

```
        OUTSUR(&surface_tag, &sftype, vec1, vec2, &d1, &d2, &sense, &ifail);
        ckifail("polar","OUTSUR",ifail,0);

/* compute the polar plane based on surface type */
        switch(sftype)
            {

/* plane */
            case TYSUPL:
                status = 1;
                break;

/* cylinder */
            case TYSUCY:
                status = polarcyl(surface_tag,pole_type,pole,base_pt,normal);
                break;

/* sphere */
            case TYSUSP:
                status = polarsph(surface_tag,pole_type,pole,base_pt,normal);
                break;

/* cone */
            case TYSUCO:
                status = polarcon(surface_tag,pole_type,pole,base_pt,normal);
                break;

/* anything else */
            default:
                printf("polar: surface type = %d, not supported\n",sftype);
                ckifail("polar","OUTSUR",1,0);
                break;
            } return (status);
        }
        #include "insert:hsparm.h"
        #include "insert:eps.h"
        #include "insert:parasolid_tokens.h"
        int polarcon(surface_tag,pole_type,pole,base_pt,normal)
        /*
        **  Compute polar plane for a cone
        **
        **  Input:
        **     surface_tag : Parasolid surface tag of cone
        **     pole_type   : type of data in 'pole'
        **                 = 0, finite point at coordinates 'pole'
        **                 = 1, point at infinity, in direction of vector 'pole'
        **     pole[3]     : coordinates (or vector) of pole (see 'pole_type')
        **
        **  Output:
        **     base_pt[3]  : point on polar plane
        **     normal[3]   : normal vector to polar plane
        **
        **  Returns:
        **     polarcon    : status indicator
        **                 = 0, polar plane computed
        **                 = 1, polar plane undefined
        **
        **  Revisions:
```

```
**      rv   date       who
**      00   01-jun-90  dlv    initial implementation
*/
int surface_tag, pole_type;
double pole[3],base_pt[3],normal[3];
{
double d, dist, r, projection[3], apex[3];
double v1[3], v2[3], v3[3], v4[3];
double vec1[3], vec2[3], d1, d2;
int sftype, sense, ifail;

double ptdist(), vdot();

/* get surface data */
OUTSUR(&surface_tag,&sftype,vec1,vec2,&d1,&d2,&sense,&ifail);
ckifail("polarcon","OUTSUR",ifail,0);
if (sftype != TYSUCO)
   return (1);

/* pole point is given */
if (pole_type == 0)
   {

/* project pole point onto cone axis */
   vunit(vec2,v1);
   vsub(pole,vec1,v2);
   d = vdot(v1,v2);
   vsmult(v1,d,v1);
   vadd(vec1,v1,projection);

/* validity condition: radius of cone at projection point must  */
/*                     be greater than distance from pole point */
/*                     to projection of pole point on cone axis */
   coneapex(vec1,vec2,d1,d2,apex);
   r = ptdist(projection,apex) * tan(d2);
   dist = ptdist(projection,pole);
   if (dist <= r)
      return (1);

/* compute the polar plane vec1 */
   d = d1*d1 / dist;
   vsub(pole,projection,v1);
   vunit(v1,v1);
   vsmult(v1,d,v1);
   vsub(projection, apex, v3);
   vsub(vec1, apex, v4);
   if (vdot(v3,v4) >= 0.0)
      vadd(projection,v1,base_pt);
   else
      vsub(projection,v1,base_pt);

/* compute the polar plane normal */
   vsub(base_pt,apex,v1);
   vcross(v1,vec2,v2);
   vcross(v1,v2,normal);
   vunit(normal,normal);
   }

/* pole vector is given */
else /* pole_type == 1 */
```

```
    {
    /* use cone vec1 point as polar plane base point */
       vcopy(vec1,base_pt);

/* compute polar plane containing cone axis */
       vcross(pole,vec2,v1);
       vcross(vec2,v1,v2);
       vunit(v2,normal);
       } return (0);
}
#include "insert:hsparm.h"
#include "insert:eps.h"
#include "insert:parasolid_tokens.h"
int polarcyl(surface_tag,pole_type,pole,base_pt,normal)
/*
**  Compute polar plane for a cylinder
**
**  Input:
**     surface_tag : Parasolid surface tag of cylinder
**     pole_type   : type of data in 'pole'
**                   = 0, finite point at coordinates 'pole'
**                   = 1, point at infinity, in direction of vector 'pole'
**     pole[3]     : coordinates (or vector) of pole (see 'pole_type')
**
**  Output:
**     base_pt[3]  : point on polar plane
**     normal[3]   : normal vector to polar plane
**
**  Returns:
**     polarcyl    : status indicator
**                   = 0, polar plane computed
**                   = 1, polar plane undefined
**
**  Revisions:
**     rv  date       who   reason
**     00  01-jun-90  dlv   initial implementation
*/
int surface_tag, pole_type;
double pole[3], base_pt[3], normal[3];
{
double d, dist, v1[3], v2[3], projection[3];
double vec1[3], vec2[3], d1, d2;
int sftype, sense, ifail;

double ptdist(), vdot();

/* get surface data */
OUTSUR(&surface_tag,&sftype,vec1,vec2,&d1,&d2,&sense,&ifail);
ckifail("polarcyl","OUTSUR",ifail,0);
if (sftype != TYSUCY)
   return (1);

/* pole point is given */
if (pole_type == 0)
   {

/* project pole point onto cylinder axis */
```

```
    vunit(vec2, v1);
    vsub(pole,vec1,v2);
    d = vdot(v1,v2);
    vsmult(v1,d,v1);
    vadd(vec1,v1,projection);

/* validity condition: pole point must be outside cylinder */
    dist = ptdist(projection,pole);
    if (dist <= d1)
        return(1);

/* compute the polar plane normal */
    vsub(pole,projection,v1);
    vunit(v1,normal);

/* compute the polar plane normal */
    d = d1*d1 / dist;
    vsmult(normal,d,v1);
    vadd(projection,v1,base_pt);
    }

/* pole vector is given */
else /* pole_type == 1 */
    {

/* validity condition: pole vector and vec2 cannot be parallel */
    vunit(pole,v1);
    vunit(vec2,v2);
    if (ptdist(v1,v2) < dist_eps)
        return (1);

/* compute polar plane normal */
    vcross(pole,vec2,v1);
    vcross(vec2,v1,v2);
    vunit(v2,normal);

/* use vec2 point as polar plane vec1 */
    vcopy(vec1,base_pt);
    } return (0);
}
#include "insert:hsparm.h"
#include "insert:eps.h"
#include "insert:parasolid_tokens.h"
int polarsph(surface_tag,pole_type,pole,base_pt,normal)
/*
** Compute polar plane for a sphere
**
** Input:
**    surface_tag : Parasolid surface tag of sphere
**    pole_type   : type of data in 'pole'
**                  = 0, finite point at coordinates 'pole'
**                  = 1, point at infinity, in direction of vector 'pole'
**    pole[3]     : coordinates (or vector) of pole (see 'pole_type')
**
** Output:
**    base_pt[3]  : point on polar plane
**    normal[3]   : normal vector to polar plane
**
```

```
**  Returns:
**     polarsph    : status indicator
**                   = 0, polar plane computed
**                   = 1, polar plane undefined
**
**  Revisions:
**     rv  date        who   reason
**     00  01-jun-90   dlv   initial implementation
*/
int surface_tag, pole_type;
double pole[3], base_pt[3], normal[3];
{
double d, dist, v1[3];
double vec1[3], vec2[3], d1, d2;
int ifail, sense, sftype;

double ptdist();

/* get surface data */
OUTSUR(&surface_tag,&sftype,vec1,vec2,&d1,&d2,&sense,&ifail);
ckifail("polarsph","OUTSUR",ifail,0);
if (sftype != TYSUSP)
   return (1);

/* pole point is given */
if (pole_type == 0)
   {

/* validity condition: pole point must be outside sphere */
   dist = ptdist(vec1,pole);
   if (dist <= d1)
      return (1);

/* compute the polar plane normal */
   vsub(pole,vec1,v1);
   vunit(v1,normal);

/* compute the polar plane location */
   d = d1*d1 / dist;
   vsmult(normal,d,v1);
   vadd(vec1,v1,base_pt);
   }

/* pole vector is given */
else /* pole_type == 1 */
   {
   vcopy(vec1,base_pt);
   vunit(pole,normal);
   } return (0);
}
#include "insert:parasolid_tokens.h"
#include "insert:hs3com.h"
#include "insert:eps.h"
void pplanes(surf_taga, surf_tagb)
/*
**  Create polar planes for two surfaces
**
**  Input:
```

```
**      surf_taga : Parasolid  tag for surface 1
**      surf_tagb : Parasolid tag for surface 2
**
**      Revisions:
**       rv   date       who      reason for change
**       00   06-jun-90  dlv      initial implementation
*/
int surf_taga, surf_tagb;

{
int ifail, sftypea, sftypeb, sensea, senseb;
double vec1a[3], vec2a[3], d1a, d2a;
double vec1b[3], vec2b[3], d1b, d2b;
double unused[3], base_pt[3], normal[3], apex[3];

int polar();

/* determine surface data */
OUTSUR(&surf_taga,&sftypea,vec1a,vec2a,&d1a,&d2a,&sensea,&ifail);
ckifail("pplanes","OUTSUR",ifail,0);
OUTSUR(&surf_tagb,&sftypeb,vec1b,vec2b,&d1b,&d2b,&senseb,&ifail);
ckifail("pplanes","OUTSUR",ifail,0);

/*****************************************************/
/*  Table of planes to create:                       */
/*                          sftypeb                  */
/*                    sph    cyl    con              */
/*             sph    n,n    y,n    y,n              */
/*   sftypea   cyl    y,n    y,y    y,y              */
/*             con    y,n    y,y    y,y              */
/*****************************************************/

/* sphere and cylinder */
if (sftypea == TYSUSP && sftypeb == TYSUCY)
    {
    if (polar(surf_taga,1,vec2b,base_pt,normal) == 0)
        creplane(2,base_pt,normal,unused);
    }

/* sphere and cone */
else if (sftypea == TYSUSP && sftypeb == TYSUCO)
    {
    coneapex(vec1b,vec2b,d1b,d2b,apex);
    if (polar(surf_taga,0,apex,base_pt,normal) == 0)
        creplane(2,base_pt,normal,unused);
    }

/* cylinder and sphere */
else if (sftypea == TYSUCY && sftypeb == TYSUSP)
    {
    if (polar(surf_tagb,1,vec2a,base_pt,normal) == 0)
        creplane(2,base_pt,normal,unused);
    }

/* cylinder and cylinder */
else if (sftypea == TYSUCY && sftypeb == TYSUCY)
    {
    if (polar(surf_tagb,1,vec2a,base_pt,normal) == 0)
        creplane(2,base_pt,normal,unused);
    if (polar(surf_taga,1,vec2b,base_pt,normal) == 0)
```

```
        creplane(2,base_pt,normal,unused);
}

/* cylinder and cone */
else if (sftypea == TYSUCY && sftypeb == TYSUCO)
{
    if (polar(surf_tagb,1,vec2a,base_pt,normal) == 0)
        creplane(2,base_pt,normal,unused);
    coneapex(vec1b,vec2b,d1b,d2b,apex);
    if (polar(surf_taga,0,apex,base_pt,normal) == 0)
        creplane(2,base_pt,normal,unused);
}

/* cone and sphere */
else if (sftypea == TYSUCO && sftypeb == TYSUSP)
{
    coneapex(vec1a,vec2a,d1a,d2a,apex);
    if (polar(surf_tagb,0,apex,base_pt,normal) == 0)
        creplane(2,base_pt,normal,unused);
}

/* cone and cylinder */
else if (sftypea == TYSUCO && sftypeb == TYSUCY)
{
    if (polar(surf_taga,0,vec2b,base_pt,normal) == 0)
        creplane(2,base_pt,normal,unused);
    coneapex(vec1a,vec2a,d1a,d2a,apex);
    if (polar(surf_tagb,0,apex,base_pt,normal) == 0)
        creplane(2,base_pt,normal,unused);
}

/* cone and cone */
else if (sftypea == TYSUCO && sftypeb == TYSUCO)
{
    coneapex(vec1a,vec2a,d1a,d2a,apex);
    if (polar(surf_tagb,0,apex,base_pt,normal) == 0)
        creplane(2,base_pt,normal,unused);
    coneapex(vec1b,vec2b,d1b,d2b,apex);
    if (polar(surf_taga,0,apex,base_pt,normal) == 0)
        creplane(2,base_pt,normal,unused);
} return;
}
double ptdist(p1,p2)
/*
**  Compute the distance between two points
**
**  Input:
**     p1[3] : point 1
**     p2[3] : point 2
**
**  Returns:
**     distance between point 1 and 2
**
**  Revisions:
**     rv  date      who  reason
**     00  12-jan-90 dlv  initial implementation
*/
double p1[3], p2[3];
```

```
{
double dx, dy, dz;
double sqrt();

dx = p1[0] - p2[0];
dy = p1[1] - p2[1];
dz = p1[2] - p2[2];

return ( sqrt(dx*dx+dy*dy+dz*dz) );
}
#include "insert:parasolid_ifails.h"
void readps(filename)
/*
** Read Parasolid .XMT_TXT file
**
** Input:
**    filename : name of file to read (asks for name if null string)
**
** Revisions:
**    rv  date      who  reason
**    00  15-jan-90 dlv  initial implementation
**
*/
char filename[];
{
int ifail, len, part_tag;
int strlen();

/* read the file */
do
    {

/* get the filename from user, if required */
    if (strlen(filename) == 0)
       {
       printf("\nRead Parasolid Transmit File\n");
       printf("  -> File must reside in current directory.\n");
       printf("  -> No file name extension is allowed.\n\n");
       printf("XMT_TXT filename->");
       scanf("%s",filename);
       }

/* retrieve the file */
    printf("\nReading filename = <%s.XMT_TXT>\n",filename);
    len=strlen(filename);
    GETMOD(&len,filename,&part_tag,&ifail);
    ckifail("readps","GETMOD",ifail,0);
    filename = "";
    } while (ifail != 0);

return;
}
#include "insert:parasolid_tokens.h"
#include "insert:hs3com.h"
void sephs()
/*
** Compute separating planes
**
** Revisions:
```

```
**      rv  date       who   reason for change
**      00  18-may-90  dlv   initial implementation
*/

{
int contyp,one=1,ifail;
int face_list, edge_list, vertex_list, loop_list;
int nface, nedge, nvertex, nloop;
int iface, iedge, ivertex, iloop;
int face_tag, edge_tag, vertex_tag, loop_tag;
int surf_tag, revers, sftype, sense;
double vec1[3], vec2[3], d1,d2;

/* identify all the faces on the body */
contyp=TYTOFA;
IDCOEN(&brep_body_tag,&contyp,&face_list,&nface,&ifail);
ckifail("sephs","IDCOEN",ifail,0);

/* process all the faces */
for (iface=1;iface<=nface;iface++)
    {

/* get the face tag for this face */
    GTTGLI(&face_list,&iface,&one,&face_tag,&ifail);
    ckifail("sephs","GTTGLI",ifail,0);

/* ignor planar faces */
    IDSOFF(&face_tag,&surf_tag,&revers,&ifail);
    ckifail("sephs","IDSOFF",ifail,0);
    OUTSUR(&surf_tag,&sftype,vec1,vec2,&d1,&d2,&sense,&ifail);
    ckifail("sephs","OUTSUR",ifail,0);
    if (sftype == TYSUPL)
       continue;

/* identify all the loops on the face */
    contyp=TYTOLO;
    IDCOEN(&face_tag,&contyp,&loop_list,&nloop,&ifail);
    ckifail("sephs","IDCOEN",ifail,0);

/* process all the loops on the face */
    for (iloop=1;iloop<=nloop;iloop++)
        {

/* get the loop tag for this loop */
        GTTGLI(&loop_list,&iloop,&one,&loop_tag,&ifail);
        ckifail("sephs","GTTGLI",ifail,0);

/* identify all the vertices on the loop */
        contyp=TYTOVX;
        IDCOEN(&loop_tag,&contyp,&vertex_list,&nvertex,&ifail);
        ckifail("sephs","IDCOEN",ifail,0);

/* create separating planes through triplets of vertices */
        vplanes(vertex_list,nvertex);

/* delete the vertext list */
        DELENT(&vertex_list,&ifail);
        ckifail("sephs","DELENT (verticies)",ifail,0);

}
```

```c
    /* delete the loop list */
       DELENT(&loop_list,&ifail);
       ckifail("sephs","DELENT (loops)",ifail,0);

}

/* delete the face list */
    DELENT(&face_list,&ifail);
    ckifail("sephs","DELENT (faces)",ifail,0);

/* identify all the edges on the body */
    contyp=TYTOED;
    IDCOEN(&brep_body_tag,&contyp,&edge_list,&nedge,&ifail);
    ckifail("sephs","IDCOEN",ifail,0);

/* create separating planes through each edge */
    if (nedge > 0)
       {
       eplanes(edge_list,nedge);

/* delete the edge list */
       DELENT(&edge_list,&ifail);
       ckifail("sephs","DELENT (edges)",ifail,0);
       }

/* number of separating planes */
    printf("<%7d> Separating Planes\n",hs_count-hs_nat);

return;
    }
    #include "insert:parasolid_tokens.h"
    #include "insert:eps.h"
    #include "insert:hsparm.h"
    #include "insert:hs3com.h"
    int tanplane(edge_tag,pt,norm)
    /*
    **   Compute plane tangent to an open edge
    **
    **   Input:
    **      edge_tag : Parasolid edge tag
    **
    **   Output:
    **      pt[3]    : position of tangent plane
    **      norm[3]  : vector normal to tangent plane
    **
    **   Returns:
    **      tanplane : error status
    **               = 0, plane computed
    **               = 1, plane not computed
    **
    */
    int edge_tag;
    double pt[3], norm[3];

{
    int curve_tag, ifail;
    int contyp, vertex_list, nvertex;
    int vertex_tag[2], point_tag[2], one=1, two=2, pttype;
    double a[3], b[3], zero=0.0, *point_coords;
```

```c
double t, tl, ta, tb, p[9], va[3], vb[3], f0t, f1t;
int point_list, npoints, n, unused, pc_tag;
int max_iterations=100;
double fabs(), vdot();

/* get the curve underlying the edge */
IDCOFE(&edge_tag,&curve_tag,&ifail);
ckifail("tanplane","IDCOFE",ifail,0);

/* get the vertices of the edge */
contyp = TYTOVX;
IDCOEN(&edge_tag,&contyp,&vertex_list,&nvertex,&ifail);
ckifail("tanplane","IDCOEN",ifail,0);
if (nvertex != 2)
   {
   DELENT(&vertex_list,&ifail);
   ckifail("tanplane","DELENT",ifail,0);
   return (1);
   }

/* get the end points of the edge */
GTTGLI(&vertex_list,&one,&two,vertex_tag,&ifail);
ckifail("tanplane","GTTGLI",ifail,0);
DELENT(&vertex_list,&ifail);
ckifail("tanplane","DELENT",ifail,0);
IDPOFV(&vertex_tag[0],&point_tag[0],&ifail);
ckifail("tanplane","IDPOFV",ifail,0);
IDPOFV(&vertex_tag[1],&point_tag[1],&ifail);
ckifail("tanplane","IDPOFV",ifail,0);
OUTPOI(&point_tag[0],&pttype,a,&ifail);
ckifail("tanplane","OUTPOI",ifail,0);
OUTPOI(&point_tag[1],&pttype,b,&ifail);
ckifail("tanplane","OUTPOI",ifail,0);

/* create a parametric curve */
OUCOCU(&curve_tag,a,b,&zero,&zero,&zero,&point_list,&n,&ifail);
if (ifail != 0)
   {
   printf("tanplane: OUCOCU failed, edge_tag = %d, ignoring\n", edge_tag);
   return (1);
   }
/*ckifail("tanplane","OUCOCU",ifail,0);*/
point_coords = (double *) malloc(n * sizeof(double));
if (point_coords == NULL)
   ckifail("tanplane","malloc",1,0);
GTRLLI(&point_list,&one,&n,point_coords,&ifail);
ckifail("tanplane","GTRLLI",ifail,0);
DELENT(&point_list,&ifail);
ckifail("tanplane","DELENT",ifail,0);
npoints = (n+1)/3;
n = 0;
CRSPPC(&npoints,point_coords,&n,&unused,&unused,&pc_tag,&ifail);
ckifail("tanplane","CRSPPC",ifail,0);
free(point_coords);

/* determine the parameter values of the end points */
ENPAPC(&pc_tag,a,&ta,&ifail);
ckifail("tanplane","ENPAPC",ifail,0);
ENPAPC(&pc_tag,b,&tb,&ifail);
ckifail("tanplane","ENPAPC",ifail,0);
```

```
/*****************************************************/
/*                                                   */
/* Newton-Raphson iteration to find tangent plane    */
/*                                                   */
/* p(t) = parametric curve function                  */
/* f(t) = function of tangent plane                  */
/*      = p'(t) . [ (p(t)-a) x (p(t)-b) ]            */
/* f'(t)= p"(t) . [ (p(t)-a) x (p(t)-b) ]            */
/*                                                   */
/* a, b are end points of the curve                  */
/*                                                   */
/* iteration is ti+1 = ti - f(ti)/f'(ti)             */
/*                                                   */
/*****************************************************/
/* initialize parameter and point */
t1 = (ta + tb) / 2.0;
vcopy(a,p);
n = 0;

/* iterate to find point */
do
    {

/* prepare for next iteration */
    t = t1;
    vcopy(p,pt);

/* evaluate curve at current parameter */
/*    p[0-2] = point coordinates   p(t)   */
/*    p[3-5] = first derivative    p'(t)  */
/*    p[6-8] = second derivative   p"(t)  */
    ENPOPC(&pc_tag,&t,&two,p,&ifail);
    ckifail("tanplane","ENPOPC",ifail,0);

/* compute required end point vectors */
    vsub(&p[0],a,va);
    vsub(&p[0],b,vb);
    vcross(va,vb,norm);

/* compute f(t) and f'(t) */
    f0t = vdot(&p[3],norm);
    f1t = vdot(&p[6],norm);
    vunit(norm,norm);

/* compute ti+1 */
    t1 = t - f0t / f1t;
    n++;
    }
    while (fabs(f0t) > zero_eps && n <= max_iterations);

DELENT(&pc_tag,&ifail);
ckifail("tanplane","DELENT",ifail,0);

/* return last point in iteration */
if (n > max_iterations)
    printf("tanplane: maximum number of iterations exceeded\n");
vcopy(p,pt);
printf("tanplane:  <%3d> iterations required\n",n);
printf("    pt[*]   = (%8.3f,%8.3f,%8.3f)\n",pt[0],pt[1],pt[2]);
```

```
printf("    norm[*] = (%8.3f,%8.3f,%8.3f)\n",norm[0],norm[1],norm[2]);

return (0);
}
/*****************************************************************/
void vadd(v1,v2,v3)
/*
** Add two vectors
**
** Input:
**    v1[3] - vector 1
**    v2[3] - vector 2
**
** Output:
**    v3[3] - v1 + v2
**
** Revisions:
**    rv  date       who  reason
**    00  08-jan-90  dlv  initial implementation
*/
double v1[3], v2[3], v3[3];
{
v3[0] = v1[0] + v2[0];
v3[1] = v1[1] + v2[1];
v3[2] = v1[2] + v2[2];

return;
}
/*****************************************************************/
void vassign(i,j,k,v)
/*
** Assign values to a vector
**
** Input:
**    i, j, k - vector components
**
** Output:
**    v[3] - vector
**
** Revisions:
**    rv  date       who  reason
**    00  17-jan-90  dlv  initial implementation
*/
double i, j, k, v[3];
{
v[0] = i;
v[1] = j;
v[2] = k;

return;
}
/*****************************************************************/
void vcopy(v1,v2)
/*
** Copy a vector
**
** Input:
**    v1[3] - vector to copy
**
** Output:
```

```
**      v2[3] - copy of v1
**
**   Revisions:
**      rv  date        who  reason
**      00  17-jan-90   dlv  initial implementation
*/
double v1[3], v2[3];
{
v2[0] = v1[0];
v2[1] = v1[1];
v2[2] = v1[2];

return;
}
/******************************************************************/
void vcross(v1,v2,v3)
/*
**   Compute cross product
**
**   Input:
**      v1[3] - vector 1
**      v2[3] - vector 2
**
**   Output:
**      v3[3] - v1 x v2
**
**   Revisions:
**      rv  date        who  reason
**      00  13-jan-90   dlv  initial implementation
*/
double v1[3], v2[3], v3[3];

{
v3[0] =   v1[1]*v2[2] - v2[1]*v1[2];
v3[1] = -(v1[0]*v2[2] - v2[0]*v1[2]);
v3[2] =   v1[0]*v2[1] - v2[0]*v1[1];

return;
}
/******************************************************************/
double vdot(v1,v2)
/*
**   Compute dot product
**
**   Input:
**      v1[3] - vector 1
**      v2[3] - vector 2
**
**   Returns:
**      v1 . v2
**
**   Revisions:
**      rv  date        who  reason
**      00  13-jan-90   dlv  initial implementation
*/
double v1[3], v2[3];

{
return (v1[0]*v2[0] + v1[1]*v2[1] + v1[2]*v2[2]);
}
```

```
/*******************************************************************/
double vmag(v)
/*
**   Compute magnitude of a vector
**
**   Input:
**      v[3] - the vector
**
**   Returns:
**      | v |
**
**   Revisions:
**      rv   date       who   reason
**      00   18-jan-90  dlv   initial implementation
*/
double v[3];

{
double sqrt();

return (sqrt(v[0]*v[0] + v[1]*v[1] + v[2]*v[2]));
}
/*******************************************************************/
void vneg(v1,v2)
/*
**   Negate a vector.
**
**   Input:
**      v1[3] - the vector
**
**   Output:
**      v2[3] - vector in opposite direction
**
**   Revisions:
**      rv   date       who   reason
**      00   08-jan-90  dlv   initial implementation
*/
double v1[3], v2[3];
{
v2[0] = -v1[0];
v2[1] = -v1[1];
v2[2] = -v1[2];

return;
}
/*******************************************************************/
void vsmult(v1,s,v2)
/*
**   Multiply a vector by a scalar
**
**   Input:
**      v1[3] - the vector
**      s     - the scalar
**
**   Output:
**      v2[3] - s * v1
**
**   Revisions:
**      rv   date       who   reason
**      00   09-jan-90  dlv   initial implementation
```

```
*/
double v1[3], s, v2[3];
{
v2[0] = s * v1[0];
v2[1] = s * v1[1];
v2[2] = s * v1[2];

return;
}
/*******************************************************************/
void vsub(v1,v2,v3)
/*
**  Subtract two vectors
**
**  Input:
**     v1[3] - vector 1
**     v2[3] - vector 2
**
**  Output:
**     v3[3] - v1 - v2
**
**  Revisions:
**     rv   date      who  reason
**     00   08-jan-90 dlv  initial implementation
*/
double v1[3], v2[3], v3[3];
{
v3[0] = v1[0] - v2[0];
v3[1] = v1[1] - v2[1];
v3[2] = v1[2] - v2[2];

return;
}
/*******************************************************************/
void vunit(v1,v2)
/*
**  Compute unit vector
**
**  Input:
**     v1[3] - the vector
**
**  Output:
**     v2[3] - unit vector
**
**  Revisions:
**     rv   date      who  reason
**     00   09-jan-90 dlv  initial implementation
*/
double v1[3], v2[3];

{
double s;
double sqrt();

s = sqrt(v1[0]*v1[0] + v1[1]*v1[1] + v1[2]*v1[2]);
if (s > 1.0e-10)
   {
   v2[0] = v1[0]/s;
   v2[1] = v1[1]/s;
   v2[2] = v1[2]/s;
```

```
    return;
}
#include "insert:parasolid_tokens.h"
#include "insert:hs3com.h"
void vplanes(vertex_list,nvertex)
/*
** Create separating planes through triplets of vertices
**
** Input:
**    vertex_list : Parasolid list of verticies
**    nvertex     : Number of vertices in the list
**
** Revisions:
**    rv date       who   reason for change
**    00 18-may-90  dlv   initial implementation
*/
int vertex_list, nvertex;

{
int i, j, k, ifail, one=1, vertex_tag, pt_tag, pttype;
double p1[3], p2[3], p3[3];

/* must be at least three vertices to make any plane */
if (nvertex < 3)
   return;

/* first vertex of triplet */
for (i=1;i<=(nvertex-2);i++)
   {
   GTTGLI(&vertex_list,&i,&one,&vertex_tag,&ifail);
   ckifail("vplanes","GTTGLI",ifail,0);
   IDPOFV(&vertex_tag,&pt_tag,&ifail);
   ckifail("vplanes","IDPOFV",ifail,0);
   OUTPOI(&pt_tag,&pttype,p1,&ifail);
   ckifail("vplanes","OUTPOI",ifail,0);

/* second vertex of triplet */
   for (j=i+1;j<=(nvertex-1);j++)
      {
      GTTGLI(&vertex_list,&j,&one,&vertex_tag,&ifail);
      ckifail("vplanes","GTTGLI",ifail,0);
      IDPOFV(&vertex_tag,&pt_tag,&ifail);
      ckifail("vplanes","IDPOFV",ifail,0);
      OUTPOI(&pt_tag,&pttype,p2,&ifail);
      ckifail("vplanes","OUTPOI",ifail,0);

/* third vertex of triplet */
      for (k=j+1;k<=nvertex;k++)
         {
         GTTGLI(&vertex_list,&k,&one,&vertex_tag,&ifail);
         ckifail("vplanes","GTTGLI",ifail,0);
         IDPOFV(&vertex_tag,&pt_tag,&ifail);
         ckifail("vplanes","IDPOFV",ifail,0);
         OUTPOI(&pt_tag,&pttype,p3,&ifail);
         ckifail("vplanes","OUTPOI",ifail,0);

/* create the plane */
         creplane(1,p1,p2,p3);
```

```
            } /* end of third vertex 'for (...)' */

} /* end of second vertex 'for (...)' */

} /* end of first vertex 'for (...)' */
   return;
}
        SUBROUTINE APPEXP(HEAD,TAIL)
C
C   APPEND AN EXPRESSION
C
C   INPUT:
C      HEAD : EXPRESSION TO APPEND TO
C      TAIL : EXPRESSION TO APPEND
C
C   OUTPUT:
C      HEAD : NEW EXPRESSION
C
C   DESCRIPTION:
C      THIS SUBROUTINE APPENDS ONE EXPRESSION TO ANOTHER
C
C   REVISIONS:
C      RV  DATE       WHO  REASON
C      00  08-MAR-88  DLV  INITIAL IMPLEMENTATION
C
        INTEGER HEAD(0:*),TAIL(0:*)
        INTEGER I
#EXEC
C/EXEC
C
C *** APPEND
        DO 100 I=1, TAIL(0)
            HEAD(HEAD(0)+I)=TAIL(I)
100     CONTINUE
C
C *** SET LENGTH OF EXPRESSION
        HEAD(0)=HEAD(0)+TAIL(0)

RETURN
        END
        SUBROUTINE ARCTAN(Y,X,ANGLE)
C
C   COMPUTE ANGLE=ARCTAN(Y/X) IN APPROPRIATE QUADRANT
C
C   INPUT:
C      Y : Y COORDINATE
C      X : X COORDINATE
C
C   OUTPUT:
C      ANGLE : ARCTAN(Y/X), 0 <= ANGLE < TWOPI (RADIANS)
C
C   REVISIONS:
C      RV  DATE       WHO  REASON
C      00  27-JUL-90  DLV  ADAPTED FROM UG ROUTINE 'H053'
C
        REAL Y,X,ANGLE
        REAL NIL
        PARAMETER (NIL = 1.0E-10)
C
```

```
      REAL ABS, ATAN
C
C/EXEC
C
C *** CHECK FOR COORDINATE ON X-AXIS
      IF (ABS(Y) .LT. NIL) THEN
         IF (X .LT. 0) THEN
            ANGLE = PI
         ELSE
            ANGLE = 0.0
         END IF
C
C *** CHECK FOR COORDINATE ON Y-AXIS
      ELSEIF (ABS(X) .LT. NIL) THEN
         IF (Y .LT. 0.0) THEN
            ANGLE = 3.0*PI/2.0
         ELSE
            ANGLE = PI/2.0
         END IF
C
C *** GENERAL ANGLE (IN PROPER QUADRANT)
C *** ATAN FUNCTION RETURNS ANGLE IN THE RANGE -PI/2 TO +PI/2
      ELSE
         ANGLE = ATAN(Y/X)
         IF (X .GT. 0.0  .AND.  Y .GT. 0.0) THEN      ! Q1 (+,+)
            CONTINUE
         ELSEIF (X .LT. 0.0  .AND.  Y .GT. 0.0) THEN  ! Q2 (-,+)
            ANGLE = ANGLE + PI
         ELSEIF (X .LT. 0.0  .AND.  Y .LT. 0.0) THEN  ! Q3 (-,-)
            ANGLE = ANGLE + PI
         ELSE                                         ! Q4 (+,-)
            ANGLE = ANGLE + TWOPI
         END IF
      END IF

RETURN
      END
      SUBROUTINE CLASS()
C
C  CLASSIFY THE CHARACTERISTIC POINTS WITH RESPECT TO THE SOLID
C
C  REVISIONS
C     RV  DATE       WHO  REASON
C     00  25-MAY-90  DLV  INITIAL IMPLEMENTATION
C
#INCLUDE 'HSDATA.INS'
      INTEGER NIN, NON, NOUT, I
#EXEC
C/EXEC
C
C *** PASS ARRAYS TO 'C' ROUTINE WHICH DOES THE WORK
      CALL CLSSOL(CPTX,CPTY,CPTZ,CPTCLS,CPTNUM)
C
C *** REPORT RESULTS OF CLASSIFICATION
      NIN = 0
      NON = 0
      NOUT = 0
      DO 100 I = 1, CPTNUM
         IF (CPTCLS(I) .EQ. IN) THEN
            NIN = NIN + 1
```

```
              ELSEIF (CPTCLS(I) .EQ. OUT) THEN
                 NOUT = NOUT + 1
              ELSE
                 NON = NON + 1
              END IF
100        CONTINUE
           PRINT *, '<',NIN,        '> Points Classified INSIDE Solid'
           PRINT *, '<',NON,        '> Points Classified ON Solid'
           PRINT *, '<',NOUT,       '> Points Classified OUTSIDE Solid'

RETURN
           END
           LOGICAL FUNCTION CPTSEP(CPT1,CPT2,HS)
C
C     DETERMINE IF A HALF SPACE VALIDLY SEPARATES TWO CHARACTERISTIC POINTS
C     WITH RESPECT TO THE SWEEP OUTLINE.
C
C     INPUT:
C       CPT1 : CHARACTERISTIC POINT #1
C       CPT2 : CHARACTERISTIC POINT #2
C       HS   : HALF SPACE NUMBER
C
C     RETURNS:
C       .TRUE. : EITHER 1) CPT1 & CPT2 HAVE THE SAME CLASSIFICATION WITH
C                          RESPECT TO THE OUTLINE;
C                OR     2) CPT1 & CPT2 HAVE OPPOSITE CLASSIFICATIONS WITH
C                          RESPECT TO THE OUTLINE, AND THE CLASSIFICATION OF
C                          EACH WITH RESPECT TO 'HS' MATCHES THE CLASSIFI-
C                          CATION WITH RESPECT TO THE OUTLINE.
C       .FALSE.: ANY OTHER COMBINATION
C
C     DESCRIPTION:
C       THIS ROUTINE DETERMINES IF A HALF SPACE VALIDLY SPEAPRATES TWO
C       CHARACTERISTIC POINTS.
C
C     REVISIONS:
C       RV  DATE       WHO  REASON
C       00  06-JUN-88  DLV  INITIAL VERSION
C
       INTEGER CPT1,CPT2,HS
C
#INCLUDE 'HSDATA.INS'
#EXEC
C/EXEC
C
C *** SAME CLASSIFICATION WITH RESPECT TO OUTLINE?
       IF (CPTCLS(CPT1) .EQ. CPTCLS(CPT2)) THEN
          CPTSEP=.TRUE.
          GOTO 999
       END IF
C
C *** DO HALF SPACE CLASSIFICATIONS MATCH OUTLINE CLASSIFICATIONS?
       IF ( (CPTCHS(CPT1,HS) .EQ. CPTCLS(CPT1)) .AND.
     1      (CPTCHS(CPT2,HS) .EQ. CPTCLS(CPT2)) ) THEN
          CPTSEP=.TRUE.
          GOTO 999
       END IF
C
C *** OTHERWISE, NOT VALID
       CPTSEP=.FALSE.
```

```
999   RETURN
      END
      REAL FUNCTION CPUSEC(START)
      IMPLICIT NONE
C
C  RECORDS CPU SECONDS FROM 'START' TIME
C
C  EXAMPLE USAGE [FORTRAN]
C
C         T0 = CPUSEC(0.0)
C         .
C         .    PROGRAM TO BE TIMED
C         .
C         T1 = CPUSEC(T0)
C         PRINT T1
C
C  INPUT:
C     START - A BASE CPU TIME
C
C  RETURNS:
C     CPUSEC - DIFFERENCE BETWEEN PROCESS CPU TIME AND 'START'
C
C  SYSTEM DEPENDENCIES:
C     CALLS LIB$INIT_TIMER AND LIB$STAT_TIMER
C
C  REVISIONS:
C     RV  DATE         WHO  REASON FOR CHANGE
C     00  05-JAN-90    DLV  INITIAL IMPLEMENTATION
C
      REAL START
C
C *** CPUCOD - CODE TO LIB$STAT TIME TO GET CPU TIME
C *** HANDLE - INTERNAL LOCATION OF TIMER
C *** TIMES  - CPU TIME RETURNED (IN 10 MILLISECONDS)
C
      INTEGER*4 CPUCOD,HANDLE,TIMES
C
      LOGICAL*4 LIB$INIT_TIMER, LIB$STAT_TIMER
C
      DATA HANDLE/0/, CPUCOD/2/
C/EXEC
C
C *** IF THIS IS THE FIRST TIME, INITIALIZE TIMER.
C
      IF (HANDLE .EQ. 0) THEN
          IF (.NOT. LIB$INIT_TIMER(HANDLE)) THEN
C
C *** COULD NOT INITIALIZE TIMER (ERROR).
C
              HANDLE=0
              CPUSEC=0.0
              RETURN
              END IF
          END IF
C
C *** NOW DETERMINE ELAPSED TIME SINCE INITIALIZATION
C
      IF (.NOT. LIB$STAT_TIMER(CPUCOD,TIMES,HANDLE)) THEN
C
```

```
C *** COULD NOT GET TIME  (ERROR)
C
      CPUSEC=0.0
      HANDLE=0
C
C *** CONVERT RETURNED TIME
C
      ELSE
        CPUSEC = TIMES * (0.01) - START
      END IF

RETURN
      END
      SUBROUTINE CPYCPT(N,STAT,X,Y,Z,CHS,CHSL,CLS)
C
C  COPY DATA INTO FORTRAN 'HSDATA' FOR CHARACTERISTIC POINTS
C
C  INPUT:
C    N     : CPT NUMBER
C    STAT  : CPSTAT(N)
C    X     : CPTX(N)
C    Y     : CPTY(N)
C    Z     : CPTZ(N)
C    CHS   : CPTCHS(*)   [AN ARRAY OF CLASSIFICATIONS]
C    CHSL  : LENGTH OF CHS ARRAY
C    CLS   : CPTCLS(N)
C
C  REVISIONS
C    RV  DATE       WHO  REASON
C    00  16-JAN-90  DLV  INITIAL IMPLEMENTATION
C    01  25-MAY-90  DLV  ADDED 'Z' COORDINATE
C
      INTEGER N,STAT,CHSL,CLS
      INTEGER*4 CHS(*)
      REAL X,Y,Z
#INCLUDE 'HSDATA.INS'
      INTEGER I
#EXEC
C/EXEC
C
C *** FILL IN THE DATA
      CPSTAT(N) = STAT
      CPTX(N) = X
      CPTY(N) = Y
      CPTZ(N) = Z
      DO 100 I = 1, CHSL
        CPTCHS(N,I) = CHS(I)
100   CONTINUE
      CPTCLS(N) = CLS

C
C *** SET NUMBER OF CHARACTERISTIC POINTS
      IF (N .GT. CPINUM) THEN
        CPINUM = N
      ENDIF

RETURN
      END
      SUBROUTINE CPYEXP(SOURCE,DEST)
C
```

```
C  COPY AN EXPRESSION
C
C  INPUT:
C    SOURCE : EXPRESSION TO COPY FROM
C
C  OUTPUT:
C    DEST :   EXPRESSION TO COPY TO
C
C  DESCRIPTION:
C    THIS SUBROUTINE COPIES ONE EXPRESSION INTO ANOTHER
C
C  REVISIONS:
C    RV   DATE       WHO   REASON
C    00   03-MAR-88  DLV   INITIAL IMPLEMENTATION
C
      INTEGER SOURCE(0:*),DEST(0:*)
      INTEGER I
#EXEC
C/EXEC
C
C *** COPY
      DO 100 I=0, SOURCE(0)
          DEST(I)=SOURCE(I)
100   CONTINUE

RETURN
      END
      SUBROUTINE CPYHS(N,STAT,COEF,TYPE,CHR1,CHR2)
C
C  COPY DATA INTO FORTRAN 'HSDATA' FOR HALFSPACES
C
C  INPUT:
C    N    : HALFSPACE NUMBER
C    STAT : HSSTAT(N)
C    COEF : HSCOEF(N,*) [3 REALS]
C    TYPE : HSTYPE(N)
C    CHR1 : HSNAME(N)(1:1) = CHAR(CHR1)
C    CHR2 : HSNAME(N)(1:1) = CHAR(CHR2)
C
C  REVISIONS
C    RV   DATE       WHO   REASON
C    00   16-JAN-90  DLV   INITIAL IMPLEMENTATION
C
      INTEGER N, STAT, TYPE, CHR1, CHR2
      REAL COEF(3)
#INCLUDE 'HSDATA.INS'
#EXEC
C/EXEC
C
C *** FILL IN THE DATA
      HSSTAT(N) = STAT
      HSCOEF(N,1) = COEF(1)
      HSCOEF(N,2) = COEF(2)
      HSCOEF(N,3) = COEF(3)
      HSTYPE(N) = TYPE
      HSNAME(N)(1:1) = CHAR(CHR1)
      HSNAME(N)(2:2) = CHAR(CHR2)

C
C *** SET NUMBER OF HALFSPACES
```

```
              IF (N .GT. HSNUM) then then
                  HSNUM = N
              ENDIF RETURN
              END
              SUBROUTINE DOMINT(DOMEXP,LEVEL,CHANGE)
C
C     EXTRACT DOMINATING INTERSECTION HALF SPACES
C
C     INPUT:
C        DOMEXP : CURRENT DOMINATING EXPRESSION
C        LEVEL  : RECURSION LEVEL
C
C     OUTPUT:
C        DOMEXP : NEW DOMINATING EXPRESSSION
C        CHANGE : .FALSE., NO HALF SPACES EXTRACTED
C                 .TRUE.,  AT LEAST ON HALF SPACE EXTRACTED
C
C     DESCRIPTION:
C        THIS SUBROUTINE EXTRACTS THE DOMINATING INTERSECTING HALF SPACES
C
C     REVISIONS:
C        RV  DATE        WHO   REASON
C        00  18-MAR-88   DLV   INITIAL IMPLEMENTATION
C
              INTEGER DOMEXP(0:*),LEVEL
              LOGICAL CHANGE
C
#INCLUDE 'HSDATA.INS'
              INTEGER I,J
#EXEC
C/EXEC
C
C *** NO CHANGES, YET
              CHANGE=.FALSE.
C
C *** EXTRACT REQUIRED HALF SPACES WHOSE MATERIAL SIDE CONTAINS ALL
C *** THE CHARACTERISTIC POINTS INSIDE THE OUTLINE
              DO 300 I=HSNUM, 1, -1
                  IF (HSSTAT(I) .NE. LEVEL) GOTO 300
                  DO 100 J=1, CPTNUM
C
C *** IS CHARACTERISTIC POINT ACTIVE?
                      IF (CPSTAT(J) .EQ. LEVEL) THEN
C
C *** IS POINT INSIDE OUTLINE?
                          IF (CPTCLS(J) .EQ. IN) THEN
C
C *** IS POINT INSIDE HALF SPACE?
                              IF (CPTCHS(J,I) .NE. IN) GOTO 300
                          END IF
                      END IF
100               CONTINUE
C
C *** ALL CHARACTERISTIC POINTS INSIDE HALF SPACE
C *** ELIMINATE IT...
                  CHANGE=.TRUE.
                  HSSTAT(I)=LEVEL-1
C
```

```
C *** INSERT DOMINATING HALF SPACE INTO EXPRESSION
         DO 150 J=DOMEXP(0),1,-1
             DOMEXP(J+2)=DOMEXP(J)
150         CONTINUE
         DOMEXP(0)=DOMEXP(0)+2
         DOMEXP(1)=I
         DOMEXP(2)=INTSCT
C
C *** REMOVE THE CHARACTERISTIC POINT OUTSIDE THIS HALF SPACE
         DO 200 J=1, CPTNUM
             IF (CPSTAT(J) .EQ. LEVEL) THEN
                 IF (CPTCHS(J,I) .EQ. OUT) CPSTAT(J)=LEVEL-1
             END IF
200         CONTINUE
300      CONTINUE

RETURN
      END
      SUBROUTINE DOMUN(DOMEXP,LEVEL,CHANGE)
C
C  EXTRACT DOMINATING 'UNION' HALF SPACES
C
C  INPUT:
C     DOMEXP : CURRENT DOMINATING EXPRESSION
C     LEVEL  : RECURSION LEVEL
C
C  OUTPUT:
C     DOMEXP : NEW DOMINATING EXPRESSION
C     CHANGE : =.FALSE., NO UNION HALF SPACES FOUND
C              =.TRUE.,  AT LEAST ONE UNION HALF SPACE FOUND
C
C  DESCRIPTION:
C     THIS SUBROUTINE EXTRACTS THE DOMINATING UNION HALF SPACES
C
C  REVISIONS:
C     RV  DATE        WHO  REASON
C     00  28-MAR-88   DLV  INITIAL IMPLEMENTATION
C
      INTEGER DOMEXP(0:*),LEVEL
      LOGICAL CHANGE
C
#INCLUDE 'HSDATA.INS'
      INTEGER I,J
#EXEC
C/EXEC
C
C *** NO CHANGES, YET
      CHANGE=.FALSE.
C
C *** EXTRACT HALF SPACES WHOSE MATERIAL SIDE CONTAINS ONLY
C *** CHARACTERISTIC POINTS INSIDE THE OUTLINE
      DO 300 I=HSNUM, 1, -1
          IF (HSSTAT(I) .NE. LEVEL) GOTO 300
          DO 100 J=1, CPTNUM
C
C *** IS CHARACTERISTIC POINT ACTIVE?
              IF (CPSTAT(J) .EQ. LEVEL) THEN
C
C *** IS POINT INSIDE HALF SPACE?
                  IF (CPTCHS(J,I) .NE. IN) GOTO 100
```

```
C
C *** IS POINT INSIDE OUTLINE?
            IF (CPTCLS(J) .NE. IN) GOTO 300
            END IF
100         CONTINUE
C
C *** ALL THE CHARACTERISTIC POINTS INSIDE THE HALF SPACE
C *** ARE ALSO INSIDE THE OUTLINE, REMOVE IT AS A UNION
            CHANGE=.TRUE.
            HSSTAT(I)=LEVEL-1
C
C *** INSERT DOMINATING HALF SPACE INTO EXPRESSION
            DO 150 J=DOMEXP(0),1,-1
                DOMEXP(J+2)=DOMEXP(J)
150         CONTINUE
            DOMEXP(0)=DOMEXP(0)+2
            DOMEXP(1)=I
            DOMEXP(2)=UNION
C
C *** REMOVE THE CHARACTERISTIC POINTS INSIDE THIS HALF SPACE
            DO 200 J=1, CPTNUM
                IF (CPSTAT(J) .EQ. LEVEL) THEN
                    IF (CPTCHS(J,I) .EQ. IN) CPSTAT(J)=LEVEL-1
                END IF
200         CONTINUE
300         CONTINUE

RETURN
      END
      INTEGER FUNCTION EVLCPT(EXPR,N)
C
C  EVALUATE A CHARACTERISTIC POINT GIVEN AN EXPRESSION
C
C  INPUT:
C     EXPR : EXPRESSION ARRAY
C     N    : CHARACTERISTIC POINT NUMBER
C
C  RETURNS:
C     EVLCPT : -1, POINT IS OUTSIDE REGION DEFINED BY EXPRESSION
C               1, POINT IS INSIDE REGION DEFINED BY EXPRESSION
C
C  DESCRIPTION:
C     THIS SUBROUTINE EVALUATES A CHARACTERISTIC POINT USING A
C     GIVEN BOOLEAN EXPRESSION
C
C  REVISIONS:
C     RV   DATE        WHO   REASON
C     00   15-JAN-88   DLV   INITIAL IMPLEMENTATION
C
#INCLUDE 'HSDATA.INS'
      INTEGER EXPR(0:*),N
      INTEGER I,STKPTR
      LOGICAL STACK(MAXEXP)
#EXEC
C/EXEC
C
C *** TRAVERSE THE EXPRESSION
      STKPTR=0
      DO 100 I=1, EXPR(0)
C
```

```
C *** INTERSECTION
      IF (EXPR(I) .EQ. INTSCT) THEN
         STACK(STKPTR-1)=(STACK(STKPTR) .AND. STACK(STKPTR-1))
         STKPTR=STKPTR-1
C
C *** UNION
      ELSEIF (EXPR(I) .EQ. UNION) THEN
         STACK(STKPTR-1)=(STACK(STKPTR) .OR. STACK(STKPTR-1))
         STKPTR=STKPTR-1
C
C *** HALF SPACE VALUE
      ELSE
         STKPTR=STKPTR+1
         IF (EXPR(I) .GT. 0) THEN
            STACK(STKPTR)=(CPTCHS(N,EXPR(I)) .EQ. 1)
         ELSE
            STACK(STKPTR)=.NOT. (CPTCHS(N,ABS(EXPR(I))) .EQ. 1)
         END IF
      END IF
100   CONTINUE
C
C *** RETURN CLASSIFICATION
      IF (STACK(1)) THEN
         EVLCPT=IN
      ELSE
         EVLCPT=OUT
      END IF

RETURN
      END
      SUBROUTINE HS2INI
C
C  INITIALIZE EXPRESSION COMPUTATION PORTION OF 2-D SWEEP TO CSG
C  FOR USE WITH 3-D B-REP TO CSG
C
C  NO INPUT OR OUTPUT
C
C  REVISIONS:
C     RV   DATE       WHO    REASON FOR CHANGE
C     00   04-JAN-88  DLV    INITIAL IMPLEMENTATION (AS PROGRAM HS)
C     01   16-JAN-90  DLV    INCORPORATE INTO 3-D VERSION (RENAMED HS2INI)
C
#INCLUDE 'TRACE.INS'
#INCLUDE 'HSDATA.INS'
C
#EXEC
C/EXEC
C
C *** INITIALIZE
      TRACE(SHORT)=.FALSE.
      TRACE(MEDIUM)=.FALSE.
      TRACE(LONG)=.FALSE.
      CPTNUM=0
      HSNUM=0

RETURN
      END
      SUBROUTINE INTSUM(LEVEL,TERMS,NTERMS)
C
C  COMPUTE 'INTERSECTION OF SUMS' FOR ACTIVE REGIONS
```

```
C
C  INPUT:
C     LEVEL  : RECURSION LEVEL
C
C  OUTPUT:
C     TERMS  : ARRAY OF INTERSECTION EXPRESSIONS
C     NTERMS : NUMBER OF EXPRESSIONS IN 'TERMS'
C
C  DESCRIPTION:
C     THIS ROUTINE COMPUTES A 'INTERSECTION OF SUMS' FOR ALL
C     THE ACTIVE REGIONS
C
C  RV  DATE        WHO   REASON
C  00  08-APR-88   DLV   INITIAL IMPLEMENTATION
C
#INCLUDE 'HSDATA.INS'
      INTEGER LEVEL,TERMS(0:MAXEXP,*),NTERMS
      INTEGER I,J,PASS
#EXEC
C/EXEC
C
C *** INITIALIZE PASS
      PASS=1
C
C *** REVERSE ALL THE CLASSIFICATIONS
100   DO 300 I=1, CPTNUM
         IF (CPTCLS(I) .EQ. IN) THEN
            CPTCLS(I)=OUT
         ELSE
            CPTCLS(I)=IN
         END IF
         DO 200 J=1, HSNUM
            IF (CPTCHS(I,J) .EQ. IN) THEN
               CPTCHS(I,J)=OUT
            ELSE
               CPTCHS(I,J)=IN
            END IF
200      CONTINUE
300   CONTINUE
C
C *** COMPUTE 'SUM OF INTERSECTIONS' FOR REGIONS OUTSIDE OUTLINE
      IF (PASS .EQ. 1) THEN
         CALL SUMINT(LEVEL,TERMS,NTERMS)
C
C *** CHANGE INTERSECTIONS TO UNIONS TO GET 'INTERSECTION OF SUMS'
         DO 500 I=1, NTERMS
            DO 400 J=1, TERMS(0,I)
               IF (TERMS(J,I) .EQ. INTSCT) TERMS(J,I)=UNION
400         CONTINUE
500      CONTINUE
C
C *** RESTORE CLASSIFICATIONS TO ORIGINAL VALUE
         PASS=2
         GOTO 100
      END IF

RETURN
      END
      SUBROUTINE LSTALG(EXPR)
C
```

```
C  LIST AN EXPRESSION IN ALGEBRAIC FORM.  EXPRESSION IS ASSUMED TO BE
C  SPECIFIC, VALID, AND COMPLETE.
C
C  INPUT:
C     EXPR : EXPRESSION
C
C  DESCRIPTION:
C     THIS SUBROUTINE LISTS AN EXPRESSION IN ALGEBRAIC FORM ON THE
C     TERMINAL.
C
C  REVISIONS:
C     RV  DATE       WHO  REASON
C     00  11-MAY-88  DLV  INITIAL IMPLEMENTATION
C
      INTEGER EXPR(0:*)
C
#INCLUDE 'HSDATA.INS'
      INTEGER I,J,K,INSIDE
      INTEGER STKLEN,LEN(MAXEXP)
      CHARACTER*(MAXEXP) STACK(MAXEXP)
#EXEC
C/EXEC
C
C *** PROCESS EACH CHARACTER IN EXPRESSION
      STKLEN=0
      DO 400 I=1, EXPR(0)
C
C *** AN INTERSECTION OPERATOR?
         IF (EXPR(I) .EQ. INTSCT) THEN
C
C *** DETERMINE IF PARENTHESES ARE REQUIRED ON EITHER OPERAND
            DO 300 J=STKLEN-1,STKLEN
C
C *** SEARCH FOR '+' NOT INSIDE PARENTHESES
               INSIDE=0
               DO 200 K=1, LEN(J)
                  IF (STACK(J)(K:K) .EQ. '(') THEN
                     INSIDE=INSIDE+1
                  ELSEIF (STACK(J)(K:K) .EQ. ')') THEN
                     INSIDE=INSIDE-1
                  ELSEIF (STACK(J)(K:K) .EQ. '+') THEN
                     IF (INSIDE .LE. 0) THEN
                        STACK(J)='(' // STACK(J)(1:LEN(J)) // ')'
                        LEN(J)=LEN(J)+2
                        GOTO 300
                     END IF
                  END IF
200            CONTINUE
300         CONTINUE
C
C *** COMBINE OP1,OP2
            STACK(STKLEN-1)=STACK(STKLEN-1)(1:LEN(STKLEN-1)) //
     1                      STACK(STKLEN)(1:LEN(STKLEN))
            LEN(STKLEN-1)=LEN(STKLEN-1)+LEN(STKLEN)
            STKLEN=STKLEN-1
C
C *** A UNION OPERATOR?
         ELSEIF (EXPR(I) .EQ. UNION) THEN
C
C *** COMBINE OP1+OP2
```

```
                STACK(STKLEN-1)=STACK(STKLEN-1)(1:LEN(STKLEN-
       1          -1)) '+' //                                  //
       2              STACK(STKLEN)(1:LEN(STKLEN))              ))
                LEN(STKLEN-1)=LEN(STKLEN-1)+1+LEN(STKLEN)
                STKLEN=STKLEN-1
C
C *** A LITERAL
              ELSE
                STKLEN=STKLEN+1
C
C *** HALF SPACE
              IF (HSNAME(ABS(EXPR(I)))(2:2) .EQ. ' ') THEN
                STACK(STKLEN)=HSNAME(ABS(EXPR(I)))(1:1)
                LEN(STKLEN)=1
C
C *** SPECIAL HALF SPACE NAME PAIR
              ELSE
                STACK(STKLEN)='<' // HSNAME(ABS(EXPR(I)))(1:2) // '>'
                LEN(STKLEN)=4
              END IF
C
C *** COMPLEMENT
              IF (EXPR(I) .LT. 0) THEN
                STACK(STKLEN)=STACK(STKLEN)(1:LEN(STKLEN)) // ''''
                LEN(STKLEN)=LEN(STKLEN)+1
              END IF
            END IF
400      CONTINUE
C
C *** PRINT THE EXPRESSION
         PRINT *, STACK(1)(1:LEN(1))

RETURN
         END
         SUBROUTINE LSTCPT()
C
C   LIST CHARACTERISTIC POINTS
C
C   NO INPUT OR OUTPUT
C
C   DESCRIPTION:
C     THIS SUBROUTINE LISTS THE CHARACTERISTIC POINTS ON
C     THE TERMINAL
C
C   REVISIONS:
C     RV  DATE       WHO   REASON
C     00  15-JAN-88  DLV   INITIAL IMPLEMENTATION
C     01  25-MAY-90  DLV   ADDED 'Z' COORDINATE
C
#INCLUDE 'HSDATA.INS'
         INTEGER I,J
         INTEGER EXPR(0:MAXEXP)
         CHARACTER*3 CLASS
         CHARACTER*8 STAT
#EXEC
C/EXEC
C
C *** ANY CHARACTERISTIC POINTS?
         IF (CPNUM .LE. 0) THEN
            PRINT *, 'No characteristic points'
```

```
            GOTO 999
          END IF
C
C *** LIST CHARACTERISTIC POINTS
      EXPR(0)=HSNUM
      DO 200 I=1, CPTNUM
C
C *** HALF SPACE CLASSIFICATIONS
          DO 100 J=1, HSNUM
              IF (CPTCHS(I,J) .EQ. IN) THEN
                  EXPR(J)=J
              ELSE
                  EXPR(J)=-J
              END IF
100       CONTINUE
C
C *** IN/OUT - ACTIVE/INACTIVE
          IF (CPTCLS(I) .EQ. IN) THEN
              CLASS='IN'
          ELSE
              CLASS='OUT'
          END IF
          IF (CPSTAT(I) .EQ. ACTIVE) THEN
              STAT='ACTIVE'
          ELSE
              STAT='INACTIVE'
          END IF
C
C *** DISPLAY THE DATA
          WRITE (6,'(A,I5,/,A,G,A,G,A,G,/,A,A,A,A)')
     1        ' Region #',I,
     2        ' X = ',CPTX(I),' Y = ',CPTY(I),' Z = ',CPTZ(I),
     3        ' Class   = ',CLASS,' Status  = ',STAT
          CALL LSTEXP(EXPR)
          PRINT *, ' '
200   CONTINUE 999   RETURN
      END
      SUBROUTINE LSTEXP(EXPR)
C
C   LIST AN EXPRESSION
C
C   INPUT:
C      EXPR : EXPRESSION ARRAY
C
C   DESCRIPTION:
C      THIS SUBROUTINE LIST AN EXPRESSION IN MAN READABLE FORM
C      ON THE TERMINAL
C
C   REVISIONS:
C      RV  DATE       WHO   REASON
C      00  15-JAN-88  DLV   INITIAL IMPLEMENTATION
C      01  16-JAN-90  DLV   REMOVE UNUSED 'SWPNV' DECLARATION
C
      INTEGER EXPR(0:*)
C
#INCLUDE 'HSDATA.INS'
      CHARACTER*(MAXEXP) STR
      INTEGER I,J
```

```
#STRING*6 $INT
#EXEC
C/EXEC
C
C *** CHECK FOR A NULL EXPRESSION
      IF (EXPR(0) .EQ. 0) THEN
         PRINT *, 'Null expression'
         GOTO 999
         END IF
C
C *** CONVERT TO A STRING
      J=0
      DO 100 I=1, EXPR(0)
         J=J+1
C
C *** INTERSECTION OPERATOR
         IF (EXPR(I) .EQ. INTSCT) THEN
            STR(J:J)='*'
C
C *** UNION OPERATOR
         ELSEIF (EXPR(I) .EQ. UNION) THEN
            STR(J:J)='+'
C
C *** HALF SPACE
         ELSEIF (HSNAME(ABS(EXPR(I)))(2:2) .EQ. ' ') THEN
            STR(J:J)=HSNAME(ABS(EXPR(I)))(1:1)
C
C *** SPECIAL HALF SPACE NAME PAIR
         ELSE
            STR(J:J+3)='<' // HSNAME(ABS(EXPR(I)))(1:2) // '>'
            J=J+3
            END IF
C
C *** COMPLEMENT
         IF (EXPR(I) .LT. 0) THEN
            J=J+1
            STR(J:J)=''''
            END IF
100      CONTINUE
C
C *** PRINT THE EXPRESSION
      PRINT *, STR(1:J)

999   RETURN
      END
      SUBROUTINE LSTHS()
C
C  LIST HALF SPACE DATA ON TERMINAL
C
C  NO INPUT OR OUTPUT
C
C  DESCRIPTION:
C     THIS SUBROUTINE LISTS THE HALF SPACE DATA ON THE TERMINAL
C
C  REVISIONS:
C     RV   DATE       WHO   REASON
C     00   26-FEB-88  DLV   INITIAL VERSION
C     01   16-JAN-90  DLV   REVISED FOR 3-D VERSION
C
#INCLUDE 'HSDATA.INS'
```

```
      INTEGER I
#EXEC
C/EXEC
C
C *** ANY HALF SPACES?
      IF (HSNUM .LE. 0) THEN
         PRINT *, 'No half spaces'
         GOTO 999
         END IF
C
C *** LIST EACH HALF SPACE
      DO 100 I=1, HSNUM
C
C *** LINE?
         IF (HSTYPE(I) .EQ. 0) THEN
            PRINT *, I,' TYPE = LINE,  NAME = ',HSNAME(I)
            PRINT *, '      A = ',HSCOEF(I,1)
            PRINT *, '      B = ',HSCOEF(I,2)
            PRINT *, '      C = ',HSCOEF(I,3)
C
C *** CIRCLE
         ELSEIF ((HSTYPE(I) .EQ. 1) .OR. (HSTYPE(I) .EQ. -1)) THEN
            IF (HSTYPE(I) .EQ. -1) THEN
               PRINT *, I,' TYPE = CW ARC,  NAME = ',HSNAME(I)
            ELSE
               PRINT *, I,' TYPE = CCW ARC,  NAME = ',HSNAME(I)
               END IF
            PRINT *, '      D = ',HSCOEF(I,1)
            PRINT *, '      E = ',HSCOEF(I,2)
            PRINT *, '      F = ',HSCOEF(I,3)
C
C *** THREE DIMENSIONAL DATA
         ELSEIF (HSTYPE(I) .EQ. 3) THEN
            PRINT *, I,' TYPE = 3-D SURFACE,  NAME = ',HSNAME(I)
            END IF
100      CONTINUE
C
C *** PRINT NUMBER OF HALF SPACES
      PRINT *, 'Number of half spaces = ',HSNUM 999   RETURN
      END
      SUBROUTINE LSTLST(LIST,NLIST)
C
C  LIST AN ARRAY OF EXPRESSIONS
C
C  INPUT:
C     LIST  : ARRAY OF EXPRESSIONS
C     NLIST : NUMBER OF ITEMS IN THE LIST
C
C  DESCRIPTION:
C     THIS SUBROUTINE LISTS AN ARRAY OF EXPRESSIONS ON THE
C     TERMINAL.
C
C  REVISIONS:
C     RV  DATE        WHO  REASON
C     00  20-JUN-88   DLV  INITIAL IMPLEMENTATION
C
#INCLUDE 'HSPARM.INS'
      INTEGER LIST(0:MAXEXP,*),NLIST
```

```
      INTEGER I
#EXEC
C/EXEC
C
C *** CYCLE LIST
      DO 100 I=1, NLIST
         CALL LSTEXP(LIST(0,I))
100      CONTINUE

RETURN
      END
      SUBROUTINE MKCLUS(TERMS,NTERMS,OPER,CLUST,NCLUST)
C
C     SEPARATE TERMS INTO COMPLETELY INDEPENDENT CLUSTERS
C
C     INPUT:
C       TERMS  : LIST OF TERMS (WITHOUT OPERATORS)
C       NTERMS : NUMBER OF TERMS
C       OPER   : OPERATOR JOINING TERMS
C
C     OUTPUT:
C       CLUST  : LIST OF CLUSTERED TERMS (WITH OPERATORS)
C       NCLUST : NUMBER OF CLUSTERS
C
C     DESCRIPTION:
C       THIS SUBROUTINE SEPARATES A LIST OF TERMS INTO A LIST OF
C       COMPLETELY INDEPENDENT CLUSTERS (ONE OR MORE).
C
C     REVISIONS:
C       RV  DATE      WHO  REASON
C       00  17-JUN-88 DLV  INITIAL VERSION
C
#INCLUDE 'HSDATA.INS'
      INTEGER TERMS(0:MAXEXP,*),NTERMS,OPER
      INTEGER CLUST(0:MAXEXP,*),NCLUST
C
      INTEGER I,J,OPEXPR(0:1)
      LOGICAL DONE
C
      INTEGER NCOMHS
#EXEC
C/EXEC
C
C *** COPY EACH TERM INTO A SEPARATE CLUSTER
      DO 200 I=1, NTERMS
         CALL CPYEXP(TERMS(0,I),CLUST(0,I))
200      CONTINUE
C
C *** CONSTRUCT OPERATOR EXPRESSION
      OPEXPR(0)=1
      OPEXPR(1)=OPER
C
C *** COMBINE CLUSTERS WITH COMMON HALF SPACES
300   DONE=.TRUE.
      DO 500 I=1, NTERMS-1
         IF (CLUST(0,I) .EQ. 0) GOTO 500
         DO 400 J=I+1, NTERMS
            IF (CLUST(0,J) .EQ. 0) GOTO 400
C
C *** COMMON HALF SPACES?
```

```
                IF (NCOMHS(CLUST(0,I),CLUST(0,J)) .GT. 0) THEN
                    CALL APPEXP(CLUST(0,I),CLUST(0,J))
                    CALL APPEXP(CLUST(0,I),OPEXPR)
                    CLUST(0,J)=0
                    DONE=.FALSE.
                END IF
400         CONTINUE
500     CONTINUE
        IF (.NOT. DONE) GOTO 300
C
C *** PACK THE ACTIVE CLUSTERS TOGETHER
        NCLUST=0
        I=0
600     IF (I .LT. NTERMS) THEN
            I=I+1
            IF (CLUST(0,I) .GT. 0) THEN
                NCLUST=NCLUST+1
                IF (NCLUST .GT. MAXCLU) THEN
                    PRINT *,
     1              'MKCLUS: Cluster storage exhaused, fatal error.'
                    STOP
                END IF
                CALL CPYEXP(CLUST(0,I),CLUST(0,NCLUST))
            END IF
            GOTO 600
        END IF RETURN
        END
        INTEGER FUNCTION NCOMHS(EXPR1,EXPR2)
C
C  COUNT NUMBER OF COMMON HALF SPACES IN TWO EXPRESSIONS
C
C  INPUT:
C     EXPR1 : EXPRESSION #1
C     EXPR2 : EXPRESSION #2
C
C  RETURNS:
C     NCOMHS : NUMBER OF COMMON HALF SPACES
C
#INCLUDE 'HSPARM.INS'
        INTEGER EXPR1(0:*),EXPR2(0:*)
        INTEGER I,J
#EXEC
C/EXEC
C
C *** INITIALIZE
        NCOMHS=0
C
C *** CYCLE EXPRESSIONS; COUNT COMMON HALF SPACES
        DO 200 I=1, EXPR1(0)
C
C *** IGNOR OPERATIONS (HALF SPACES ONLY)
            IF ((EXPR1(I) .EQ. INTSCT) .OR.
     1          (EXPR1(I) .EQ. UNION)) GOTO 200
            DO 100 J=1, EXPR2(0)
C
C *** IGNOR OPERATIONS (HALF SPACES ONLY)
                IF ((EXPR1(I) .EQ. INTSCT) .OR.
     1              (EXPR1(I) .EQ. UNION)) GOTO 200
```

```
              IF (EXPR1(I) .NE. EXPR2(J)) NCOMHS=NCOMHS+1
100        CONTINUE
200     CONTINUE
C
        RETURN
        END
        SUBROUTINE NECHS(HSNAT)
C
C  COMPUTE NECESSARY SET OF HALFSPACES FROM SUFFICIENT SET
C
C  NO INPUT OR OUTPUT
C
C  REVISIONS:
C     RV  DATE        WHO   REASON
C     00  22-MAY-90   DLV   INITIAL IMPLEMENTATION
C
        INTEGER HSNAT
C
#INCLUDE 'TRACE.INS'
#INCLUDE 'HSDATA.INS'
        INTEGER I,J,K
        INTEGER NPAIRS,NFIXED,MAXFIX,CURFIX,HSFIX
        INTEGER P1(MAXPRS),P2(MAXPRS)
        LOGICAL FIRST
C
        LOGICAL CPTSEP
#EXEC
C/EXEC
C
C *** DEACTIVATE POTENTIALLY OPTIONAL HALF SPACES
        DO 300 I=HSNAT+1, HSNUM
           HSSTAT(I)=INACT
300     CONTINUE
C
C *** FIND PAIRS OF CHARACTERISTIC POINTS WHICH EXPOSE HALF
C *** SPACE DEFICIENCY
        NPAIRS=0
        DO 600 I=1, CPTNUM-1
           DO 500 J=I+1, CPTNUM
C
C *** SEARCH FOR A VALID SEPARATION BY A NATURAL HALF SPACE
              DO 400 K=1, HSNAT
                 IF (CPTSEP(I,J,K)) GOTO 500
400           CONTINUE
C
C *** NO VALID SEPARATION; ADD TO PAIR LIST
              NPAIRS=NPAIRS+1
              IF (NPAIRS .GT. MAXPRS) THEN
                 PRINT *, 'NECHS: Pair storage exhausted, fatal error.'
                 STOP
              END IF
              P1(NPAIRS)=I
              P2(NPAIRS)=J
500        CONTINUE
600     CONTINUE
        IF (TRACE(MEDIUM))
     1     PRINT *, '<',NPAIRS,'> Point Pairs to Separate'
C
C *** ACTIVATE ADDITIONAL HALF SPACES UNTIL ALL PAIRS ARE FIXED
        NFIXED=0
```

```
650     IF (NFIXED .GE. NPAIRS) GOTO 900
C
C *** FIND HALF SPACE WHICH FIXES THE MOST PAIRS
        MAXFIX=0
        HSFIX=0
        DO 800 I=HSNAT+1, HSNUM
C
C *** SKIP HALF SPACE IF ALREADY ACTIVE
            IF (HSSTAT(I) .EQ. ACTIVE) GOTO 800
C
C *** COUNT NUMBER OF PAIRS THIS HALF SPACE FIXES
            CURFIX=0
            DO 700 J=1, NPAIRS
C
C *** ACTIVE PAIR?
                IF (P1(J) .GT. 0) THEN
                    IF (CPTSEP(P1(J),P2(J),I)) CURFIX=CURFIX+1
                END IF
700         CONTINUE
C
C *** CURRENT COUNT GREATER THAN MAX COUNT?
            IF (CURFIX .GT. MAXFIX) THEN
                HSFIX=I
                MAXFIX=CURFIX
            END IF
800     CONTINUE
C
C *** ACTIVATE HALF SPACE WHICH FIXES THE MOST PAIRS
        IF (HSFIX .EQ. 0) THEN
            PRINT *, 'NECHS: Algorithm failed, HSFIX=0, fatal error.'
            STOP
        END IF
        IF (TRACE(LONG))
     1      PRINT *, '  Half Space <',HSFIX,'> Separates <',
     2              MAXFIX,'> Point Pairs'
        HSSTAT(HSFIX)=ACTIVE
C
C *** DEACTIVATE PAIRS WHICH SELECTED HALF SPACE FIXES
        DO 850 I=1, NPAIRS
            IF (P1(I) .GT. 0) THEN
                IF (CPTSEP(P1(I),P2(I),HSFIX)) THEN
                    P1(I)=0
                    NFIXED=NFIXED+1
                END IF
            END IF
850     CONTINUE
        GOTO 650
C
C *** DELETE UNNEEDED HALF SPACES AND CHARACTERISTIC POINTS
900     CALL PACK(1,0)
        CALL PURGE()
C
C *** REPORT RESULTS
990     PRINT *, '<',HSNUM,'> Necessary Halfspaces'
        PRINT *, '<',CPTNUM,'> Necessary Points'

RETURN
        END
        SUBROUTINE NXTMAP(MAP,LEVEL,RANGE)
C
```

```
C   COMPUTE NEXT MAP OF INTERSECTION POINTERS
C
C   INPUT:
C     MAP   : CURRENT MAP (MAP(0)=0, FOR INITIAL MAP)
C     LEVEL : NUMBER OF POINTERS IN MAP
C     RANGE : RANGE OF POINTER IN MAP (1-RANGE)
C
C   OUTPUT:
C     MAP   : NEXT MAP AT LEVEL SPECIFIED (BREADTH FIRST)
C
C   DESCRIPTION:
C     THIS SUBROUTINE GENERATES AN ARRAY OF INTEGER POINTERS USED
C     TO MAP HALF SPACE LITERALS TO A TREE OF INTERSECTION EXPRESSIONS
C
C   REVISIONS:
C     RV  DATE       WHO   REASON
C     00  13-APR-88  DLV   INITIAL IMPLEMENTATION
C
      INTEGER MAP(0:*),LEVEL,RANGE
C
      INTEGER I
#EXEC
C/EXEC
C
C *** IF MAP IS EMPTY, FILL SEQUENTIALLY TO LEVEL
      IF (MAP(0) .EQ. 0) THEN
          DO 100 I=1, LEVEL
              MAP(I)=I
100       CONTINUE
          MAP(0)=LEVEL
C
C *** IF LAST POINTER IN MAP IS LESS THAN RANGE, INCREMENT LAST POINTER
      ELSEIF (MAP(LEVEL) .LT. RANGE) THEN
          MAP(LEVEL)=MAP(LEVEL)+1
C
C *** TRAVERSE TREE TO FIND NEXT VALID MAP
      ELSE
C
C *** MOVE UP TO PREVIOUS NODE IN TREE
200       MAP(0)=MAP(0)-1
C
C *** DONE IF MAP IS EMPTY
          IF (MAP(0) .EQ. 0) GOTO 999
C
C *** MOVE TO THE RIGHT AT CURRENT LEVEL
          MAP(MAP(0))=MAP(MAP(0))+1
C
C *** REPEAT UNTIL VALID RANGE IS FOUND
          IF (MAP(MAP(0)) .EQ. RANGE) GOTO 200
C
C *** FILL IN MAP SEQUENTIALLY TO LEVEL
          DO 300 I=MAP(0)+1, LEVEL
              MAP(I)=MAP(I-1)+1
C
C *** BE SURE LEVEL CAN BE ATTAINED
              IF (MAP(I) .GT. RANGE) GOTO 200
300       CONTINUE
C
C *** SET MAP LENGTH
          MAP(0)=LEVEL
```

```
            END IF
C
 999    RETURN
        END
        SUBROUTINE P2BOOL(EXPR,IOUNIT)
C
C  WRITE PADL2 STATEMENT FOR BOOLEAN EXPRESSION INTO FILE
C
C  INPUT:
C    EXPR   : EXPRESSION
C    IOUNIT : I/O UNIT NUMBER
C
C  DESCRIPTION:
C    THIS ROUTINE WRITES THE PADL2 STATEMENT FOR THE BOOLEAN
C    EXPRESSION INTO A FILE.
C
C  REVISIONS:
C    RV  DATE       WHO  REASON
C    00  27-JUL-88  DLV  INITIAL IMPLEMENTATION
C    01  20-JUL-90  DLV  MODIFIED FOR 3-D BREP->CSG
C
        INTEGER EXPR(0:*),IOUNIT
C
#INCLUDE 'HSDATA.INS'
        INTEGER I,LAST
        INTEGER STKLEN,LEN(MAXEXP),OP(MAXEXP)
        CHARACTER*(4*MAXEXP) STACK(MAXEXP)
#EXEC
C/EXEC
C
C *** PROCESS EACH CHARACTER IN EXPRESSION
        STKLEN=0
        DO 400 I=1, EXPR(0)
C
C *** AN INTERSECTION OPERATOR?
            IF (EXPR(I) .EQ. INTSCT) THEN
C
C *** PARENTHESES REQUIRED?
                IF (OP(STKLEN) .EQ. UNION) THEN
                    STACK(STKLEN)='(' //
     1                             STACK(STKLEN)(1:LEN(STKLEN)) //
     2                             ')'
                    LEN(STKLEN)=LEN(STKLEN)+2
                END IF
                IF (OP(STKLEN-1) .EQ. UNION) THEN
                    STACK(STKLEN-1)='(' //
     1                             STACK(STKLEN-1)(1:LEN(STKLEN-1)) //
     2                             ')'
                    LEN(STKLEN-1)=LEN(STKLEN-1)+2
                END IF
C
C *** COMBINE OP1,OP2
                STACK(STKLEN-1)=STACK(STKLEN-1)(1:LEN(STKLEN-1)) //
     1                         ' INT ' //
     2                         STACK(STKLEN)(1:LEN(STKLEN))
                LEN(STKLEN-1)=LEN(STKLEN-1)+5+LEN(STKLEN)
                STKLEN=STKLEN-1
                OP(STKLEN)=INTSCT
C
C *** A UNION OPERATOR?
```

```
              ELSEIF (EXPR(I) .EQ. UNION) THEN
C
C *** PARENTHESES REQUIRED?
              IF (OP(STKLEN) .EQ. INTSCT) THEN
                 STACK(STKLEN)='(' //
     1                          STACK(STKLEN)(1:LEN(STKLEN)) //
     2                          ')'
                 LEN(STKLEN)=LEN(STKLEN)+2
              END IF
              IF (OP(STKLEN-1) .EQ. INTSCT) THEN
                 STACK(STKLEN-1)='(' //
     1                          STACK(STKLEN-1)(1:LEN(STKLEN-1)) //
     2                          ')'
                 LEN(STKLEN-1)=LEN(STKLEN-1)+2
              END IF
C
C *** COMBINE OP1,OP2
              STACK(STKLEN-1)=STACK(STKLEN-1)(1:LEN(STKLEN-1)) //
     1                       ' UN ' //
     2                       STACK(STKLEN)(1:LEN(STKLEN))
              LEN(STKLEN-1)=LEN(STKLEN-1)+4+LEN(STKLEN)
              STKLEN=STKLEN-1
              OP(STKLEN)=UNION
C
C *** A LITERAL
           ELSE
              STKLEN=STKLEN+1
              OP(STKLEN)=0
C
C *** LOWER CASE LITERAL
              IF (LGE(HSNAME(EXPR(I))(1:1),'a') .AND.
     1            LLE(HSNAME(EXPR(I))(1:1),'z')) THEN
                 STACK(STKLEN)=CHAR(ICHAR(HSNAME(EXPR(I))(1:1))
     1                         -ICHAR('a')+ICHAR('A')) // '_LC'
                 LEN(STKLEN)=4
C
C *** UPPER CASE LITERAL
              ELSE
                 STACK(STKLEN)=HSNAME(EXPR(I))(1:1)
                 LEN(STKLEN)=1
              END IF
           END IF
400     CONTINUE
C
C *** OUTPUT PADL2 STATEMENT
        LAST=0
500     IF (LAST .LT. LEN(1)) THEN
           DO 550 I=LAST+1, LEN(1)
              IF ((STACK(1)(I:I) .EQ. ' ') .AND.
     1            (I-LAST .GE. 60)) THEN
                 IF (LAST .EQ. 0) THEN
                    WRITE (IOUNIT,*)
     1                 'SOLID = ',STACK(1)(1:I),' \'
                 ELSE
                    WRITE (IOUNIT,*)
     1                 '        ',STACK(1)(LAST+1:I),' \'
                 END IF
                 LAST=I
                 GOTO 500
              END IF
```

```
550        CONTINUE
        END IF
C
C *** OUTPUT LAST PORTION OF LINE
        IF (LAST .EQ. 0) THEN
            WRITE (IOUNIT,*) 'SOLID = ',STACK(1)(1:LEN(1))
        ELSE
            WRITE (IOUNIT,*) '         ',STACK(1)(LAST+1:LEN(1))
        END IF

RETURN
        END
        SUBROUTINE P2BOX(IOUNIT)
C
C  WRITE PADL-2 DEFINITION FOR META PRIMITIVE BOX
C
C  INPUT:
C    IOUNIT : I/O UNIT NUMBER
C
C  REVISIONS:
C    RV  DATE       WHO  REASON
C    00  26-JUL-90  DLV  INITIAL IMPLEMENTATION
C
        INTEGER IOUNIT
C
        REAL XMIN,YMIN,ZMIN, XMAX,YMAX,ZMAX, XTEMP,YTEMP,ZTEMP
#EXEC
C/EXEC
C
C *** DETERMINE THE BOUNDING BOX
        CALL BOX(XMIN,YMIN,ZMIN,XMAX,YMAX,ZMAX)
C
C *** OVERSIZE 10% TO INSURE CORRECT BOUNDARY EVALUATION
        XTEMP=XMIN
        YTEMP=YMIN
        ZTEMP=ZMIN
C
        XMIN=XMIN-0.1*(XMAX-XMIN)
        YMIN=YMIN-0.1*(YMAX-YMIN)
        ZMIN=ZMIN-0.1*(ZMAX-ZMIN)
C
        XMAX=XMAX+0.1*(XMAX-XTEMP)
        YMAX=YMAX+0.1*(YMAX-YTEMP)
        ZMAX=ZMAX+0.1*(ZMAX-ZTEMP)
C
C *** MINIMUM AND MAXIMUM COORDINATES
        WRITE (IOUNIT,*)
        WRITE (IOUNIT,'(1X,3(A,F12.5),A)')
     1      'XMIN = ',XMIN,'; YMIN = ',YMIN,'; ZMIN = ',ZMIN,';'
        WRITE (IOUNIT,'(1X,3(A,F12.5),A)')
     1      'XMAX = ',XMAX,'; YMAX = ',YMAX,'; ZMAX = ',ZMAX,';'
C
C *** BOUNDING BOX
        WRITE (IOUNIT,'(1X,A)')
     1      'SOLID_BOX = BLO(X=XMAX-XMIN,Y=YMAX-YMIN,Z=ZMAX-ZMIN)   \'
        WRITE (IOUNIT,'(1X,A)')
     1      '              AT (MOVX=XMIN,MOVY=YMIN,MOVZ=ZMIN)'

RETURN
        END
```

```
      SUBROUTINE P2CLOS(FTYPE,IOUNIT)
C
C CLOSE FILE USED FOR WRITING PADL-2 DEFINITION
C
C INPUT:
C    FTYPE : FILE TYPE
C              = 0, USER'S TERMINAL
C              = 1, FILE
C    IOUNIT : I/O UNIT NUMBER
C
C REVISIONS:
C    RV  DATE       WHO  REASON
C    00  01-AUG-88  DLV  INITIAL IMPLEMENTATION
C    01  20-JUL-90  DLV  MODIFIED FOR 3-D BREP->CSG
C
      INTEGER FTYPE, IOUNIT
#EXEC
C/EXEC
C
C *** OPERATING SYSTEM FILE
      IF (FTYPE .EQ. 1) CLOSE(IOUNIT)

RETURN
      END
      SUBROUTINE P2CON(NAME,NAMEL,VEC1,VEC2,D1,D2,SENSE,IOUNIT)
C
C MAKE A CONE META PRIMITIVE AND WRITE TO PADL2 FILE
C
C INPUT:
C    NAME : META PRIMITIVE NAME
C    NAMEL: NUMBER OF CHARACTERS IN 'NAME'
C    VEC1 : POINT ON AXIS
C    VEC2 : AXIS DIRECTION
C    D1   : RADIUS AT 'VEC1'
C    D2   : HALF ANGLE (RADIANS)
C    SENSE: SURFACE SENSE (SEE TABLE IN PARASOLID MANUAL)
C    IOUNIT : I/O UNIT NUMBER
C
C REVISIONS:
C    RV  DATE       WHO  REASON
C    00  27-JUL-88  DLV  INITIAL IMPLEMENTATION
C    01  20-JUL-90  DLV  MODIFIED FOR 3-D BREP->CSG
C
      CHARACTER*(*) NAME
      REAL VEC1(3), VEC2(3), D1, D2
      INTEGER NAMEL, SENSE, IOUNIT
C
      REAL ALPHA, DEGX, DEGY, DEGZ, MOVX, MOVY, MOVZ
      REAL AXIS(3), APEX(3)
      CHARACTER*1 C
      CHARACTER*8 RMNAME
      INTEGER RMNAML
C/EXEC
C
C *** COMPUTE CONE PARAMETERS
      ALPHA=TAN(D2)
      CALL CONAPX(VEC1,VEC2,D1,D2,APEX)
      MOVX = APEX(1)
      MOVY = APEX(2)
      MOVZ = APEX(3)
```

```
              AXIS(1) = -VEC2(1)
              AXIS(2) = -VEC2(2)
              AXIS(3) = -VEC2(3)
              CALL VECANG(AXIS,0,DEGX,DEGY,DEGZ)
              IF (SENSE .EQ. 1) THEN
                  C = '0'
              ELSE
                  C = '1'
              END IF
C
C *** OUTPUT THE RIGID MOTION STATEMENT
              CALL P2RM(NAME,NAMEL,DEGX,DEGY,DEGZ,MOVX,MOVY,MOVZ,IOUNIT,
         1              RMNAME,RMNAML)
C
C
C *** OUTPUT THE CONE META PRIMITIVE STATEMENT (W/APEX PLANE)
              WRITE (IOUNIT,'(1X,A,A,F12.5,A,A,A,A,A)')
         1       NAME(1:NAMEL),
         2       ' = META(CONE=(ALPHA=',
         3       ALPHA,
         4       ', RM=',
         5       RMNAME(1:RMNAML),
         6       ', C=',
         7       C,
         8       '), \'
              WRITE (IOUNIT,'(1X,A,A,A,A,A)')
         1       '           PLANE=(RM=',
         2       RMNAME(1:RMNAML),
         3       ', C=1), \'
              WRITE (IOUNIT, '(1X,A)')
         1       '           BOX=SOLID_BOX);'

RETURN
              END
              SUBROUTINE P2CYL(NAME,NAMEL,VEC1,VEC2,D1,D2,SENSE,IOUNIT)
C
C   MAKE A CYLINDER META PRIMITIVE AND WRITE TO PADL2 FILE
C
C   INPUT:
C     NAME : META PRIMITIVE NAME
C     NAMEL: NUMBER OF CHARACTERS IN 'NAME'
C     VEC1 : POINT ON AXIS
C     VEC2 : AXIS DIRECTION
C     D1   : RADIUS
C     D2   : <UNUSED>
C     SENSE: SURFACE SENSE (SEE TABLE IN PARASOLID MANUAL)
C     IOUNIT : I/O UNIT NUMBER
C
C   REVISIONS:
C     RV   DATE       WHO   REASON
C     00   27-JUL-88  DLV   INITIAL IMPLEMENTATION
C     01   20-JUL-90  DLV   MODIFIED FOR 3-D BREP->CSG
C
              CHARACTER*(*) NAME
              REAL VEC1(3), VEC2(3), D1, D2
              INTEGER NAMEL, SENSE, IOUNIT
C
              REAL R, DEGX, DEGY, DEGZ, MOVX, MOVY, MOVZ
              CHARACTER*1 C
              CHARACTER*8 RMNAME
```

```
      INTEGER RMNAML
C/EXEC
C
C *** COMPUTE CYLINDER PARAMETERS
      R=D1
      MOVX = VEC1(1)
      MOVY = VEC1(2)
      MOVZ = VEC1(3)
      CALL VECANG(VEC2,0,DEGX,DEGY,DEGZ)
      IF (SENSE .EQ. 1) THEN
         C = '0'
      ELSE
         C = '1'
      END IF
C
C *** OUTPUT THE RIGID MOTION
      CALL P2RM(NAME,NAMEL,DEGX,DEGY,DEGZ,MOVX,MOVY,MOVZ,IOUNIT,
     1          RMNAME,RMNAML)
C
C *** OUTPUT THE CYLINDER META PRIMITIVE STATEMENT
      WRITE (IOUNIT,'(1X,A,A,F12.5,A,A,A,A,A,A)')
     1    NAME(1:NAMEL),
     2    ' = META(CYLINDER=(R=',
     3    R,
     4    ', RM=',
     5    RMNAME(1:RMNAML),
     6    ', C=',
     7    C,
     8    ')), BOX=SOLID_BOX);'

RETURN
      END
      SUBROUTINE P2DEFN(EXPR,IOUNIT)
C
C MAKE A PADL-2 DEFINITION FOR AN EXPRESSION
C
C INPUT:
C    EXPR : BOOLEAN EXPRESSION FOR OBJECT
C    IOUNIT : I/O UNIT NUMBER
C
C REVISIONS:
C    RV   DATE        WHO   REASON
C    00   25-JUL-88   DLV   INITIAL IMPLEMENTATION
C    01   20-JUL-90   DLV   MODIFIED FOR 3-D BREP->CSG
C
      INTEGER EXPR(0:*), IOUNIT
C
#INCLUDE 'HSDATA.INS'
      INTEGER I,INAME
      REAL VEC1(3), VEC2(3), D1, D2
      INTEGER SFTYPE, SENSE, NAMEL
      CHARACTER*4 NAME
#EXEC
C/EXEC
C
C *** GENERIC HEADER
      WRITE (IOUNIT,'(1X,A)') 'GENERIC PART(SOLID)'
C
C *** BOUNDING BOX FOR META PRIMITIVES
      CALL P2BOX(IOUNIT)
```

```
C
C *** HALF SPACES
      DO 100 I=1, HSNUM
         WRITE (IOUNIT,*)
C
C *** DETERMINE THE HALFSPACE NAME
         IF (LGE(HSNAME(I)(1:1),'a') .AND.
     1       LLE(HSNAME(I)(1:1),'z')) THEN
            NAME=CHAR(ICHAR(HSNAME(I)(1:1))-ICHAR('a')+ICHAR('A'))
     1           // '_LC'
            NAMEL = 4
         ELSE
            NAME=HSNAME(I)(1:1)
            NAMEL = 1
         END IF
C
C *** GET THE HALF SPACE DATA
         INAME = ICHAR(HSNAME(I)(1:1))
         CALL GETHS(INAME,SFTYPE,VEC1,VEC2,D1,D2,SENSE)
C
C *** PLANE
         IF (SFTYPE .EQ. 1) THEN
            CALL P2PLN(NAME,NAMEL,VEC1,VEC2,D1,D2,SENSE,IOUNIT)
C
C *** CYLINDER
         ELSEIF (SFTYPE .EQ. 2) THEN
            CALL P2CYL(NAME,NAMEL,VEC1,VEC2,D1,D2,SENSE,IOUNIT)
C
C *** SPHERE
         ELSEIF (SFTYPE .EQ. 3) THEN
            CALL P2SPH(NAME,NAMEL,VEC1,VEC2,D1,D2,SENSE,IOUNIT)
C
C *** CONE
         ELSEIF (SFTYPE .EQ. 4) THEN
            CALL P2CON(NAME,NAMEL,VEC1,VEC2,D1,D2,SENSE,IOUNIT)
         END IF
100      CONTINUE
C
C *** BOOLEN EXPRESSION FOR OBJECT
      WRITE (IOUNIT,*)
      CALL P2BOOL(EXPR,IOUNIT)

RETURN
      END
      SUBROUTINE P2OPEN(FTYPE,FNAME,FNLEN,IOUNIT,IERR)
C
C  OPEN FILE FOR WRITING PADL-2 DEFINITION
C
C  INPUT:
C    FTYPE : FILE TYPE
C                0 = USER'S TERMINAL
C                1 = FILE
C    FNAME : FILE SPECIFICATION (ONE CHARACTER PER ARRAY ELEMENT)
C    FNLEN : NUMBER OF CHARACTER IN FNAME ARRAY
C
C  OUTPUT:
C    IOUNIT : I/O UNIT NUMBER
C    IERR   : ERROR STATUS
C                = 0, NO ERRORS
C                > 0, OPEN FAILURE ERROR NUMBER
```

```
C
C   REVISIONS:
C      RV   DATE       WHO   REASON
C      00   01-AUG-88  DLV   INITIAL IMPLEMENTATION
C      01   20-JUL-90  DLV   MODIFIED FOR 3-D BREP->CSG
C
       INTEGER FTYPE, FNAME(*), FNLEN, IOUNIT, IERR
C
       CHARACTER*(133) CFNAME
       INTEGER I
#EXEC
C/EXEC
C
C *** USER'S TERMINAL
       IF (FTYPE .EQ. 0) THEN
           IOUNIT=6
           IERR=0
C
C *** OPERATING SYSTEM FILE
       ELSE
C
C *** CONVERT FILE NAME TO CHARACTER STRING
           DO 100 I=1, FNLEN
               CFNAME(I:I) = CHAR(FNAME(I))
100        CONTINUE
           CFNAME(FNLEN+1:133) = ' '
           IOUNIT=20
           OPEN(IOUNIT,FILE=CFNAME(1:FNLEN),IOSTAT=IERR,STATUS='NEW')
       END IF

RETURN
       END
       SUBROUTINE P2PLN(NAME,NAMEL,VEC1,VEC2,D1,D2,SENSE,IOUNIT)
C
C   MAKE A PLANE META PRIMITIVE AND WRITE TO PADL2 FILE
C
C   INPUT:
C      NAME : META PRIMITIVE NAME
C      NAMEL: NUMBER OF CHARACTER IN 'NAME'
C      VEC1 : POINT ON PLANE
C      VEC2 : NORMAL TO PLANE
C      D1   : <UNUSED>
C      D2   : <UNUSED>
C      SENSE: SURFACE SENSE (SEE TABLE IN PARASOLID MANUAL)
C      IOUNIT : I/O UNIT NUMBER
C
C   REVISIONS:
C      RV   DATE       WHO   REASON
C      00   27-JUL-88  DLV   INITIAL IMPLEMENTATION
C      01   20-JUL-90  DLV   MODIFIED FOR 3-D BREP->CSG
C
       CHARACTER*(*) NAME
       REAL VEC1(3), VEC2(3), D1, D2
       INTEGER NAMEL, SENSE, IOUNIT
C
       REAL DEGX, DEGY, DEGZ, MOVX, MOVY, MOVZ
       CHARACTER*1 C
       CHARACTER*8 RMNAME
       INTEGER RMNAML
C/EXEC
```

```
C
C *** COMPUTE PLANE PARAMETERS
      MOVX = VEC1(1)
      MOVY = VEC1(2)
      MOVZ = VEC1(3)
      CALL VECANG(VEC2,0,DEGX,DEGY,DEGZ)
      IF (SENSE .EQ. 1) THEN
         C = '0'
      ELSE
         C = '1'
      END IF
C
C *** OUTPUT THE RIGID MOTION STATEMENT
      CALL P2RM(NAME,NAMEL,DEGX,DEGY,DEGZ,MOVX,MOVY,MOVZ,IOUNIT,
     1          RMNAME,RMNAML)
C
C *** OUTPUT THE PLANE META PRIMITIVE STATEMENT
      WRITE (IOUNIT,'(1X,A,A,A,A,A,A,A)')
     1     NAME(1:NAMEL),
     2     ' = META(PLANE=(RM=',
     3     RMNAME(1:RMNAML),
     4     ', C=',
     5     C,
     6     '), BOX=SOLID_BOX);'

RETURN
      END
      SUBROUTINE P2RM(NAME,NAMEL,DEGX,DEGY,DEGZ,MOVX,MOVY,MOVZ,
     1                IOUNIT,RMNAME,RMNAML)
C
C  WRITE A PADL-2 RIGID MOTION STATEMENT FOR A GIVEN HALFSPACE
C
C  INPUT:
C    NAME:   NAME OF THE HALFSPACE ASSOCIATED WITH THE RIGID MOTION
C    NAMEL:  NUMBER OF CHARACTERS IN 'NAME'
C    DEGX:   ROTATION ABOUT THE X-AXIS (DEGREES)
C    DEGY:   ROTATION ABOUT THE Y-AXIS (DEGREES)
C    DEGZ:   ROTATION ABOUT THE Z-AXIS (DEGREES)
C    MOVX:   X-AXIS TRANSLATION
C    MOVY:   Y-AXIS TRANSLATION
C    MOVZ:   Z-AXIS TRANSLATION
C    IOUNIT: I/O UNIT NUMBER
C
C  OUTPUT:
C    RMNAME: NAME OF THE RIGID MOTION
C    RMNAML: NUMBER OF CHARACTERS IN 'RMNAME'
C
C  REVISIONS:
C    RV  DATE       WHO  REASON
C    00  26-JUL-90  DLV  INITIAL IMPLEMENTATION
C
      CHARACTER*(*) NAME, RMNAME
      INTEGER NAMEL, IOUNIT, RMNAML
      REAL DEGX, DEGY, DEGZ, MOVX, MOVY, MOVZ
C
      LOGICAL NODEG, NOMOV
      REAL NIL
      PARAMETER (NIL = 1.0E-10)
      CHARACTER*8 SPACES
C
```

```
          REAL ABS
C
C/EXEC
C
C *** DETERMINE IF THERE ARE ANY ROTATIONS OR TRANSLATIONS
      NODEG = (ABS(DEGX) .LT. NIL) .AND.
     1        (ABS(DEGY) .LT. NIL) .AND.
     2        (ABS(DEGZ) .LT. NIL)
      NOMOV = (ABS(MOVX) .LT. NIL) .AND.
     1        (ABS(MOVY) .LT. NIL) .AND.
     2        (ABS(MOVZ) .LT. NIL)
C
C *** NO RIGID MOTION, USE 'LAB'
      IF (NODEG .AND. NOMOV) THEN
          RMNAME = 'LAB'
          RMNAML = 3
C
C *** CREATE THE RIGID MOTION NAME
      ELSE
          RMNAME = NAME(1:NAMEL) // '_RM'
          RMNAML = NAMEL + 3
C
C *** NO TRANSLATIONS, USE ROTATIONS ONLY
          IF (NOMOV) THEN
              WRITE (IOUNIT,'(1X,A,A,3(A,F12.5),A)')
     1            RMNAME(1:RMNAML),' = ',
     2            '(DEGX=',DEGX,
     3            ', DEGY=',DEGY,
     4            ', DEGZ=',DEGZ,
     5            ');'
C
C *** NO ROTATIONS, USE TRANSLATIONS ONLY
          ELSEIF (NODEG) THEN
              WRITE (IOUNIT,'(1X,A,A,3(A,F12.5),A)')
     1            RMNAME(1:RMNAML),' = ',
     2            '(MOVX=',MOVX,
     3            ', MOVY=',MOVY,
     4            ', MOVZ=',MOVZ,
     5            ');'
C
C *** BOTH ROTATIONS AND TRANSLATIONS REQUIRED
          ELSE
              SPACES = ' '
              WRITE (IOUNIT,'(1X,A,A,3(A,F12.5),A)')
     1            RMNAME(1:RMNAML),' = ',
     2            '(DEGX=',DEGX,
     3            ', DEGY=',DEGY,
     4            ', DEGZ=',DEGZ,
     5            ', \'
              WRITE (IOUNIT,'(1X,A,A,3(A,F12.5),A)')
     1            SPACES(1:RMNAML),'   ',
     2            ' MOVX=',MOVX,
     3            ', MOVY=',MOVY,
     4            ', MOVZ=',MOVZ,
     5            ');'
          END IF
      END IF

RETURN
      END
```

```
      SUBROUTINE P2SPH(NAME,NAMEL,VEC1,VEC2,D1,D2,SENSE,IOUNIT)
C
C MAKE A SPHERE META PRIMITIVE AND WRITE TO PADL2 FILE
C
C INPUT:
C   NAME  : META PRIMITIVE NAME
C   NAMEL : NUMBER OF CHARACTERS IN 'NAME'
C   VEC1  : CENTER POINT
C   VEC2  : <UNUSED>
C   D1    : RADIUS
C   D2    : <UNUSED>
C   SENSE : SURFACE SENSE (SEE TABLE IN PARASOLID MANUAL)
C   IOUNIT: I/O UNIT NUMBER
C
C REVISIONS:
C   RV  DATE        WHO  REASON
C   00  27-JUL-88   DLV  INITIAL IMPLEMENTATION
C   01  20-JUL-90   DLV  MODIFIED FOR 3-D BREP->CSG
C
      CHARACTER*(*) NAME
      REAL VEC1(3), VEC2(3), D1, D2
      INTEGER NAMEL, SENSE, IOUNIT
C
      REAL R, MOVX, MOVY, MOVZ
      CHARACTER*1 C
      CHARACTER*8 RMNAME
      INTEGER RMNAML
C/EXEC
C
C *** COMPUTE SPHERE PARAMETERS
      R=D1
      MOVX = VEC1(1)
      MOVY = VEC1(2)
      MOVZ = VEC1(3)
      IF (SENSE .EQ. 1) THEN
         C = '0'
      ELSE
         C = '1'
      END IF
C
C *** OUTPUT THE RIGID MOTION STATEMENT
      CALL P2RM(NAME,NAMEL,0.0,0.0,0.0,MOVX,MOVY,MOVZ,IOUNIT,
     1          RMNAME,RMNAML)
C
C *** OUTPUT THE SPHERE META PRIMITIVE STATEMENT
      WRITE (IOUNIT,'(1X,A,A,F12.5,A,A,A,A,A)')
     1   NAME(1:NAMEL),
     2   ' = META(SPHERE=(R=',
     3   R,
     4   ', RM=',
     5   RMNAME(1:RMNAML),
     6   ', C=',
     7   C,
     8   '), BOX=SOLID_BOX);'

RETURN
      END
      SUBROUTINE PACK(HS,CPT)
C
C PACK ACTIVE HALF SPACE AND/OR CHARACTERISTIC POINT DATA
```

```
C
C  INPUT:
C    HS  : =1, PACK HALF SPACES
C    CPT : =1, PACK CHARACTERISTIC POINTS
C
C  DESCRIPTION:
C    THIS SUBROUTINE PACKS THE ACTIVE HALF SPACE AND/OR
C    CHARACTERISTIC POINT DATA STRUCTURES BY REMOVING
C    INACTIVE DATA
C
C  REVISIONS:
C    RV  DATE        WHO  REASON
C    00  16-MAR-88   DLV  INITIAL IMPLEMENTATION
C    01  25-MAY-90   DLV  ADDED 'Z' COORDINATE
C
      INTEGER HS,CPT
C
#INCLUDE 'HSDATA.INS'
      INTEGER I,J,K
#EXEC
C/EXEC
C
C *** PACK HALF SPACES?
      IF (HS .NE. 1) GOTO 500
C
C *** CYCLE THE HALF SPACES
      I=0
      J=0
100   IF (I .LT. HSNUM) THEN
          I=I+1
C
C *** KEEP THE ACTIVE HALF SPACES
          IF (HSSTAT(I) .EQ. ACTIVE) THEN
              J=J+1
C
C *** MOVE THE DATA IN THE ARRAYS
              HSSTAT(J)=HSSTAT(I)
              HSCOEF(J,1)=HSCOEF(I,1)
              HSCOEF(J,2)=HSCOEF(I,2)
              HSCOEF(J,3)=HSCOEF(I,3)
              HSTYPE(J)=HSTYPE(I)
              HSNAME(J)=HSNAME(I)
              DO 150 K=1,CPTNUM
                  CPTCHS(K,J)=CPTCHS(K,I)
150           CONTINUE
          END IF
          GOTO 100
      END IF
C
C *** RESET NUMBER OF HALF SPACES
      HSNUM=J
C
C *** PACK CHARACTERISTIC POINTS?
500   IF (CPT .NE. 1) GOTO 999
C
C *** CYCLE THE CHARACTERISTIC POINTS
      I=0
      J=0
600   IF (I .LT. CPTNUM) THEN
          I=I+1
```

```
C
C *** KEEP THE ACTIVE CHARACTERISTIC POINTS
            IF (CPSTAT(I) .EQ. ACTIVE) THEN
               J=J+1
C
C *** MOVE THE DATA IN THE ARRAYS
               CPSTAT(J)=CPSTAT(I)
               CPTX(J)=CPTX(I)
               CPTY(J)=CPTY(I)
               CPTZ(J)=CPTZ(I)
               DO 700 K=1, HSNUM
                  CPTCHS(J,K)=CPTCHS(I,K)
700            CONTINUE
               CPTCLS(J)=CPTCLS(I)
            END IF
         GOTO 600
         END IF
C
C *** RESET NUMBER OF CHARACTERISTIC POINTS
      CPTNUM=J

999   RETURN
      END
      SUBROUTINE PART%1%(SEED,MINSOL)
C
C   COMPUTE BOOLEAN EXPRESSION USING RECURSIVE PARTIONING
C
C   INPUT:
C     SEED   : SEED EXPRESSION (MAY BE NULL)
C
C   OUTPUT:
C     SEED   : (REDUCED) BOOLEAN EXPRESSION
C     MINSOL : .TRUE.,  SOLUTION IS MINIMAL
C              .FALSE., UNKNOWN
C
C   DESCRIPTION:
C     THIS SUBROUTINE COMPUTES A CORRECT BOOLEAN EXPRESSION FOR
C     THE ACTIVE HALF SPACES AND CHARACTERISTIC POINTS.
C
C   REVISIONS:
C     RV  DATE       WHO  REASON
C     00  15-JAN-88  DLV  INITIAL IMPLEMENTATION
C
      INTEGER SEED(0:*)
      LOGICAL MINSOL
C
#INCLUDE 'HSDATA.INS'
#INCLUDE 'TRACE.INS'
      INTEGER I,PASS
      LOGICAL CHANGE,ALLOUT,ALLIN,MINCLU
      INTEGER EXPR(0:MAXEXP),DOMEXP(0:MAXEXP),SVEXPR(0:MAXEXP)
      INTEGER NTERMS,TERMS(0:MAXEXP,MAXTRM)
      INTEGER NCLUST,CLUST(0:MAXEXP,MAXCLU)
      INTEGER LEVEL,MAXLEV
      PARAMETER (LEVEL=%1%,MAXLEV=%MAXLEV%)
C
      INTEGER EVLCPT
#EXEC
C/EXEC
C
```

```
C *** TRACE OUTPUT
      IF (TRACE(MEDIUM)) THEN
         PRINT *, '***** Entering Level #%1% *****'
         PRINT *, 'Input Expression (Level #%1%):'
         CALL LSTEXP(SEED)
         END IF
C
C *** ASSUME SOLUTION IS NOT MINIMAL
      MINSOL=.FALSE.
C
C *** ESTABLISH ENVIRONMENT FOR THIS LEVEL
      IF (SEED(0) .GT. 0) THEN
C
C *** ENABLE APPROPRIATE HALF SPACES FOR SEED EXPRESSION
         DO 110 I=1, SEED(0)
            IF (SEED(I) .GT. 0) HSSTAT(SEED(I))=LEVEL
110      CONTINUE
C
C *** ENABLE APPROPRIATE CHARACTERISTIC POINTS FOR SEED EXPRESSION
C
C
C                                  UNION           INTERSECTION
C                                  ---------       ---------------
C     IN  OUTLINE & IN  SEED       ACTIVE          ACTIVE
C     IN  OUTLINE & OUT SEED       INACTIVE        (IMPOSSIBLE)
C     OUT OUTLINE & IN  SEED       (IMPOSSIBLE)    INACTIVE
C     OUT OUTLINE & OUT SEED       ACTIVE          ACTIVE
C
         DO 120 I=1, CPTNUM
            IF (CPSTAT(I) .EQ. LEVEL-1) THEN
               IF (CPTCLS(I) .EQ. IN) THEN
                  IF (EVLCPT(SEED,I) .EQ. IN) CPSTAT(I)=LEVEL
               ELSE ! (CPTCLS(I) .EQ. OUT)
                  IF (EVLCPT(SEED,I) .EQ. OUT) CPSTAT(I)=LEVEL
                  END IF
               END IF
120      CONTINUE
         END IF
C
C *** *****************************************************************
C
C *** EXTRACT DOMINATING EXPRESSION
      DOMEXP(0)=0
200   CALL DOMUN(DOMEXP,LEVEL,CHANGE)
      IF (CHANGE) GOTO 200
      CALL DOMINT(DOMEXP,LEVEL,CHANGE)
      IF (CHANGE) GOTO 200
      IF (TRACE(LONG)) THEN
         PRINT *, 'Dominating Expression (Level #%1%):'
         CALL LSTEXP(DOMEXP)
         END IF
C
C *** DETERMINE IF DOMINATING EXPRESSION IS COMPLETE SOLUTION
      ALLOUT=.TRUE.
      ALLIN=.TRUE.
      DO 210 I=1, CPTNUM
         IF (CPSTAT(I) .EQ. LEVEL) THEN
            IF (CPTCLS(I) .EQ. IN) THEN
               ALLOUT=.FALSE.
            ELSE ! (CPTCLS(I) .EQ. OUT)
               ALLIN=.FALSE.
```

```
              END IF
              END IF
210       CONTINUE
          IF (ALLIN .OR. ALLOUT) THEN
             IF (TRACE(LONG))
     1          PRINT *, 'Dominating Expression is MINIMAL (Level #%1%)'
             EXPR(0)=0
             MINSOL=.TRUE.
             GOTO 900
          END IF
C
C *** ****************************************************************
C
C *** COMPUTE (UNION-OF-INTERSECTIONS)/(INTERSECTION-OF-UNIONS)
C ***    PASS=UNION  -> UNION OF INTERSECTIONS
C ***         =INTSCT -> INTERSECTION OF UNIONS
C
C *** INITIALIZE AND COMPUTE
          PASS=UNION
400       IF (PASS .EQ. UNION) THEN
             CALL SUMINT(LEVEL,TERMS,NTERMS)
             IF (TRACE(LONG))
     1          PRINT *, 'Sum of Products (Level #%1%):'
          ELSE ! (PASS .EQ. INTSCT)
             CALL INTSUM(LEVEL,TERMS,NTERMS)
             IF (TRACE(LONG))
     1          PRINT *, 'Product of Sums (Level #%1%):'
          END IF
          IF (TRACE(LONG)) CALL LSTLST(TERMS,NTERMS)
C
C *** CLUSTER IF MORE THAN TWO TERMS
          IF (NTERMS .GT. 2) THEN
             CALL MKCLUS(TERMS,NTERMS,PASS,CLUST,NCLUST)
             IF (TRACE(LONG)) THEN
                IF (PASS .EQ. UNION) THEN
                   PRINT *, 'CLUSTERED Sum of Products (Level #%1%):'
                ELSE ! (PASS .EQ. INTSCT)
                   PRINT *, 'CLUSTERED Product of Sums (Level #%1%):'
                END IF
                CALL LSTLST(CLUST,NCLUST)
             END IF
C
C *** IF ONLY ONE CLUSTER, SPLIT INTO TWO
             IF (NCLUST .EQ. 1) THEN
                CALL SPLIT(TERMS,NTERMS,PASS,CLUST,NCLUST)
                IF (TRACE(LONG)) THEN
                   IF (PASS .EQ. UNION) THEN
                      PRINT *, 'SPLIT Sum of Products (Level #%1%):'
                   ELSE ! (PASS .EQ. INTSCT)
                      PRINT *, 'SPLIT Product of Sums (Level #%1%):'
                   END IF
                   CALL LSTLST(CLUST,NCLUST)
                END IF
C
C *** NOW ASSUME MINIMUM WILL BE FOUND (NO SPLIT)
             ELSE
                MINSOL=.TRUE.
             END IF
C
C *** RECURSIVELY SIMPLIFY EACH CLUSTER
```

```
            IF (TRACE(LONG))
    1          PRINT *, '***** Suspending Level #%1% *****'
           DO 410 I=1, NCLUST
              IF (LEVEL .LT. MAXLEV) THEN
C
C *** SIMPLIFY CLUSTERS WHICH CONTAIN MORE THAN ONE TERM
C *** LAST OPERATOR IN EXPRESSION INDICATES MULTIPLE TERMS
                IF (CLUST(CLUST(0,I),I) .EQ. PASS) THEN
                   CALL PART%2%(CLUST(0,I),MINCLU)
                   IF (MINSOL) MINSOL=MINCLU
                END IF
C
C *** RECURSION MAXIMUM EXCEEDED
              ELSE
                 PRINT *, '<<< MAXIMUM RECURSION LEVEL EXCEEDED >>>'
              END IF
410        CONTINUE
C
C *** RESUME CURRENT LEVEL
           IF (TRACE(LONG))
    1         PRINT *, '***** Resuming Level #%1% *****'
C
C *** ONLY ONE OR TWO TERMS, NO CLUSTERING
        ELSE
           NCLUST=1
           CALL CPYEXP(TERMS(0,1),CLUST(0,1))
           MINSOL=.TRUE.
           IF (NTERMS .EQ. 2) THEN
              NCLUST=2
              CALL CPYEXP(TERMS(0,2),CLUST(0,2))
           END IF
        END IF
C
C *** FORM EXPRESSION FROM CLUSTER(S)
        EXPR(0)=0
        DO 500 I=1, NCLUST
           CALL APPEXP(EXPR,CLUST(0,I))
500     CONTINUE
        DO 510 I=2, NCLUST
           EXPR(0)=EXPR(0)+1
           EXPR(EXPR(0))=PASS
510     CONTINUE
C
C *** MOVE EXPRESSION AS REQUIRED
        IF (PASS .EQ. UNION) THEN
           IF (TRACE(LONG)) THEN
              PRINT *, 'Sum of Products Expression (Level #%1%):'
              CALL LSTEXP(EXPR)
           END IF
           IF (MINSOL) THEN
              IF (TRACE(LONG))
    1            PRINT *, 'Sum of Products is MINIMAL (Level #%1%)'
              GOTO 900
           ELSE
              CALL CPYEXP(EXPR,SVEXPR)
              PASS=INTSCT
              GOTO 400
           END IF
        ELSE   ! (PASS .EQ. INTSCT)
           IF (TRACE(LONG)) THEN
```

```
                PRINT *, 'Product of Sums Expression (Level #%1%):'
                CALL LSTEXP(EXPR)
              END IF
           IF (MINSOL) THEN
              IF (TRACE(LONG))
     1           PRINT *, 'Product of Sums is MINIMAL (Level #%1%)'
              GOTO 900
           ELSEIF (SVEXPR(0) .LT. EXPR(0)) THEN
              CALL CPYEXP(SVEXPR,EXPR)
           END IF
         END IF
C
C *** ***************************************************************
C
C *** FORMULATE SOLUTION (DOMEXPR AND EXPR ARE ALREADY COMPUTED)
 900     IF (EXPR(0) .EQ. 0) THEN
           DO 910 I=2, DOMEXP(0)-1
              DOMEXP(I)=DOMEXP(I+1)
 910       CONTINUE
           DOMEXP(0)=DOMEXP(0)-1
           CALL CPYEXP(DOMEXP,SEED)
         ELSEIF (DOMEXP(0) .EQ. 0) THEN
           CALL CPYEXP(EXPR,SEED)
         ELSE
           CALL APPEXP(EXPR,DOMEXP)
           CALL CPYEXP(EXPR,SEED)
         END IF
         IF (TRACE(MEDIUM)) THEN
           PRINT *, 'Output from Level #%1%:'
           CALL LSTEXP(SEED)
           PRINT *, '***** Exiting Level #%1% *****'
         END IF
C
C *** RESTORE RECURSIVE ENVIRONMENT
         DO 920 I=1, CPNUM
            CPSTAT(I)=MIN(CPSTAT(I),LEVEL-1)
 920     CONTINUE
         DO 930 I=1, HSNUM
            HSSTAT(I)=MIN(HSSTAT(I),LEVEL-1)
 930     CONTINUE RETURN
         END
         SUBROUTINE PURGE()
C
C  PURGE CHARACTERISTIC POINTS
C
C  NO INPUT OR OUTPUT
C
C  DESCRIPTION:
C    THIS SUBROUTINE DELETES DUPLICATE CHARACTERISTIC POINTS
C    LEAVING ONE POINT PER REGION.
C
C  REVISIONS:
C    RV   DATE       WHO  REASON
C    00   15-JAN-88  DLV  INITIAL IMPLEMENTATION
C    01   18-AUG-88  DLV  ADDED BINARY SORT FOR EFFICIENCY
C
#INCLUDE 'HSDATA.INS'
         INTEGER I,J,NNODES
```

```
          INTEGER CPINDX(MAXCPT),LEFT(MAXCPT),RIGHT(MAXCPT)
          INTEGER NULL,CURR
          PARAMETER (NULL=0)
#EXEC
C/EXEC
C
C *** INITIALIZE FIRST NODE IN BINARY TREE TO FIRST
C *** CHARACTERISTIC POINT
       CPINDX(1)=1
       LEFT(1)=NULL
       RIGHT(1)=NULL
       NNODES=1
C
C *** SORT ALL UNIQUE CHARACTERISTIC POINTS INTO TREE
       DO 300 I=2, CPTNUM
C
C *** START SEARCH AT TOP NODE
          CURR=1
C
C *** COMPARE HALF SPACE CLASSIFICATIONS TO DETERMINE WHICH
C *** DIRECTION TO STEP FROM CURRENT NODE (LEFT OR RIGHT)
100       DO 200 J=1, HSNUM
C
C *** LEFT?
             IF (CPTCHS(I,J) .LT. CPTCHS(CPINDX(CURR),J)) THEN
C
C *** LEFT, STEP TO LEFT NODE OR ADD LEFT NODE
                IF (LEFT(CURR) .NE. NULL) THEN
                   CURR=LEFT(CURR)
                   GOTO 100
                ELSE
                   NNODES=NNODES+1
                   LEFT(CURR)=NNODES
                   CPINDX(NNODES)=I
                   LEFT(NNODES)=NULL
                   RIGHT(NNODES)=NULL
                END IF
C
C *** RIGHT?
             ELSEIF (CPTCHS(I,J) .GT. CPTCHS(CPINDX(CURR),J)) THEN
C
C *** RIGHT, STEP TO RIGHT NODE OR ADD RIGHT NODE
                IF (RIGHT(CURR) .NE. NULL) THEN
                   CURR=RIGHT(CURR)
                   GOTO 100
                ELSE
                   NNODES=NNODES+1
                   RIGHT(CURR)=NNODES
                   CPINDX(NNODES)=I
                   LEFT(NNODES)=NULL
                   RIGHT(NNODES)=NULL
                END IF
             END IF
200       CONTINUE
300    CONTINUE
C
C *** DEACTIVATE ALL CHARACTERISTIC POINTS
       DO 400 I=1, CPTNUM
          CPSTAT(I)=INACT
400    CONTINUE
```

```
      C
      C *** ACTIVATE ALL CHARACTERISTIC POINTS IN THE TREE
      C *** IGNOR THOSE 'ON' THE SOLID
            DO 500 I=1, NNODES
               IF (CPTCLS(CPINDX(I)) .NE. ON) THEN
                  CPSTAT(CPINDX(I))=ACTIVE
               END IF
 500        CONTINUE
      C
      C *** PACK CHARACTERISTIC POINTS
            CALL PACK(0,1)
      C
      C *** REPORT NUMBER OF REMAINING POINTS
            PRINT *, '<',CPTNUM,'> Characteristic Points'

RETURN
            END
            SUBROUTINE SIMPLE(EXPR,LEVEL)
      C
      C  SIMPLIFY AN EXPRESSION IN INTERSECTION FORM
      C
      C  INPUT:
      C     EXPR : THE EXPRESSION IN THE FORM ABCD...****...
      C     LEVEL : RECURSION LEVEL
      C
      C  OUTPUT:
      C     EXPR : SIMPLIFIED EXPRESSION
      C
      C  DESCRIPTION:
      C     THIS SUBROUTINE SIMPLIFIES AN EXPRESSION WHICH IS IN
      C     INTERSECTION FORM.
      C
      C  REVISIONS:
      C     RV   DATE       WHO   REASON
      C     00   11-APR-88  DLV   INITIAL VERSION
      C
            INTEGER EXPR(0:*),LEVEL
      C
      #INCLUDE 'HSDATA.INS'
            INTEGER I,J,TEST(0:MAXEXP),MAP(0:MAXEXP),ORGEXP(0:MAXEXP)
            INTEGER NHALF,INCNT,INMAX
      C
            INTEGER EVLCPT
      #EXEC
      C/EXEC
      C
      C *** COPY ORIGINAL EXPRESSION
            CALL CPYEXP(EXPR,ORGEXP)
      C
      C *** COMPUTE NUMBER OF HALF SPACES
            NHALF=(EXPR(0)+1)/2
            INMAX=0
      C
      C *** SEARCH FOR SHORTEST INTERSECTION EXPRESSION WHICH
      C *** CONTAINS THE MOST REGIONS
            DO 400 I=1, NHALF-1
      C
      C *** DONE?
               IF (INMAX .GT. 0) GOTO 999
      C
```

```
C *** INITIALIZE MAP; GENERATE MAPS SEQUENTIALLY
          MAP(0)=0
100       CALL NXTMAP(MAP,I,NHALF)
C
C *** VALID MAP?
          IF (MAP(0) .GT. 0) THEN
C
C *** CONVERT MAP TO TEST EXPRESSION
            DO 200 J=1, I
               TEST(J)=ORGEXP(MAP(J))
C
C *** ADD AN INTERSECTION OPERATOR FOR EACH (LAST ONE NOT USED)
               TEST(J+I)=INTSCT
200         CONTINUE
            TEST(0)=2*I-1
C
C *** EVERY CHARACTERISTIC POINT OUTSIDE OUTLINE MUST BE
C *** OUTSIDE REGION DEFINED BY TEST EXPRESSION
            DO 300 J=1, CPTNUM
C
C *** ACTIVE CHARACTERISTIC POINT?
               IF (CPSTAT(J) .EQ. LEVEL) THEN
C
C *** CHARACTERISTIC POINT OUTSIDE OUTLINE?
                  IF (CPTCLS(J) .EQ. OUT) THEN
C
C *** DOES EXPRESSION EVALUATE CHARACTERISTIC POINT TO 'OUT'
                     IF (EVLCPT(TEST,J) .NE. OUT) GOTO 100
                  END IF
               END IF
300         CONTINUE
C
C *** COUNT NUMBER OF CORRECTLY CLASSIFIED 'IN' POINTS
            INCNT=0
            DO 350 J=1, CPTNUM
               IF (CPSTAT(J) .EQ. LEVEL) THEN
                  IF (CPTCLS(J) .EQ. IN) THEN
                     IF (EVLCPT(TEST,J) .EQ. IN) INCNT=INCNT+1
                  END IF
               END IF
350         CONTINUE
C
C *** SAVE SIMPLIFIED EXPRESSION WITH MOST 'IN' POINTS
            IF (INCNT .GT. INMAX) THEN
               CALL CPYEXP(TEST,EXPR)
               INMAX=INCNT
            END IF
            GOTO 100
          END IF
400       CONTINUE

999    RETURN
       END
       SUBROUTINE SPLIT(TERMS,NTERMS,OPER,CLUST,NCLUST)
C
C  SEPARATE TERMS INTO TWO CLUSTERS WHICH ARE AS INDEPENDENT AS POSSIBLE
C
C  INPUT:
C    TERMS  : LIST OF TERMS
C    NTERMS : NUMBER OF TERMS
```

```
C     OPER    : OPERATOR JOINING TERMS
C                       joining
C  OUTPUT:
C     CLUST   : LIST OF CLUSTERED TERMS
C     NCLUST  : NUMBER OF CLUSTERS (ALWAYS 2)
C
C  DESCRIPTION:
C     THIS SUBROUTINE SEPARATES A LIST OF TERMS INTO TWO CLUSTERS WHICH
C     ARE AS INDEPENDENT AS POSSIBLE.
C
C  REVISIONS:
C     RV  DATE       WHO  REASON
C     00  17-JUN-88  DLV  INITIAL VERSION
C
#INCLUDE 'HSDATA.INS'
      INTEGER TERMS(0:MAXEXP,*),NTERMS,OPER
      INTEGER CLUST(0:MAXEXP,*),NCLUST
C
      INTEGER I,J,OPEXPR(0:1)
      INTEGER SEED1,SEED2,MINCOM,CURCOM,NCOM1,NCOM2
      INTEGER TEMP(0:MAXEXP)
C
      INTEGER NCOMHS
#EXEC
C/EXEC
C
C *** FIND PAIR OF TERMS WHICH ARE MOST INDEPENDENT
      MINCOM=MAXEXP
      DO 200 I=1, NTERMS-1
         DO 100 J=I+1, NTERMS
            CURCOM=NCOMHS(TERMS(0,I),TERMS(0,J))
C
C *** SEEDS ARE PAIR WITH LEAST COMMON TERMS
            IF (CURCOM .LT. MINCOM) THEN
               SEED1=I
               SEED2=J
               MINCOM=CURCOM
            END IF
100      CONTINUE
200   CONTINUE
C
C *** COPY EACH TERM INTO A SEPARATE CLUSTER
      DO 400 I=1, NTERMS
         CALL CPYEXP(TERMS(0,I),CLUST(0,I))
400   CONTINUE
C
C *** CONSTRUCT OPERATOR EXPRESSION
      OPEXPR(0)=1
      OPEXPR(1)=OPER
C
C *** APPEND EACH CLUSTER TO THE SEED CLUSTER
C *** WITH MOST COMMON HALF SPACES
      DO 500 I=1, NTERMS
C
C *** SKIP OVER THE SEEDS
         IF ((I .EQ. SEED1) .OR. (I .EQ. SEED2)) GOTO 500
C
C *** ADD TO APPROPRIATE SEED CLUSTER
         NCOM1=NCOMHS(CLUST(0,SEED1),CLUST(0,I))
         NCOM2=NCOMHS(CLUST(0,SEED2),CLUST(0,I))
```

```
              IF (NCOM1 .GT. NCOM2) THEN
                 CALL APPEXP(CLUST(0,SEED1),CLUST(0,I))
                 CALL APPEXP(CLUST(0,SEED1),OPEXPR)
              ELSEIF (NCOM2 .GT. NCOM1) THEN
                 CALL APPEXP(CLUST(0,SEED2),CLUST(0,I))
                 CALL APPEXP(CLUST(0,SEED2),OPEXPR)
              ELSEIF (CLUST(0,SEED1) .LE. CLUST(0,SEED2)) THEN
                 CALL APPEXP(CLUST(0,SEED1),CLUST(0,I))
                 CALL APPEXP(CLUST(0,SEED1),OPEXPR)
              ELSE
                 CALL APPEXP(CLUST(0,SEED2),CLUST(0,I))
                 CALL APPEXP(CLUST(0,SEED2),OPEXPR)
              END IF
 500       CONTINUE
C
C *** MOVE SEED CLUSTERS INTO POSITIONS 1 & 2 (AVOID OVERWRITE)
           CALL CPYEXP(CLUST(0,SEED2),TEMP)
           CALL CPYEXP(CLUST(0,SEED1),CLUST(0,1))
           CALL CPYEXP(TEMP,CLUST(0,2))
           NCLUST=2

RETURN
           END
           SUBROUTINE SUMINT(LEVEL,TERMS,NTERMS)
C
C    COMPUTE 'SUM OF INTERSECTIONS' FOR ACTIVE REGIONS
C
C    INPUT:
C      LEVEL  : RECURSION LEVEL
C
C    OUTPUT:
C      TERMS  : ARRAY OF INTERSECTION EXPRESSIONS
C      NTERMS : NUMBER OF EXPRESSIONS IN 'TERMS'
C
C    DESCRIPTION:
C      THIS ROUTINE COMPUTES A 'SUM OF INTERSECTIONS' FOR ALL
C      THE ACTIVE REGIONS
C
C    RV  DATE       WHO  REASON
C    00  08-APR-88  DLV  INITIAL IMPLEMENTATION
C
#INCLUDE 'HSDATA.INS'
#INCLUDE 'TRACE.INS'
           INTEGER LEVEL,TERMS(0:MAXEXP,*),NTERMS
C
           INTEGER I,J,EXPR(0:MAXEXP)
           INTEGER REGION,MINCNT,COUNT
C
           INTEGER EVLCPT
#EXEC
C/EXEC
C
C *** INITIALIZE
           NTERMS=0
C
C *** FIND THE CHARACTERITIC POINT INSIDE THE FEWEST HALF SPACES
 5         REGION=0
           MINCNT=MAXHS
           DO 20 I=1, CPTNUM
              IF (CPSTAT(I) .NE. LEVEL) GOTO 20
```

```
            IF (CPTCLS(I) .NE. IN) GOTO 20
            COUNT=0
            DO 10 J=1, HSNUM
               IF (HSSTAT(J) .NE. LEVEL) GOTO 10
               IF (CPTCHS(I,J) .EQ. IN) COUNT=COUNT+1
               IF (COUNT .GE. MINCNT) GOTO 20
10          CONTINUE
            REGION=I
            MINCNT=COUNT
20       CONTINUE
C
C *** NO REGION FOUND?
         IF (REGION .EQ. 0) GOTO 550
C
C *** FIND A NEW EXPRESSION FOR CHARACTERISTIC POINT
         EXPR(0)=0
         DO 100 I=1, HSNUM
            IF ((HSSTAT(I) .EQ. LEVEL) .AND.
     1          (CPTCHS(REGION,I) .EQ. IN)) THEN
               EXPR(0)=EXPR(0)+1
               EXPR(EXPR(0))=I
            END IF
100      CONTINUE
C
C *** ADD INTERSECTION OPERATORS TO THE END OF EXPRESSSION
         DO 200 I=1,EXPR(0)-1
            EXPR(I+EXPR(0))=INTSCT
200      CONTINUE
         EXPR(0)=2*EXPR(0)-1
C
C *** SIMPLIFY THE EXPRESSION
         CALL SIMPLE(EXPR,LEVEL)
C
C *** ADD TO LIST OF TERMS
         NTERMS=NTERMS+1
         IF (NTERMS .GT. MAXTRM) THEN
            PRINT *, 'SUMINT: Term storage exhausted, fatal error.'
            STOP
         END IF
         CALL CPYEXP(EXPR,TERMS(0,NTERMS))
C
C *** CURRENT CHARACTERISTIC POINT IS NOW (TEMPORARILY) INACTIVE
         CPSTAT(REGION)=-LEVEL
C
C *** OTHER CHARACTERISTIC POINTS INSIDE REGION
         DO 300 I=1, CPTNUM
            IF (CPSTAT(I) .EQ. LEVEL) THEN
               IF (EVLCPT(EXPR,I) .EQ. IN) CPSTAT(I)=-LEVEL
            END IF
300      CONTINUE
         GOTO 5
C
C *** RESET ACTIVE STATUSES
550      DO 600 I=1, CPTNUM
            CPSTAT(I)=ABS(CPSTAT(I))
600      CONTINUE

RETURN
         END
         SUBROUTINE VECANG(VEC, UNITS, ANGX, ANGY, ANGZ)
```

```
C
C   CONVERT A VECTOR TO AN ORDERED LIST OF ROTATIONS
C
C   INPUT:
C     VEC(3)    : VECTOR
C     UNITS     : ANGLE MEASUREMENT UNITS
C                  = 0, DEGREES
C                  OTHERWISE, RADIANS
C
C   OUTPUT:
C     ANGX      : ROTATION ABOUT X-AXIS [ALWAYS 0.0]
C     ANGY      : ROTATION ABOUT Y-AXIS
C     ANGZ      : ROTATION ABOUT Z-AXIS
C
C   REVISIONS:
C     RV  DATE       WHO  REASON
C     00  27-JUL-90  DLV  INITIAL IMPLEMENTATION
C
      REAL VEC(3), ANGX, ANGY, ANGZ
      INTEGER UNITS
C
      REAL COSINE, SINE
      REAL SQRT
C/EXEC
C
C *** ONLY TWO ROTATIONS ARE NEEDED, SELECT 'ANGY' AND 'ANGZ'
      ANGX = 0.0
C
C *** COMPUTE COSINE AND SINE OF 'ANGY'
C *** BOTH 'COSINE' AND 'SINE' SHOULD MATHEMATICALLY BE DIVIDED
C *** BY 'MAG(VEC)', BUT 'ARCTAN' COMPUTES 'COSINE/SINE', THEREFORE,
C *** 'MAG(VEC)' CANCELS OUT (ALSO AVOIDS POTENTIAL DIVISION BY ZERO)
      COSINE = VEC(3)
      SINE = SQRT(VEC(1)*VEC(1)+VEC(2)*VEC(2))
      CALL ARCTAN(SINE,COSINE,ANGY)
C
C *** COMPUTE COSINE AND SINE OF 'ANGZ'
C *** BOTH 'COSINE' AND 'SINE' SHOULD MATHEMATICALLY BE DIVIDED
C *** BY 'SQRT(VEC(1)**2+VEC(2)**2)', BUT 'ARCTAN' COMPUTES 'COSINE/SINE',
C *** THEREFORE, THIS IS IGNORED AS ABOVE.
      COSINE = VEC(1)
      SINE = VEC(2)
      CALL ARCTAN(SINE,COSINE,ANGZ)
C
C *** CONVERT TO DEGREES, IF REQUESTED (NOTE: ANGX = 0.0)
      IF (UNITS .EQ. 0) THEN
         ANGY = 180.0/PI * ANGY
         ANGZ = 180.0/PI * ANGZ
         END IF

RETURN
      END
```

We claim:

1. A method for a computerized modelling system to generate a graphical representation of an object from a constructive solid geometry representation ("CSG") when a boundary representation ("B-rep") of said object is received as input, comprising the steps of:

receiving, by a B-rep to CSG converter, the b-rep of an object as input;

inducing, by said B-rep to CSG converter, natural half spaces based on said b-rep input;

constructing, by said B-rep to CSG converter, separators of said b-rep to describe said object when unioned with said induced natural half spaces, further comprising the steps of:

constructing at least one separator through triples of vertices;

constructing at least one separator through planar edges; and constructing at least one separator separating nonplanar edges from their respective curved surfaces;

determining, by said B-rep to CSG converter, a CSG expression by decomposing said natural half spaces and said separators; and generating, by a model generator, a graphical model of said object from said CSG expression received from said B-rep to CSG converter.

2. The method for a computer to convert a b-rep to CSG of claim 1, wherein after said step of determining a CSG expression, is a further step of minimizing said CSG expression.

3. The method for a computer to convert a b-rep to CSG of claim 1, wherein at least one of said separators is a planar half space.

4. The method for a computer to convert a b-rep to CSG of claim 1, wherein at least one of said separators is a piecewise polynomial half space.

5. The method for a computer to convert a b-rep to CSG of claim 1, wherein at least one of said separators is nonplanar.

6. The method for a computer to convert a b-rep to CSG of claim 1, wherein said CSG expression output is a text listing.

7. The method for a computer to convert a b-rep to CSG of claim 6, wherein said text listing is input for a CSG solid modelling system.

8. The method for a computer to convert a b-rep to CSG of claim 7, wherein said CSG solid modelling system is a PADL-2 CSG solid modelling system.

9. The method for a computer to convert a b-rep to CSG of claim 1, wherein if said induced natural half spaces are of degree k, then said separators will be of degree $\geq k/2$.

10. A method for a computerized geometric modelling system to generate a graphical model of an object from a constructive solid geometry representation ("CSG") of said object from a boundary representation ("b-rep") of said object, comprising the steps of:

receiving, by a B-rep to CSG converter, a b-rep of said object as input;

converting, by said B-rep to CSG converter, said b-rep into a CSG expression by the further steps of:

inducing natural half spaces based on said b-rep input;

constructing separators of said b-rep to describe said object when unioned with said induced natural half spaces, further comprising the steps of:

constructing at least one separator through triples of vertices;

constructing at least one separator through planar edges; and constructing at least one separator separating nonplanar edges from their respective curved surfaces;

determining a CSG expression by decomposing said natural half spaces and said separators; and generating, by a model generator, a graphical model of said object from said CSG expression.

11. The method for a geometric modelling system to generate a CSG model of claim 10, wherein during said step of converting and after said step of determining a CSG expression, is a further step of minimizing said CSG expression.

12. The method for a geometric modelling system to generate a CSG model of claim 10, wherein at least one of said separators is a planar half space.

13. The method for a geometric modelling system to generate a CSG model of claim 10, wherein at least one of said separators is nonplanar.

14. A geometric modelling system which generates a graphical model of an object, comprising:

a boundary representation ("b-rep") generator for generating a boundary representation of a desired object;

a b-rep to constructive solid geometry ("CSG") converter for receiving said b-rep of said object from said generator, for inducing natural half spaces based on said b-rep, for constructing at least one separator through triples of vertices, for constructing at least one separator through planar edges of said b-rep, for constructing at least one separator for separating nonplanar edges from their respective curved surfaces of said b-rep, and for determining a CSG expression by decomposing said natural half spaces and said separators; and a model generator receiving said CSG expression from said converter and for generating a graphical model of said object based on said CSG expression.

15. The geometric modelling system of claim 14, wherein at least one of said separators is a planar half space.

16. The geometric modelling system of claim 14, wherein at least one of said separators is nonplanar.

17. The geometric modelling system of claim 14, wherein said CSG model generator is a PADL-2 CSG solid modelling system.

18. A dual representation geometric modelling system which generates a model of an object for a computerized application for further processing, comprising:

a definition editor for receiving a representation of a solid object to be modelled as input, wherein said representation is either a boundary representation ("b-rep") or a constructive solid geometry ("CSG") representation of said object;

a CSG to b-rep converter for receiving said representation of said solid object from said definition editor when said representation is CSG, and for generating a b-rep expression of said object corresponding to said CSG representation;

a b-rep to CSG converter for receiving said representation of said object from said definition editor when said representation is b-rep, for inducing natural half spaces based on said received representation, for constructing at least one separator through triples of vertices, for constructing at least one separator through planar edges, for constructing at least one separator for separating nonplanar edges from their respective curved surfaces, and for determining a CSG expression by decomposing said natural half spaces and said separators;

a model generator for receiving said b-rep or CSG expression from said converters and for generating a graphical model of said object based on said received expression; and an application for receiving said graphical model of said object and for further processing of said model.

19. The dual representation geometric modelling system of claim 18, wherein at least one of said separators is a planar half space.

20. The dual representation geometric modelling system of claim 18, wherein at least one of said separators is nonplanar.

21. The dual representation geometric modelling system of claim 18, wherein said application for receiving is an image processing system.

22. The dual representation geometric modelling system of claim 18, wherein said application for receiving is a CAD/CAM system.

23. The dual representation geometric modelling system of claim 18, wherein said application for receiving is an object analysis system.

* * * * *